United States Patent
Do et al.

(10) Patent No.: US 11,358,134 B2
(45) Date of Patent: Jun. 14, 2022

(54) HETEROBIMETALLIC CATALYSTS AND SITE-DIFFERENTIATED LIGANDS FOR PREPARATION THEREOF

(71) Applicant: University of Houston System, Houston, TX (US)

(72) Inventors: Loi Hung Do, Manvel, TX (US); Zhongzheng Cai, Houston, TX (US); Thi Tran, Houston, TX (US); Dawei Xiao, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 0 days.

(21) Appl. No.: 17/255,846

(22) PCT Filed: Jun. 26, 2019

(86) PCT No.: PCT/US2019/039149
§ 371 (c)(1),
(2) Date: Dec. 23, 2020

(87) PCT Pub. No.: WO2020/009846
PCT Pub. Date: Jan. 9, 2020

(65) Prior Publication Data
US 2021/0260567 A1 Aug. 26, 2021

Related U.S. Application Data

(60) Provisional application No. 62/807,831, filed on Feb. 20, 2019, provisional application No. 62/693,524, filed on Jul. 3, 2018.

(51) Int. Cl.
*B01J 31/00* (2006.01)
*B01J 31/22* (2006.01)
(Continued)

(52) U.S. Cl.
CPC ....... *B01J 31/2243* (2013.01); *B01J 31/2247* (2013.01); *C08F 4/7014* (2013.01); *C08F 10/02* (2013.01); *B01J 2531/0205* (2013.01); *B01J 2531/0297* (2013.01); *B01J 2531/824* (2013.01); *B01J 2531/847* (2013.01); *C08F 2410/03* (2013.01)

(58) Field of Classification Search
None
See application file for complete search history.

(56) References Cited

FOREIGN PATENT DOCUMENTS

WO 2015/200849 12/2015

OTHER PUBLICATIONS

Notification of Transmittal of the International Search Report and Written Opinion dated Jan. 16, 2020 from the International Searching Authority—The European Patent Office—for International Application No. PCT/US19/39149, 18 pages.

(Continued)

*Primary Examiner* — Yun Qian
(74) *Attorney, Agent, or Firm* — Jackson Walker LLP

(57) ABSTRACT

Phosphine phosphonate and phenoxyphosphine ligands bearing polyethylene glycol (PEG) chains are used as described herein to produce heterobimetallic catalysts. The ligands can be metallated selectively with palladium or nickel and secondary metal ions to provide well-defined heterobimetallic compounds. These heterobimetallic complexes exhibit accelerated reaction rates and greater thermal stability in olefin polymerization compared to other catalysts.

9 Claims, 20 Drawing Sheets

(51) Int. Cl.
C08F 4/70 (2006.01)
C08F 10/02 (2006.01)

(56) References Cited

OTHER PUBLICATIONS

Cai, et al., "Fine-Tuning Nickel Phenoxyimine Olefin Polymerization Catalysts: Performance Boosting by Alkali Cations", Journal of the American Chemical Society, 2015, pp. 15501-15510.

Cai, et al., "Customizing Polyolefin Morphology by Selective Pairing of Alkali Ions with Nickel Phenoxyimine-Polyethylene Glycol Catalysts", American Chemical Society—Organometallics, 2017, pp. 4691-4698.

Zhang, et al., "Influence of Polyethylene Glycol Unit on Palladium— and Nickel—Catalyzed Ethylene Polymerization and Copolymerization", Angewandte Chemie, International Edition, vol. 56, No. 46, Oct. 1, 2017, pp. 14672-14676.

Cai, et al., "Thermally Robust Heterobimetallic Palladium—Alkali Catalysts for Ethylene and Alkyl Acrylate Copolymerization", American Chemical Society9—Organometallics, 2018, pp. 3874-3882.

Notification of Transmittal of the International Preliminary Report on Patentability dated Jan. 14, 2021 from the European Patent Office for International Application No. PCT/US19/39149, 10 pages.

Zhang, et al., "Well-defined phosphino-phenolate neutral nickel(II) catalysts for efficient (co)polymerization of norbornene and ethylene", Dalton Transactions—The Royal Society of Chemistry, 2015, 44, pp. 7382-7394.

Delgado, et al., "Pyridinediimine Iron Complexes with Pendant Redox-Inactive Metals Located in the Secondary Coordination Sphere", Inorganic Chemistry, 2016, 55, pp. 555-557.

Smith, et al. "ZnCl2 Capture Promotes Ethylene Polymerization by a Salicylaldiminato Ni Complex Bearing a Pendant 2,2'-Bipyridine Group", Organometallics, 2016, 35, pp. 2429-2432.

Smith, et al., "Thermodynamic Studies of Cation-Macrocycle Interactions in Nickel Pincer—Crown Ether Complexes Enable Switchable Ligation", American Chemical Society—Organometallics, 2017, 36, pp. 3094-3103.

Xin, et al., "Nickel Catalyzed Copolymerization of Ethylene and Alkyl Acrylates", Journal of the American Chemical Society, 2017, 139, pp. 3611-3614.

Zhang, et al., "Robust Bulky [P,O] Neutral Nickel Catalysts for Copolymerization of Ethylene with Polar Vinyl Monomers", American Chemical Society, Catalysis, 2018, 8, pp. 5963-5976.

Chelator 1:

Chelator 2:

Scheme 2

HETEROBIMETALLIC CATALYSTS AND SITE-DIFFERENTIATED LIGANDS FOR PREPARATION THEREOF

This application claims priority to U.S. Provisional Patent Application No. 62/693,524, filed Jul. 3, 2018, entitled "Heterobimetallic Catalysts and Site-Differentiated Ligands for Preparation Thereof," and U.S. Provisional Patent Application No. 62/807,831, filed Feb. 20, 2019, entitled "Heterobimetallic Catalysts and Site-Differentiated Ligands for Preparation Thereof," and the contents of both applications are incorporated by reference herein.

This invention was made with government support under Grant No. CHE-1750411 awarded by the National Science Foundation. The Government has certain rights in the invention.

BACKGROUND

This disclosure pertains to heterobimetallic catalysts and the synthesis thereof.

To meet the diverse needs of the global materials market, a wide variety of polyolefins are desired. Greater than 70% of the world's ethylene-based polymers are manufactured using transition metal catalyzed processes. Because the intrinsic properties of polyolefins are determined by how their building blocks are assembled, having a broad assortment of metal catalysts to synthesize polyolefins is required. The development of customized catalysts to access specific polymer products is a major scientific endeavor. Traditionally, altering a molecular catalyst's steric bulk or electronic structure requires synthetic modification of its ligand framework, which can be cumbersome and labor-intensive. To be industrially useful, the metal catalysts must also be highly active, tolerant of trace impurities, and compatible at high reactor temperatures (e.g. >80° C.).

The discovery that cationic late transition metal diimine complexes are capable of copolymerizing ethylene with methyl acrylate inspired many researchers to search for new families of polar group compatible molecular catalysts. Late transition metal complexes are widely investigated as olefin polymerization catalysts because they have better functional monomer compatibility and greater tolerance of polar impurities/solvents compared to early transition metal complexes. For example, the development of neutral palladium phosphine sulfonate complexes by Drent et. al. has enabled the copolymerization of ethylene with difficult to incorporate polar monomers such as vinyl acetate, vinyl halide, acrylonitrile, and acrylamide. Most recently, the research groups of Nozaki and Jordan disclosed that cationic palladium compounds ligated by P,O-ligands also gave active copolymerization catalysts. A major drawback in many of these metal-based systems, however, is that the presence of polar monomers causes a significant decrease in catalytic activity compared to in the presence of just ethylene. Furthermore, the molecular weights of the copolymers also tend to be low ($M_n<10^5$). An extensive assortment of nickel catalysts with diverse ethylene polymerization behaviour has also been reported. Some of their common limitations, however, are that they can exhibit low catalyst activity, produce short chain oligomers/polymers, and have poor control over polymer microstructures. These shortcomings have thus prevented late transition metal complexes from being viable catalysts for commercial polyolefin synthesis.

SUMMARY

The present disclosure relates generally to heterobimetallic catalyst compounds and new strategies to enhance the capabilities of late transition metal olefin polymerization catalysts. In particular, the present disclosure describes the construction of a site-differentiated dinucleating platform for the self-assembly of a novel family of palladium-metal and nickel-metal complexes, where metal can be elements of the s-block, d-block, or f-block in the periodic table. The thermally robust heterobimetallic catalysts are particularly useful for olefin homo- and copolymerization.

The strategies described herein overcome the deficiencies of conventional olefin polymerization catalysts. They provide a simple and versatile method to fine tune transition metal catalysts with minimal synthetic effort. The pairing of secondary metal ions with palladium or nickel phosphine-phosphonate complexes imparts greater reactivity and thermal stability to the parent catalyst in both ethylene homo- and copolymerization. An important feature is the installation of two polyethylene glycol (PEG) chains to the ligand's phosphonate group, which provides a well-defined binding site for alkali ions to yield discrete heterobimetallic species in solution.

These heterobimetallic compounds exhibit superior catalytic performance in ethylene homopolymerization and ethylene/polar olefin copolymerization compared to conventional catalysts. Time dependent polymerization studies indicate that the complexes display uniquely long catalyst lifetimes at 100° C., and can even operate at temperatures as high as 140° C.

DETAILED DESCRIPTION OF PREFERRED EMBODIMENTS

The present disclosure relates to heterobimetallic catalysts and methods for synthesis thereof. In particular, the present disclosure relates to novel phosphine phosphonate and phenoxyphosphine ligands bearing polyethylene glycol (PEG) chains. These ligands can be metallated selectively with palladium or nickel and secondary metal ions to provide well-defined heterobimetallic compounds. These heterobimetallic complexes exhibit accelerated reaction rates and greater thermal stability in olefin polymerization compared to their monopalladium or mononickel counterparts. The general ligand design strategy could also be extended to other classes of catalysts to boost their catalytic performance.

The common feature of the heterobimetallic catalysts is that they contain a primary metal site where polymerization takes place and a secondary metal site where substrates can interact (or serve other ancillary functions). The secondary metal binding site is designed to have broad metal ion specificity so that a wide variety of mixed metal complexes could be generated easily. Polymerization results show that the presence of secondary metal ions can significantly impact catalyst activity, thermal stability, and polymer microstructure. This approach is better than existing technologies because a wide variety of polymer types can be synthesized using a single universal catalyst platform.

In certain preferred embodiments, the heterobimetallic catalysts have a structure as shown below:

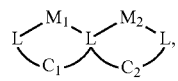

where $M_1$ is nickel or palladium and $M_2$ is any metal of the s-block, d-block, or f-block in the periodic table, such as any alkali, alkaline, transition, or rare earth metal. $C_1$ is a first chelator moiety selected from:

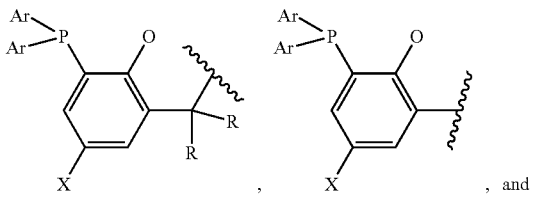

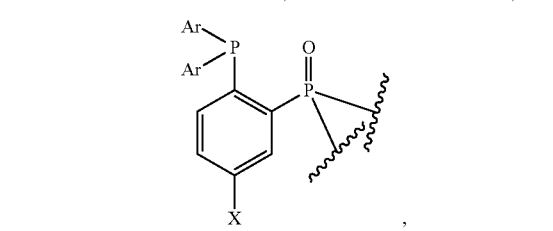

where Ar specifies aromatic groups with different substituents, such as alkyl, phenyl, and alkoxy, X specifies different electron donating and withdrawing substituents, such as alkoxy, amino, nitro, cyano, and other functional groups, and R specifies alkyl or aryl groups, such as methyl, isopropyl, and phenyl. $C_2$ is a second chelator moiety selected from:

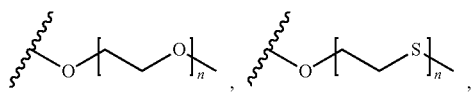

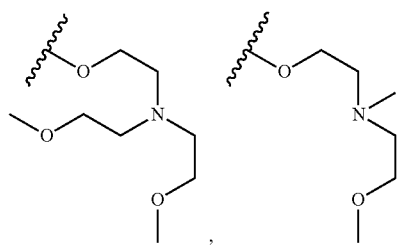

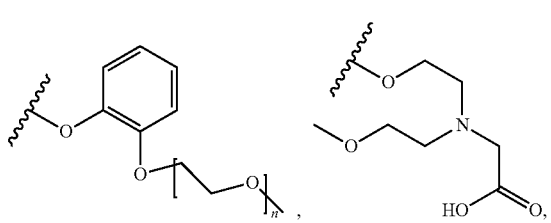

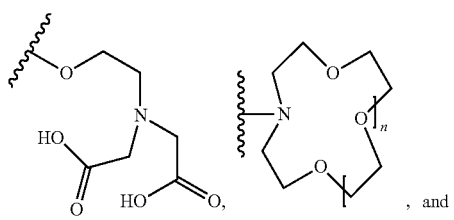

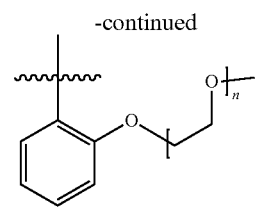

Figure 1:
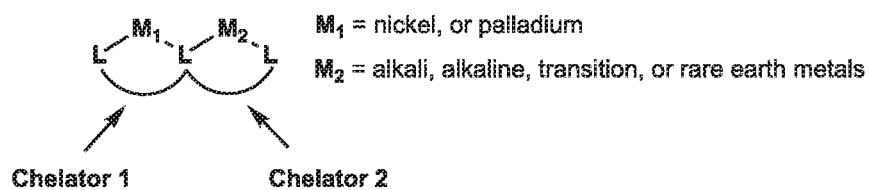
FIG. 1 shows a general structure for preferred embodiments of heterobimetallic complexes described herein.
Figure 1:
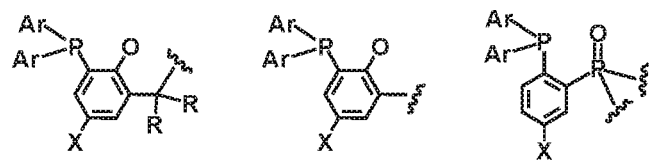
Figure 1:
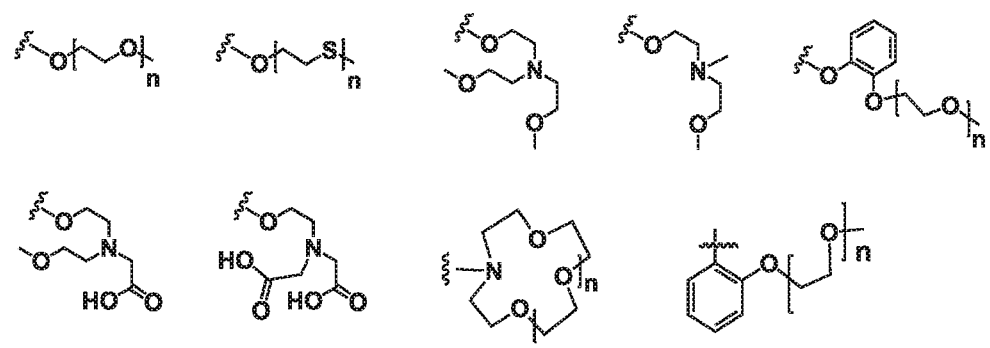

In $C_2$, Ar, R, and X are defined as above and n specifies the number of repeating units, which can vary from 0 to 4. Further, L refers to the ligand donor groups such as phosphine, alkoxide, phosphine oxide, ether, amine, or carboxylate. The curved lines that connect the donors L represent the organic linkers that make up the complete ligand structure. The wavy lines show attachment points where Chelator 1 and Chelator 2 could be covalently attached to one another. These preferred embodiments are also shown in FIG. 1.

In certain additional preferred embodiments, palladium-alkali catalysts have one of the structures shown below:

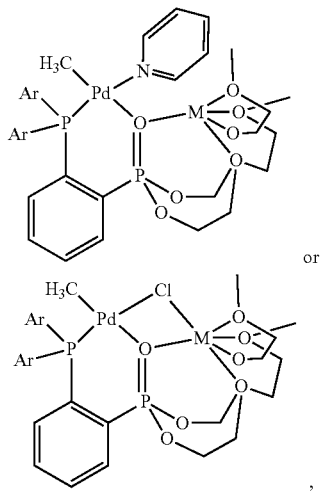

wherein Ar is Ph or (2-MeO)Ph, wherein Ph is a phenyl group, and wherein M is Li, Na, or K.

Figure 2:
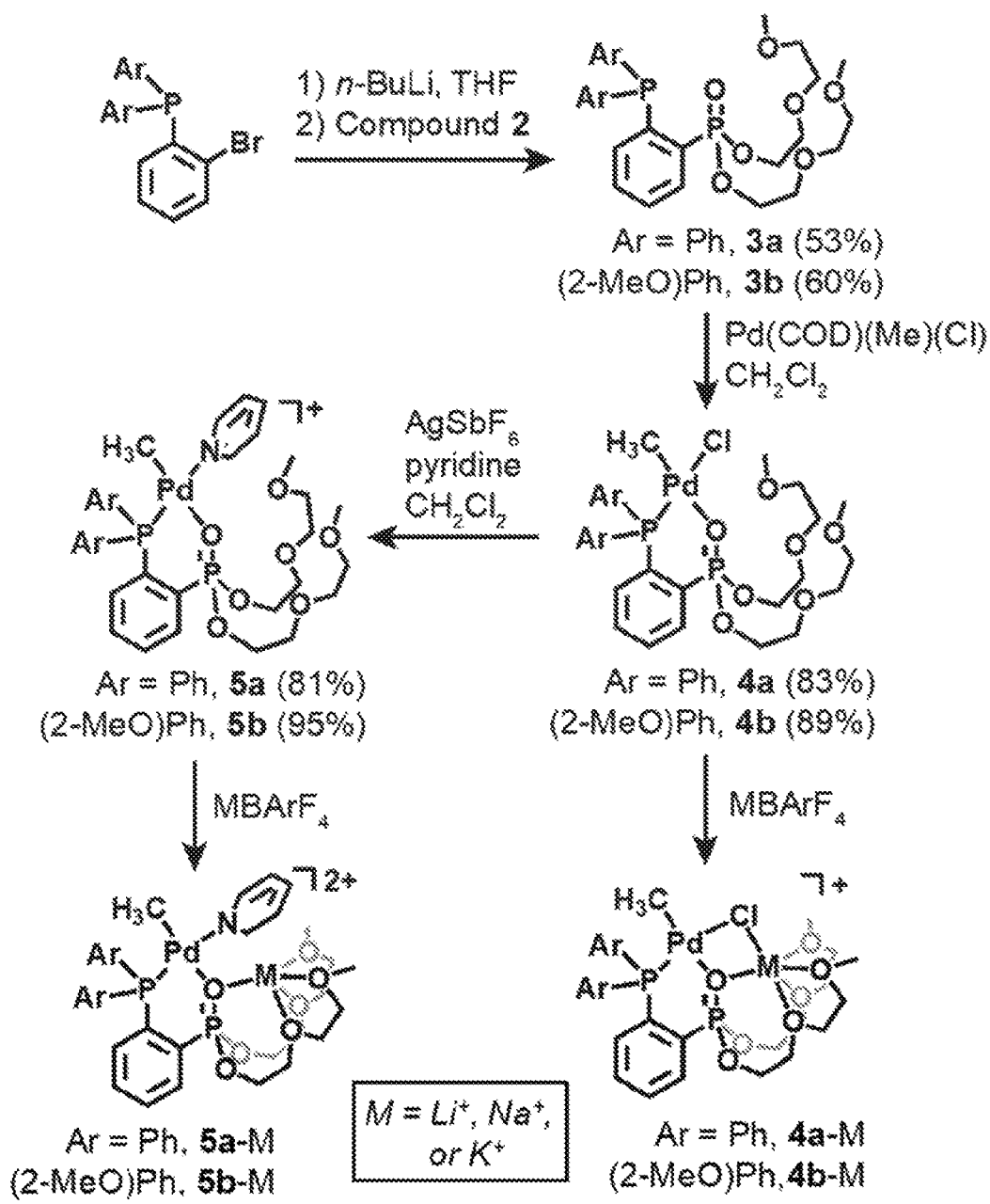
FIG. 2 shows a synthetic scheme, Scheme 1, for the synthesis of ligands and palladium complexes, in accordance with preferred embodiments described herein.

Preferred embodiments of palladium phosphine-phosphonate complexes were obtained through the synthetic sequence shown in Scheme 1, in FIG. 2. Lithiation of (2-bromophenyl)diarylphosphine, followed by reaction with methyldiglycol chlorophosphate, provided ligands 3a (Ar=phenyl) and 3b (2-methoxyphenyl) in moderate yields. Metallation of these ligands by treatment with Pd(COD)(Me)(Cl) (COD=1,5-cyclooctadiene) gave complexes 4a and 4b, respectively. Finally, chloride abstraction using AgSbF6 and pyridine furnished complexes 5a/5b. Single crystals of compounds 4b and 5b were analyzed by X-ray crystallography (see Example 5 below and FIGS. 8 and 10, respectively). In both structures, the palladium center is square planar and the methyl group is trans to the phosphonate moiety. The bond metrics at the palladium core in 5b are similar to those in the analogous diethylphosphonate variant reported by Jordan and coworkers.

Figure 3:
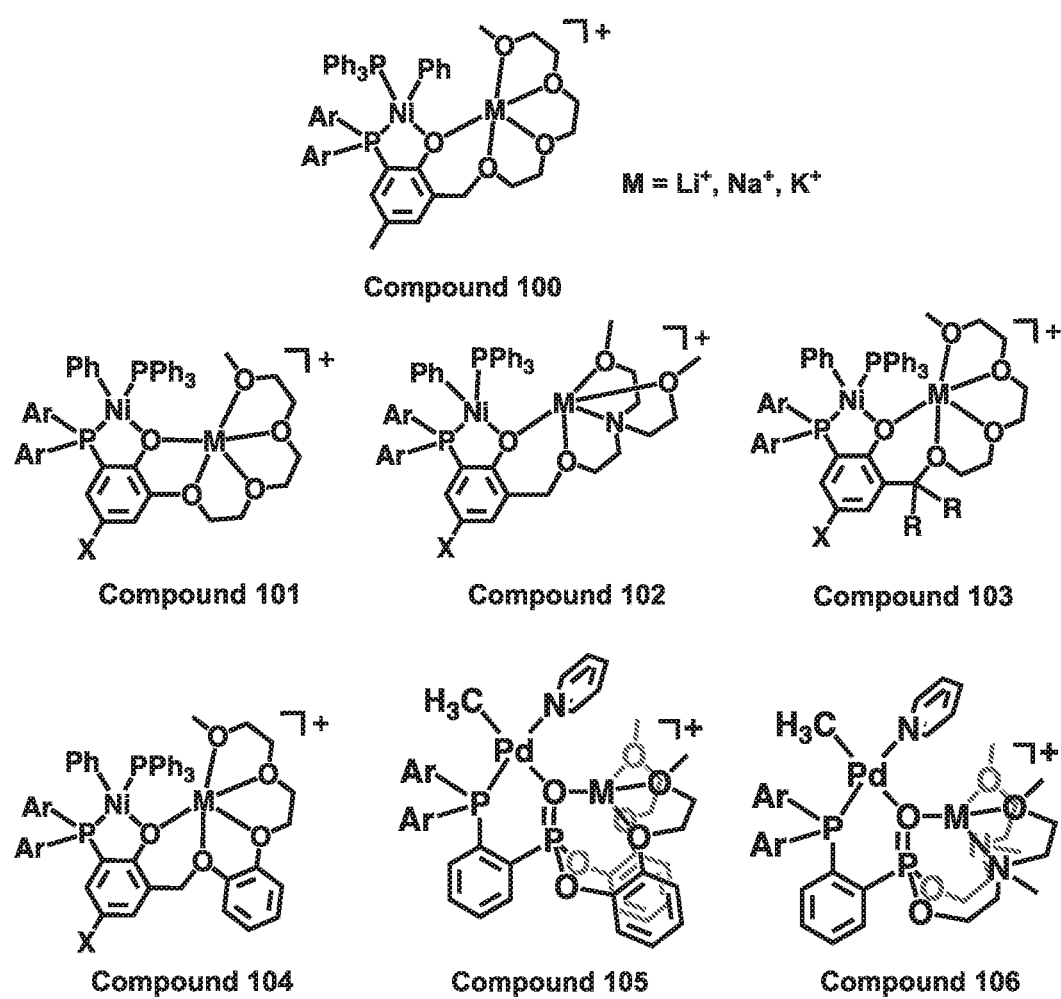
FIG. 3 shows examples of preferred embodiments of heterobimetallic complexes.
Figure 4:
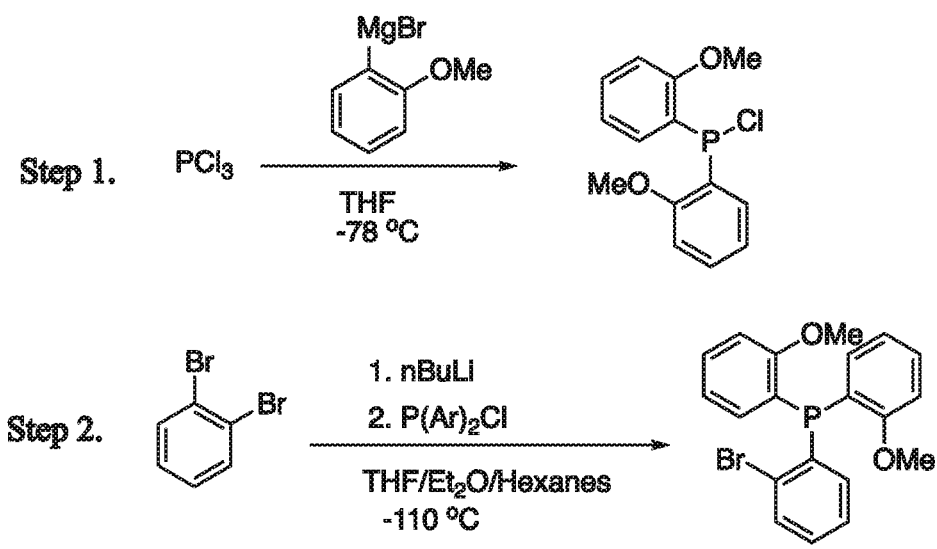
FIG. 4 shows steps in the procedure for preparing (2-bromophenyl)bis(2-methoxyphenyl)phosphine.

Additional preferred embodiments of heterobimetallic complexes are shown in FIG. 3. In the preferred embodiments shown in FIG. 3, as well as all preferred embodiments of heterobimetallic complexes described herein, Ph is phenyl, PPh3 is phosphine (PH3), and Ar specifies aromatic groups with different substituents, such as alkyl, phenyl, and alkoxy. X specifies different electron donating and withdrawing substituents, such as alkoxy, amino, nitro, cyano, and other functional groups. R specifies alkyl or aryl groups, such as methyl, isopropyl, and phenyl. In addition, the polyethylene glycol chains can vary in length, preferably having 2-4 ethylene glycol units. The overall charges of the heterobimetallic complexes are determined by the oxidation states of the metal ions used and could impact their structural stability and chemical reactivity.

When nickel phenoxyimine or palladium phosphine phosphate ester catalysts are paired with secondary Lewis acids, their reactivity is significantly increased and/or altered. The presence of alkali ions can also dramatically accelerate the ethylene polymerization rates of nickel phenoxyphosphine catalysts. Because these reactions generate such large exotherms, careful reaction temperature control is required to achieve the best catalytic performance.

In certain additional preferred embodiments, nickel-alkali catalysts have the structure shown below:

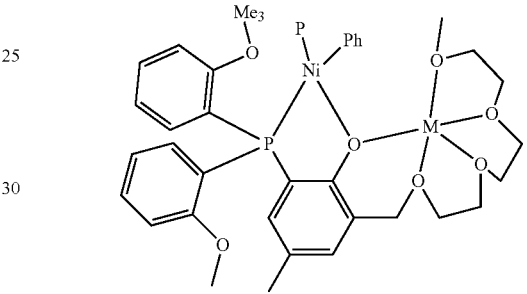

wherein Ph is a phenyl group, M is Li, Na, or K, and wherein Me$_3$P is trimethylphosphine. In additional preferred embodiments, M is Na and the catalysts are nickel-sodium phenoxyphosphine complexes. The nickel phenoxyphosphine complexes feature PEG side arms and can chelate secondary alkali ions. The corresponding nickel-sodium complexes are extraordinarily active catalysts for ethylene polymerization, demonstrating again that using secondary Lewis acids to boost catalytic performance is applicable to many different catalyst systems.

To enable the incorporation of pendant alkali ions to nickel phenoxyphosphine complexes, in preferred embodiments, polyethylene glycol (PEG) chains are attached to the ortho position of the phenolate ring, as shown generally in Scheme 2 in FIG. 11 and discussed more fully in Example 6 below.

The pairing of alkali ions with late transition metal complexes leads to significant catalyst enhancements, which is consistent with studies of an analogous palladium system. Polymerization was carried out using these catalysts in the polar organic solvent THF. Upon the addition of external Lewis such as $Zn^{2+}$ or $Co^{2+}$, the nickel phosphine phosphonate PEG complexes could generate heterobimetallic species that are more active than their parent complexes. By using THF as solvent, the secondary metal scope was expanded, which allowed for the use of different metal-metal combinations. The efficient copolymerization of ethylene with several polar monomers was readily achieved with these heterobimetallic complexes in THF. This appears to be the first time it has been reported that copolymerization can be performed in polar solvent with activity up to $10^4$ g/mol Ni·h.

Additional preferred embodiments include a method for preparing heterobimetallic catalysts, comprising reacting a compound having a structure of:

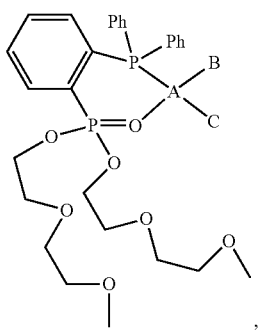

wherein A is Pd or Ni, Ph is phenyl, and B and C are independently selected from $CH_3$, Cl, pyridine, phenyl, $PPh_3$, wherein $PPh_3$ is phosphine, and $PMe_3$, wherein $PMe_3$ is trimethylphosphine, with a metal salt, wherein the metal salt comprises any metal of the s-block, d-block, or f-block in the periodic table, such as any alkali, alkaline, transition, or rare earth metal, to form a heterobimetallic catalyst.

Additional preferred embodiments include heterobimetallic catalysts prepared by complexing the structures shown below:

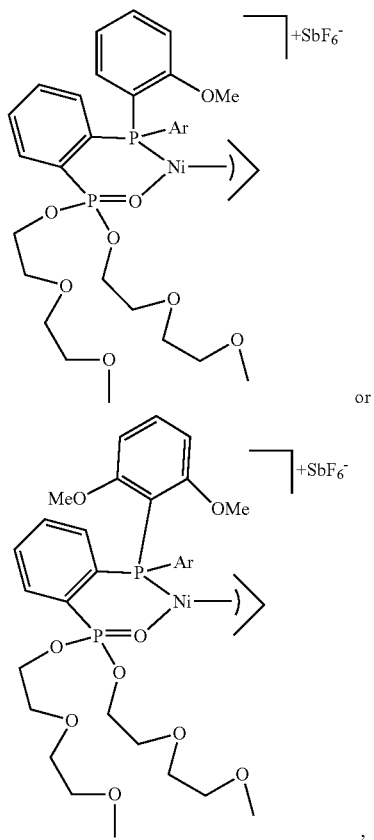

wherein Ar is a phenyl group, with a metal salt, where the metal salt can be an alkali salt such as a salt of $Ca^{2+}$ or $Mg^{2+}$ or a transition metal salt such as a salt of $Co^{2+}$ or $Zn^{2+}$.

In the preferred embodiments and examples included herein, the compound numbering schemes used in (1) Scheme 1, FIGS. 2-10, and Examples 1-5, (2) Scheme 2, FIGS. 11-18, and Examples 6-9, and (3) Schemes 3-4, FIGS. 19-24, and Examples 10-12 are all distinct and do not overlap. For example, complexes 5a and 5b found in Scheme 1, FIG. 2, and Examples 1 and 4-5 have different structures relative to compound 5 found in Scheme 2, FIG. 11, and Example 6.

EXAMPLE 1. PALLADIUM-ALKALI CATALYSTS

Commercial reagents were used as received. All air- and water-sensitive manipulations were performed using standard Schlenk techniques or under a nitrogen atmosphere using a glovebox. Anhydrous solvents were obtained from an Innovative Technology solvent drying system saturated with Argon. High-purity polymer grade ethylene was obtained from Matheson TriGas without further purification. The compounds (2-bromophenyl)diphenyl phosphine and Pd(COD)(Me)(Cl) were prepared according to literature procedures.

NMR spectra were acquired using JOEL spectrometers (ECA-400, 500, and 600) and referenced using residual solvent peaks. All $^{13}C$ NMR spectra were proton decoupled. $^{31}P$ NMR spectra were referenced to phosphoric acid. For polymer characterization: $^1H$ NMR spectroscopy—Each NMR sample contained ~20 mg of polymer in 0.5 mL of 1,1,2,2-tetrachloroethane-$d_2$ (TCE-$d_2$) and was recorded on a 500 MHz spectrometer using standard acquisition parameters at 120° C. $^{13}C$ NMR spectroscopy—Each NMR sample contained ~50 mg of polymer and 50 mM (8.7 mg) chromium acetylacetonate Cr(acac)$_3$ in 0.5 mL of TCE-$d_2$ and was recorded at 120° C. (125 MHz). The samples were acquired using a 90° pulse of 11.7 µs, a relaxation delay of 4 s, an acquisition time of 0.81 s, and inverse gated decoupling. The samples were preheated for 30 mM prior to data acquisition. The carbon spectra were assigned based on the chemical shift values reported in the literature. High-resolution mass spectra were obtained from the mass spectral facility at the University of Houston. Elemental analyses were performed by Atlantic Microlab.

Gel permeation chromatography (GPC) data were obtained using a Malvern high temperature GPC instrument equipped with refractive index, viscometer, and light scattering detectors at 150° C. with 1,2,4-trichlorobenzene (stabilized with 125 ppm BHT) as the mobile phase. A calibration curve was established using polystyrene standards.

Preparation of (2-bromophenyl)bis(2-methoxyphenyl) phosphine. See FIG. 4. The following two step procedure was used: Step 1. A 100 mL Schlenk flask was charged with magnesium turnings (0.6 g, 25 mmol, 2.5 equiv.) under $N_2$ in 20 mL of THF. The compound 2-bromoanisole (2.6 mL, 20 mmol, 2.0 equiv.) was added and the mixture was stirred at room temperature for 1 h until the solution turned brown. The resulting Grignard reagent was cannula transferred to a THF solution containing $PCl_3$ (0.8 mL, 10 mmol, 1.0 equiv.) at −78° C. After the addition was complete, the suspension was stirred at room temperature for another 30 min. This solution was used directly in the next step. $^{31}P$ NMR (CDCl$_3$, 243 MHz): δ (ppm)=62.49. Step 2. The compound 1,2-dibromobenzene (1.1 mL, 9.1 mmol, 1.0 equiv.) was combined with 20 mL of Et$_2$O/THF (1:1). The solution was cooled to −110° C. using an cold bath containing Et$_2$O/Acetone/Pentane (85:10:5) and liquid $N_2$. A solution of n-butyllithium (1.6 M) (5.8 mL, 9.2 mmol, 1.0 equiv.) was added slowly via syringe, taking care that the solution flowed down from the wall of the flask rather than directly into the reaction mixture. The mixture turned slightly yellow and was stirred for 30 mins at −110° C. The crude PAr₂Cl solution from step 1 was precooled to −78° C. and then added to the reaction flask via syringe. This final mixture was allowed to continue stirring at −110° C. for 10 mins and then slowly warmed up to −90° C. Saturated NH₄Cl solution (15 mL) was added to quench the reaction. The reaction mixture was extracted into DCM (3×50 mL). The organic extracts were combined, dried over sodium sulfate, filtered, and then evaporated to dryness. The crude material was purified by silica gel column chromatography (hexanes/DCM, 1:1). A white solid (2.93 g, 7.3 mmol, 80%) was collected as the final product. The NMR spectra of this compound match those that were reported previously.

Preparation of 1:

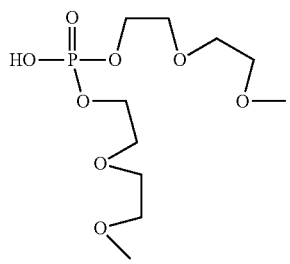 [SMILES: COCCOCCOP(=O)(O)OCCOCCOC]

Phosphorus trichloride (0.54 mL, 6.2 mmol, 1.0 equiv.) was added slowly to a Et₂O solution (50 mL) containing diethylene glycol monomethyl ether (1.87 g, 15.5 mmol, 2.5 equiv.) and pyridine (1.0 mL, 12.5 mmol, 2.0 equiv.) that was immersed in an ice bath. After complete addition, the reaction mixture was allowed to warm up to room temperature and stirred for 16 h. The white pyridinium chloride suspension was removed by vacuum filtration, and was washed twice with Et₂O (2×50 mL). The filtrates were combined and concentrated under reduced pressure and dried under vacuum to yield a clear oil (1.82 g, 6.3 mmol, 100%). The crude product was used directly in the next step without further purification. $^1$H NMR (CDCl₃, 600 MHz): δ (ppm)=6.93 (d, $^1J_{PH}$=716.4 Hz, 1H), 4.28-4.15 (m, 4H), 3.69 (m, 4H), 3.63 (m, 4H), 3.53 (m, 4H), 3.35 (s, 6H). $^{13}$C NMR (CDCl₃, 150 MHz): δ (ppm)=71.98, 70.58, 70.28 (d, $J_{PC}$=5.85 Hz), 64.74 (d, $J_{PC}$=5.85 Hz), 59.15. $^{31}$P NMR (CDCl₃, 243 MHz): δ (ppm)=9.95.

Preparation of 2:

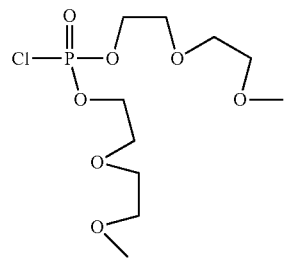 [SMILES: COCCOCCOP(=O)(Cl)OCCOCCOC]

To a stirred acetonitrile solution (5 mL, dry) of trichloroisocyanuric acid (TCICA) (0.48 g, 2.1 mmol, 1.0 equiv.) at room temperature was added a solution of 1 (1.78 g, 6.2 mmol, 3.0 equiv.) in acetonitrile (5 mL). The resulting mixture was stirred at room temperature. As the reaction proceeded, precipitation of cyanuric acid was observed. After 30 min, the reaction flask was brought inside drybox for workup. The heterogeneous mixture was filtered to remove the precipitate and the filtrate was dried under vacuum to yield a clear liquid (1.75 g, 5.5 mmol, 88%). This material was used without further purification. $^1$H NMR (CDCl₃, 500 MHz): δ (ppm)=4.33 (m, 4H), 3.76 (m, 4H), 3.66 (m, 4H), 3.54 (m, 4H), 3.37 (s, 6H). $^{13}$C NMR (CDCl₃, 100 MHz): δ (ppm)=71.97, 70.79, 69.52 (d, $J_{PC}$=8.8 Hz), 68.53 (d, $J_{PC}$=6.8 Hz), 59.21. $^{31}$P NMR (CDCl₃, 202 MHz): δ (ppm)=5.84.

Preparation of 3a:

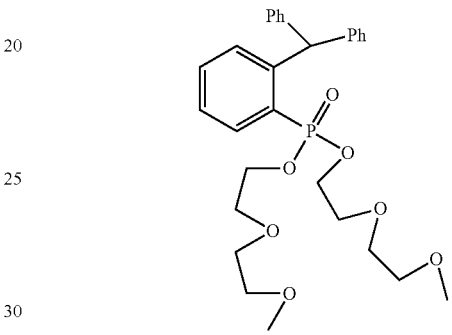

A 100 mL Schlenk flask was charged with (2-bromophenyl)diphenyl phosphine (1.0 g, 2.94 mmol, 1.0 equiv.) in 30 mL of THF. The flask was cooled to −78° C., and a solution of n-butyllithium (1.6 M) (2.0 mL, 3.20 mmol, 1.1 equiv.) was added via syringe, giving a deep yellow solution. After stirring for 20 min, a solution of 2 (0.95 g, 2.95 mmol, 1.0 equiv.) in THF (5 mL) was added by syringe, which turned the solution pale orange. After stirring for 40 min, the cold bath was removed, and the flask was allowed to warm up to room temperature overnight while stirring. The reaction mixture was then concentrated under reduced pressure to afford an orange oil. The crude product was purified by silica gel column chromatography (100% ethyl acetate to remove mobile impurities, followed by ethyl acetate/chloroform/methanol (10:1:1) to elute the product) to yield a slightly yellow oil (0.85 g, 1.56 mmol, 53%). $^1$H NMR (CDCl₃, 400 MHz): δ (ppm)=8.11 (m, 1H), 7.41 (m, 2H), 7.31 (m, 6H), 7.22 (m, 4H), 7.14 (m, 1H), 4.24-4.04 (m, 4H), 3.54-3.44 (m, 12H), 3.34 (s, 6H). $^{13}$C NMR (CDCl₃, 100 MHz): δ (ppm)=145.27, 141.60 (m), 137.52 (d, $J_{PC}$=9.8 Hz), 135.91 (d, $J_{PC}$=12.7 Hz), 134.94 (m), 134.56, 133.72 (d, $J_{PC}$=15.7 Hz), 133.41 (d, $J_{PC}$=17.6 Hz), 132.26 (d, $J_{PC}$=20 Hz), 128.54 (m), 71.92, 70.42, 70.10 (d, $J_{PC}$=4.9 Hz), 64.98 (d, $J_{PC}$=4.9 Hz), 59.13. (Note: The signals in the aromatic region could not be assigned due to overlapping peaks); $^3$P NMR (CDCl₃, 162 MHz): δ (ppm)=19.19, −8.72. ESI-MS (+) calc. for $C_{28}H_{36}O_7P_2[M+K]^+$=585.15730, found 585.17930.

Preparation of 3b:

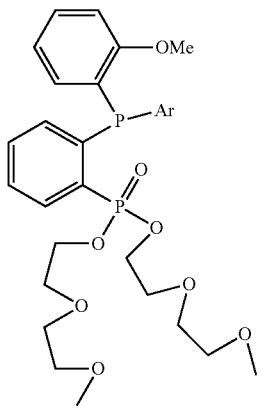

A 100 mL Schlenk flask was charged with (2-bromophenyl)bis(2-methoxyphenyl) phosphine (0.66 g, 1.65 mmol, 1.0 equiv.) in 30 mL of THF. The flask was cooled to −78° C., and a solution of n-butyllithium (1.6 M) (1.1 mL, 1.76 mmol, 1.1 equiv.) was added via syringe, giving a deep yellow solution that was stirred for 20 min After stirring for 20 min, a solution of 2 (0.53 g, 1.65 mmol, 1.0 equiv.) in THF (5 mL) was added by syringe, which turned the solution pale orange. After stirring for 40 min, the cold bath was removed, and the flask was allowed to warm up to room temperature overnight while stirring. The reaction mixture was then concentrated under reduced pressure to afford an orange oil. The crude product was purified by silica gel column chromatography (100% ethyl acetate to remove mobile impurities, followed by ethyl acetate/chloroform/methanol (10:1:1) to elute the product) to yield a slightly yellow oil (0.60 g, 0.99 mmol, 60%). $^1$H NMR (CDCl$_3$, 500 MHz): δ (ppm)=8.14 (dddd, $J_{PH}$=13.5 Hz, $J_{HH}$=7.6 Hz, $J_{PH}$=3.5 Hz, $J_{HH}$=1.5 Hz, 1H), 7.39 (td, $J_{HH}$=7.5 Hz, $J_{PH}$=3.5 Hz, 1H), 7.34 (tt, $J_{HH}$=7.5 Hz, $J_{PH}$=$J_{HH}$=1.5 Hz, 1H), 7.29 (t, $J_{HH}$=7.5 Hz, 2H), 7.04 (m, 1H), 6.83 (dd, $J_{HH}$=8 Hz, $J_{PH}$=5 Hz, 2H), 6.79 (t, $J_{HH}$=7.5 Hz, 2H), 6.54 (br s, 2H), 4.23-4.05 (m, 4H), 3.66 (s, 6H), 3.52-3.44 (m, 12H), 3.32 (s, 6H). $^{13}$C NMR (CDCl$_3$, 125 MHz): δ (ppm)=161.05 (d, $J_{PC}$=16 Hz), 141.83 (dd, $J_{PC}$=24.5, 12.8 Hz), 135.48 (d, $J_{PC}$=14.8 Hz), 134.76 (dd, $J_{PC}$=11.0, 8.6 Hz), 133.85, 133.82 (dd, $J_{PC}$=187, 34 Hz), 132.04 (d, $J_{PC}$=2.4 Hz), 130.04, 128.24 (d, $J_{PC}$=14.6 Hz), 125.55 (d, $J_{PC}$=14.6 Hz), 120.95, 110.18, 71.94, 70.40, 69.99 (d, $J_{PC}$=6.1 Hz), 64.82 (dd, $J_{PC}$=6.1, 2.4 Hz), 59.10, 55.61. $^{31}$P NMR (CDCl$_3$, 162 MHz): δ (ppm)=19.48, −27.25. ESI-MS(+) calc. for C$_{30}$H$_{40}$O$_9$P$_2$[M+H]$^+$=607.2226, found 607.2235.

Preparation of 4a:

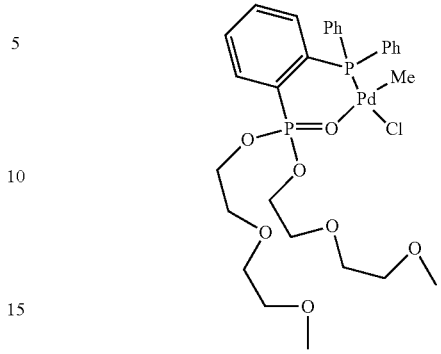

Inside the drybox, compound 3a (117 mg, 0.21 mmol, 1.0 equiv.) and Pd(COD)(Me)(Cl) (57 mg, 0.21 mmol, 1.0 equiv.) were combined in a small vial and then dissolved in DCM (5 mL) at room temperature. The reaction mixture was stirred at room temperature for 1 h and then filtered through a pipet plug. The filtrate was dried under vacuum. Pentane was added to the residue and stirred until a white solid formed (125 mg, 0.18 mmol, 83%). $^1$H NMR (CDCl$_3$, 600 MHz): δ (ppm)=7.98 (dd, $J_{PH}$=5.2 Hz, $J_{HH}$=2.0 Hz), 7.55-7.38 (m, 12H), 7.12 (m, 1H), 4.17-4.10 (m, 4H), 3.55-3.44 (m, 12H), 3.31 (s, 6H), 0.69 (d, $J_{PH}$=2.4 Hz, 3H). $^{13}$C NMR (CDCl$_3$, 100 MHz): δ (ppm)=136.62 (m), 134.83 (m), 134.45 (d, $J_{PC}$=12.7 Hz), 133.16 (m), 132.79 (m), 131.21, 130.76 (d, $J_{PC}$=13.2 Hz), 129.63, 129.13, 128.88 (d, $J_{PC}$=10.7 Hz), 71.87, 70.35, 69.82 (d, $J_{PC}$=6.8 Hz), 66.82 (d, $J_{PC}$=5.8 Hz), 59.13, 0.93. (Note: The signals in the aromatic region could not be assigned due to overlapping peaks); $^{31}$P NMR (CDCl$_3$, 162 MHz): δ (ppm)=32.15 (d, $J_{PP}$=13 Hz), 20.76 (d, $J_{PP}$=13 Hz). Anal. Calc. for C$_{29}$H$_{39}$ClO$_7$P$_2$Pd: C, 49.52; H, 5.59. Found: C,49.34; H, 5.55.

Preparation of 4b:

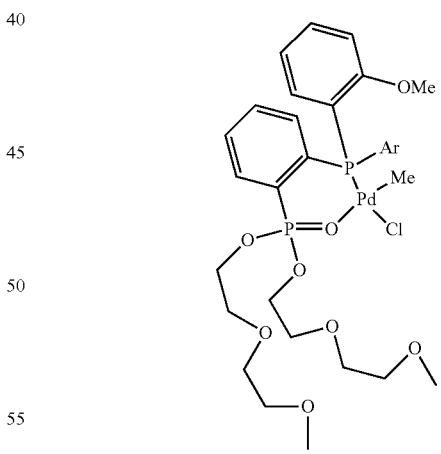

Inside the drybox, compound 3b (165 mg, 0.27 mmol, 1.0 equiv.) and Pd(COD)(Me)(Cl) (72 mg, 0.27 mmol, 1.0 equiv.) were combined in a small vial and then dissolved in DCM (5 mL) at room temperature. The reaction mixture was stirred at room temperature for 1 h and then filtered through a pipet plug. The filtrate was dried under vacuum and washed with Et$_2$O to form a white solid (185 mg, 0.24 mmol, 89%). $^1$H NMR (CDCl$_3$, 600 MHz): δ (ppm)=7.88 (m, 1H), 7.51-7.46 (m, 3H), 7.41 (t, $J_{HH}$=7.2 Hz, 1H), 7.34 (br s, 1H), 7.29-7.25 (m, 2H), 6.95 (t, $J_{HH}$=7.2 Hz, 2H), 6.91 (dd, $J_{HH}$=8.4 Hz, $J_{PH}$=4.8 Hz, 2H), 4.22-4.07 (m, 4H), 3.64 (s, 6H), 3.61-3.46 (m, 12H), 3.34 (s, 6H), 0.57 (d, $J_{PH}$=3 Hz, 3H). $^{13}$C NMR (CDCl$_3$, 125 MHz): δ (ppm)=160.72 (d, $J_{PC}$=3.8 Hz), 136.52, 136.50 (dd, $J_{PC}$=34.9, 10.7 Hz), 134.50 (d, $J_{PC}$=15.9 Hz), 134.10 (t, $J_{PC}$=6.4 Hz), 133.30, 131.45 (dd, $J_{PC}$=6.1, 2.5 Hz), 130.26 (dd, $J_{PC}$=185.8, 17.1 Hz), 129.82 (d, $J_{PC}$=13.5 Hz), 120.92 (d, $J_{PC}$=9.8 Hz), 116.14 (d, $J_{PC}$=51.4 Hz), 111.23 (d, $J_{PC}$=5.0 Hz), 71.87, 70.35, 70.03 (d, $J_{PC}$=7.4 Hz), 66.54 (d, $J_{PC}$=6.1 Hz), 59.11, 55.47, −0.22. $^{31}$P NMR (CDCl$_3$, 243 MHz): δ (ppm)=23.39 (d, $J_{PP}$=8.3 Hz), 21.51 (d, $J_{PP}$=8.2 Hz). Anal. Calc. for C$_{31}$H$_{43}$ClO$_9$P$_2$Pd: C, 48.77; H, 5.68. Found: C, 48.75; H, 5.85.

Preparation of 5a:

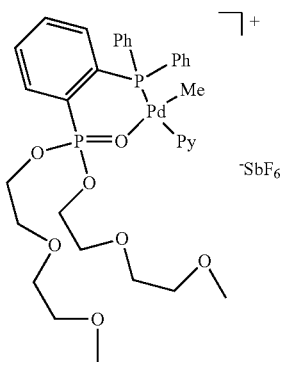

Inside the drybox, 4a (76 mg, 0.11 mmol, 1.0 equiv.) and AgSbF$_6$ (37 mg, 0.11 mmol, 1.0 equiv.) was combined in a small vial. A solution of DCM (5 mL) and pyridine (0.1 mL) was added at room temperature and the reaction mixture was stirred for 1 h. The mixture was then filtered through a pipet plug and the filtrate was dried under vacuum. A solution of Et$_2$O was added to wash the residue to give a sticky oil (86 mg, 0.09 mmol, 81%). $^1$H NMR (CDCl$_3$, 400 MHz): δ (ppm)=8.71 (d, $J_{HH}$=4.8 Hz, 2H), 8.13 (m, 1H), 7.93 (m, 1H), 7.67-7.47 (m, 14H), 7.15 (m, 1H), 4.07 (m, 4H), 3.54-3.39 (m, 12H), 3.32 (s, 6H), 0.58 (d, $J_{PH}$=3.2 Hz, 3H). δ (ppm)=$^{13}$C NMR (CDCl$_3$, 100 MHz): δ (ppm)=150.11, 139.26, 135.44 (m), 134.99 (m), 134.35 (d, $J_{PC}$=9.9 Hz), 133.41 (m), 131.97, 131.60, 131.49 (m), 129.39 (d, $J_{PC}$=8.8 Hz), 128.29, 127.86, 125.86, 71.76, 70.25, 69.34 (d, $J_{PC}$=5.9 Hz), 67.39 (d, $J_{PC}$=5.8 Hz), 59.01, 3.95. (Note: The signals in the aromatic region could not be assigned due to overlapping peaks); $^{31}$P NMR (CDCl$_3$, 243 MHz): δ (ppm)= 33.11 (d, $J_{PP}$=19.4 Hz), 21.01 (d, $J_{PP}$=19.4 Hz).

Preparation of 5b:

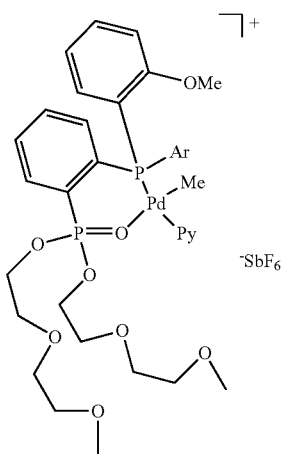

Inside the drybox, 4b (155 mg, 0.20 mmol, 1.0 equiv.) and AgSbF$_6$ (70 mg, 0.20 mmol, 1.0 equiv.) was combined in a small vial. A solution of DCM (10 mL) and pyridine (0.1 mL) was added at room temperature and the reaction mixture was stirred for 1 h. The mixture was then filtered through a pipet plug and the filtrate was dried under vacuum. A solution of Et$_2$O was added to wash the residue to give a sticky oil (201 mg, 0.19 mmol, 95%). $^1$H NMR (CDCl$_3$, 600 MHz): δ (ppm)=8.67 (d, $J_{HH}$=3.6 Hz, 2H), 7.97 (m, 1H), 7.92 (t, $J_{HH}$=7.2 Hz, 1H), 7.58-7.56 (m, 5H), 7.51 (t, 7.8 Hz, 1H), 7.43-7.31 (m, 3H), 7.05 (t, $J_{HH}$=7.8 Hz, 2H), 6.99 (dd, $J_{HH}$=8.4 Hz, $J_{HH}$=4.8 Hz, 2H), 4.00-3.87 (m, 4H), 3.68 (s, 6H), 3.54-3.42 (m, 12H), 3.32 (s, 6H), 0.39 (d, $J_{PH}$=3.6 Hz, 3H). $^{13}$C NMR (CDCl$_3$, 100 MHz): δ (ppm)=160.70 (d, $J_{PC}$=2.9 Hz), 150.15, 139.02, 136.80 (d, $J_{PC}$=11.7 Hz), 135.03 (d, $J_{PC}$=16.5 Hz), 134.62 (dd, $J_{PC}$=26.2, 3.6 Hz), 134.36, 134.05 (t, $J_{PC}$=8.3 Hz), 132.15 (d, $J_{PC}$=16 Hz), 130.52 (d, $J_{PC}$=14.5 Hz), 128.95 (dd, $J_{PC}$=187.6, 17.6 Hz), 125.70, 121.27 (d, $J_{PC}$=11.6 Hz), 114.49 (d, $J_{PC}$=56 Hz), 111.73, 71.77, 70.28, 69.42 (d, $J_{PC}$=5.8 Hz), 66.84 (d, $J_{PC}$=6.8 Hz), 59.02, 55.56, 3.19. $^{31}$P NMR (CDCl$_3$, 243 MHz): δ (ppm)=23.93 (d, $J_{PP}$=14.3 Hz), 21.54 (d, $J_{PP}$=14.3 Hz).

Preparation of 6b:

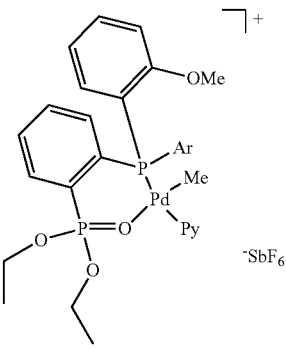

Inside the drybox, the palladium phosphine-diethyl phosphonate complexes (115 mg, 0.19 mmol, 1.0 equiv.) and AgSbF$_6$ (65 mg, 0.19 mmol, 1.0 equiv.) were combined in a small vial. A solution of DCM (10 mL) and pyridine (0.1 mL) was added at room temperature and the reaction mixture was stirred for 1 h. The mixture was then filtered through a pipet plug and the filtrate was dried under vacuum.

A solution of Et$_2$O was added to wash the residue to give a white solid (149 mg, 0.17 mmol, 89%). $^1$H NMR (CDCl$_3$, 600 MHz): δ (ppm)=8.66 (d, J$_{HH}$=4.9 Hz, 2H), 7.93 (t, 7.8 Hz, 1H), 7.83 (m, 1H), 7.62-7.53 (m, 6H), 7.38-7.34 (m, 3H), 7.05 (t, J$_{HH}$=7.5 Hz, 2H), 6.99 (dd, J$_{HH}$=8.4 Hz, J$_{HH}$=4.8 Hz, 2H), 3.87 (m, 4H), 3.68 (s, 6H), 1.10 (t, J$_{HH}$=7.0 Hz, 6H), 0.38 (d, J$_{PH}$=3.0 Hz, 3H). $^{13}$C NMR (CDCl$_3$, 100 MHz): δ (ppm)=160.66 (d, J$_{PC}$=2.2 Hz), 150.11, 139.14, 136.81 (d, J$_{PC}$=11.3 Hz), 135.24 (d, J$_{PC}$=14.1 Hz), 134.80 (dd. J$_{PC}$=46.7, 11.4 Hz) 134.36, 133.42 (dd, J$_{PC}$=9.3, 8.2 Hz), 132.11 (d, J$_{PC}$=7.0 Hz), 130.63 (d, J$_{PC}$=12.2 Hz), 129.18 (dd, J$_{PC}$=184.7, 17.5 Hz) 125.74, 121.24 (d, J$_{PC}$=11.3 Hz), 114.49 (d, J$_{PC}$=56 Hz), 111.73 (d, J$_{PC}$=4.4 Hz), 64.44 (d, J$_{PC}$=6.4 Hz), 55.58, 15.89 (d, J$_{PC}$=6.5 Hz), 3.12. $^{31}$P NMR (CDCl$_3$, 243 MHz): δ (ppm)=24.11 (d, J$_{PP}$=14.1 Hz), 21.08 (d, J$_{PP}$=14.1 Hz).

EXAMPLE 2. SOLUTION STUDIES

Figure 5:
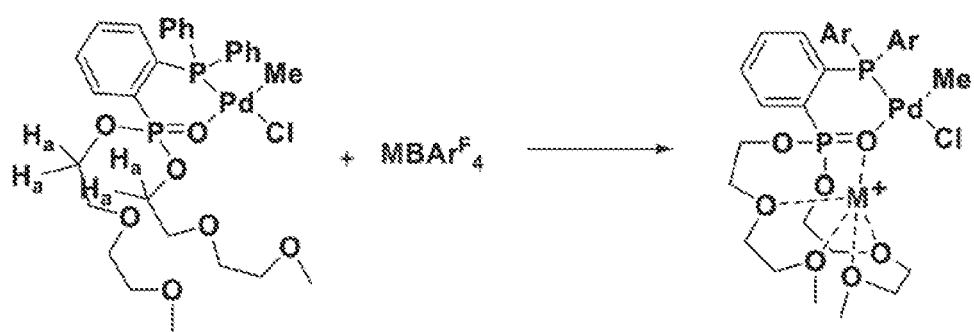
FIG. 5 shows a schematic for the binding of palladium complexes with metal ions, in accordance with preferred embodiments described herein.

To investigate the interactions of the PEGylated palladium compounds with alkali ions, solution studies were carried out. The method of continuous variation (Job Plot analysis) was used to determine the binding stoichiometry of the current palladium complexes with alkali ions, as generally shown in FIG. 5. To perform these experiments, stock solutions of 4a (6 mM, 6 mL) and MBAr$^F_4$ (6 mM, 15 equiv. Et$_2$O to solubilize the salts, 6 mL, M=Li$^+$, Na$^+$, or K$^+$) were prepared separately in CDCl$_3$. Various amounts of each stock solution were added to an NMR tube so that a total volume of 1 mL was obtained. Ten different NMR samples were prepared, each containing a different ratio of 4a:M. The samples were recorded at room temperature by $^1$H NMR spectroscopy. The NMR spectra of 4a in the presence of various amounts of MBAr$^F_4$ salts (M=Li$^+$, Na$^+$, or K$^+$, BAr$^F_4$=tetrakis(3,5-trifluoromethylphenyl)borate) were recorded. The two hydrogen resonances centered at ~4.1 ppm corresponding to the C1 methylene unit of the PEG chains in 4a (labeled as H$_a$ in FIG. 4) shift in the presence of alkali ions. The chemical shift separation between H$_{a1}$ and H$_{a2}$ increases as the Pd mole fraction decreases. The changes in the $^1$H NMR signals of H$_a$ as a function of the mole fraction of 4a are provided in Tables 1-3 below.

TABLE 1

NMR Job plot data for 4a + LiBAr$^{Fa}_4$

| 4a (mL) | Li$^+$(mL) | [4a]/([4a] + [Li$^+$]) | δ(ppm)$^b$ | Δδ(ppm) | (Δδ)[4a]/([4a] + [Li$^+$]) |
|---|---|---|---|---|---|
| 1 | 0 | 1 | 4.136 | 0 | 0 |
| 0.9 | 0.1 | 0.9 | 4.131 | 0.005 | 0.0045 |
| 0.8 | 0.2 | 0.8 | 4.123 | 0.013 | 0.0104 |
| 0.7 | 0.3 | 0.7 | 4.116 | 0.020 | 0.014 |
| 0.6 | 0.4 | 0.6 | 4.106 | 0.030 | 0.018 |
| 0.5 | 0.5 | 0.5 | 4.094 | 0.042 | 0.021 |
| 0.4 | 0.6 | 0.4 | 4.094 | 0.042 | 0.0168 |
| 0.3 | 0.7 | 0.3 | 4.089 | 0.047 | 0.0141 |
| 0.2 | 0.8 | 0.2 | 4.089 | 0.047 | 0.0094 |
| 0.1 | 0.9 | 0.1 | 4.089 | 0.047 | 0.0047 |
| 0 | 1 | 0 | — | — | 0 |

$^a$Concentrations of stock solutions: [4a] = 6 mM in CDCl$_3$, [Li$^+$] = 6 mM in CDCl$_3$/Et$_2$O.

TABLE 2

NMR Job plot data for 4a + NaBAr$^{Fa}_4$

| 4a (mL) | Na$^+$(mL) | [4a]/([4a] + [Na$^+$]) | δ(ppm)$^b$ | Δδ(ppm) | (Δδ)[4a]/([4a] + [Na$^+$]) |
|---|---|---|---|---|---|
| 1 | 0 | 1 | 4.132 | 0 | 0 |
| 0.9 | 0.1 | 0.9 | 4.117 | 0.015 | 0.0135 |
| 0.8 | 0.2 | 0.8 | 4.088 | 0.044 | 0.0352 |
| 0.7 | 0.3 | 0.7 | 4.056 | 0.076 | 0.0532 |
| 0.6 | 0.4 | 0.6 | 4.011 | 0.121 | 0.0726 |
| 0.5 | 0.5 | 0.5 | 3.948 | 0.184 | 0.092 |
| 0.4 | 0.6 | 0.4 | 3.936 | 0.196 | 0.0784 |
| 0.3 | 0.7 | 0.3 | 3.937 | 0.195 | 0.0585 |
| 0.2 | 0.8 | 0.2 | 3.943 | 0.189 | 0.0378 |
| 0.1 | 0.9 | 0.1 | 3.946 | 0.186 | 0.0186 |
| 0 | 1 | 0 | — | — | 0 |

$^a$Concentrations of stock solutions: [4a] = 6 mM in CDCl$_3$, [Na$^+$] = 6 mM in CDCl$_3$/Et$_2$O.

TABLE 3

NMR Job plot data for 4a + KBAr$^{Fa}_4$

| 4a (mL) | K$^+$(mL) | [4a]/([4a] + [K$^+$]) | δ(ppm)$^b$ | Δδ(ppm) | (Δδ)[4a]/([4a] + [K$^+$]) |
|---|---|---|---|---|---|
| 1 | 0 | 1 | 4.132 | 0 | 0 |
| 0.9 | 0.1 | 0.9 | 4.125 | 0.007 | 0.0063 |
| 0.8 | 0.2 | 0.8 | 4.098 | 0.034 | 0.0272 |
| 0.7 | 0.3 | 0.7 | 4.075 | 0.057 | 0.0399 |
| 0.6 | 0.4 | 0.6 | 4.015 | 0.117 | 0.0702 |
| 0.5 | 0.5 | 0.5 | 3.974 | 0.158 | 0.079 |
| 0.4 | 0.6 | 0.4 | 3.951 | 0.181 | 0.0724 |
| 0.3 | 0.7 | 0.3 | 3.944 | 0.188 | 0.0564 |
| 0.2 | 0.8 | 0.2 | 3.942 | 0.19 | 0.038 |
| 0.1 | 0.9 | 0.1 | 3.942 | 0.19 | 0.019 |
| 0 | 1 | 0 | — | — | 0 |

$^a$Concentrations of stock solutions: [4a] = 6 mM in CDCl$_3$, [K$^+$] = 6 mM in CDCl$_3$/Et$_2$O.

Figure 6:
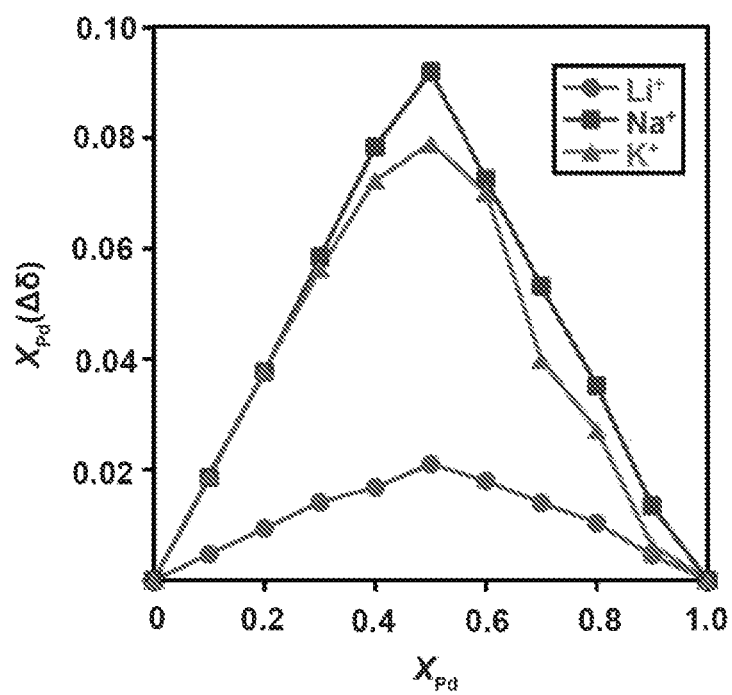
FIG. 6 shows job plots of alkali ion binding behavior for a representative palladium complex and various alkali ions, in accordance with preferred embodiments described herein.

The changes in the chemical shifts of the methylene hydrogen atoms of 4a at ~4.1 ppm were used to construct Job plots. FIG. 6 shows job plots for complex 4a with MBAr$^F_4$ (M=Li$^+$, Na$^+$, K) in CDCl$_3$. The total concentration of 4a/MBAr$^F_4$ was 6 mM for all data points and X$_{Pd}$ was defined as [4a]/([4a]+[M$^+$]). The peak maxima of the Job plots for 4a/M$^+$ all occur at X$_{Pd}$=0.5, which indicates that a 1:1 stoichiometry is optimal between complex 4a and alkali ions. The slopes of the three plots suggest that the alkali ion affinity of 4a follows the order Na$^+$~K$^+$>Li$^+$. The dinuclear structure of the palladium-sodium complex 4b-Na was confirmed by X-ray crystallographic analysis (see Example 5 below and FIG. 9). The structure revealed that the palladium center in 4b-Na has the expected square planar geometry, with slightly modified bond distances compared to those in 4b (Pd—O and Pd—Cl are longer whereas Pd—P and Pd—C are shorter). The sodium ion is six-coordinate due to ligation by five oxygen donors and a bridging chloride. For complex 5b, which contains a pyridine donor instead of chloride like in 4b, similar alkali ion binding behavior was observed. Complex 6b, which lack PEG chains, appeared to bind Na$^+$ only weakly as indicated by minor shifts in its NMR spectra.

EXAMPLE 3. CYCLIC VOLTAMMETRY

To probe the electronic impact of M$^+$ on the palladium complexes, cyclic voltammetry measurements were conducted. Due to solubility considerations and the highly negative reduction potential of the compounds, THF was used as the electrochemical solvent. In the absence of M$^+$, 4a displayed a cathodic peak at −2.5 V (vs. ferrocene/ferrocenium), which was tentatively assigned to reduction of the Pd(II) center. The cyclic voltammograms of 4a-Li, 4a-Na, and 4a-K showed additional broad irreversible waves at approximately −2.2, −2.3, and −2.40 V, respectively, and were attributed to Pd-centered reduction processes in the heterobimetallic species. This trend is consistent with the electronegativity of the alkali ions, which would be expected to cause a decrease in the electron density at the palladium core through electronic induction. It is believed that in THF, an appreciable amount of both monopalladium 4a and heterobimetallic 4a-M species are present at equilibrium due to the lower alkali ion binding affinity of 4a in coordinating solvents compared to in non-coordinating solvents (e.g. chloroform).

EXAMPLE 4. POLYMERIZATION STUDIES

Palladium phosphine-phosphonate-PEG complexes were tested as catalysts for ethylene homopolymerization. Inside the drybox, the palladium complexes (5 μmol) and alkali salts (5 μmol) were dissolved in 10 mL of toluene/DCM (8:2) and stirred for 10 mins. The mixture was sealed inside a vial using a rubber septum and brought outside of the drybox. Under an atmosphere of $N_2$, the catalyst solution was loaded into a syringe. To prepare the polymerization reactor, 40 mL of dry toluene was added to an empty autoclave and preheated to the desired temperature. The autoclave was purged with ethylene (20 psi) for 1 min and then the catalyst solution was injected into the autoclave via syringe. The reactor pressure was increased to 400 psi of ethylene and the contents were stirred vigorously for 2 h. To stop the polymerization, the autoclave was vented and cooled in an ice bath. A solution of MeOH (100-200 mL) was added to precipitate the polymer. The polymer was collected by vacuum filtration, rinsed with MeOH, and dried under vacuum at 80° C. overnight.

Results are shown in Table 4 below.

TABLE 4

Ethylene Homopolymerization Data[a]

| Entry | Cat. | Salt | TOF (×10³) g/mol · h | $M_n$[b] (×10³) | $M_w/M_n$[b] |
|---|---|---|---|---|---|
| 1 | 5a | none | 0 | — | — |
| 2 | 5a | Na⁺ | 0 | — | — |
| 3 | 5b | none | 233 | 2.17 | 1.27 |
| 4 | 5b | Li⁺ | 615 | 2.15 | 1.65 |
| 5 | 5b | Na⁺ | 675 | 2.90 | 1.46 |
| 6 | 5b | K⁺ | 467 | 2.90 | 1.50 |
| 7 | 6b | none | 395 | 1.66 | 1.48 |

[a]Polymerization conditions: Pd catalyst (5 μmol), MBAr$^{F4}$ (5 μmol, if any), ethylene (400 psi), 2 mL DCM, 48 mL toluene, 2 h at 80° C.
[b]Determined by GPC in trichlorobenzene at 140° C.

At 80° C. in toluene under 400 psi of ethylene, complex 5a was completely inactive (entry 1) whereas complex 5b displayed moderate activity (entry 3, TOF=233×10³ g/mol Pd·h). The poor reactivity of 5a was most likely due to the insufficient steric protection of the palladium center, which is typically required to help promote chain growth over chain termination. In comparison, the Jordan-type catalyst 6b yielded polyethylene with a TOF of 395×10³ g/mol Pd·h under the same reaction conditions (entry 7). In all cases, the polymers produced were highly linear and the molecular weight is low ($M_n$=~1.66-2.17×10³), which is consistent with other reported Pd(P, O-ligand) systems. The lower TOF of 5b compared to that of 6b suggest that the free PEG chains in the former might be self-inhibiting.

Next, the effects of alkali salts on ethylene polymerization were evaluated, with the results also shown in Table 4 above. Using the same polymerizations conditions as above, it was observed that the reaction of 5b and MBAr$^F_4$ (1:1) with ethylene led to catalytic rate enhancements of about 2.6×, 2.9×, and 2.0× for Li⁺ (entry 4), Na⁺ (entry 5), and K⁺ (entry 6), respectively, compared to 5b. Interestingly, the polymer molecular weight and polydispersity remained relatively constant in both the presence and absence of alkali ions. The polymerization rates increase in the order Na⁺>Li⁺>K⁺ was somewhat surprising because it was observed previously that potassium ions had a more beneficial effect on nickel phenoxyimine-PEG catalysts than lithium ions. In the present system, it was hypothesized that a combination of two different factors account for the "heterobimetallic effect"— the electronegativity (i.e. Li⁺>Na⁺>K⁺) and the association constant (i.e. Na⁺~K⁺>Li⁺) of the secondary cations. Interestingly, the reaction of 6b and NaBAr$^F_4$ (1:1) with ethylene also led to rate enhancements (see Table 5 below, compare entry 9 vs. 13), although the alkali ion effect is diminished at high temperatures (vide infra). Further mechanistic studies are needed to understand the origins of this heterobimetallic phenomenon.

TABLE 5

Temperature Study of 5b, 5b-Na, 6b, and 6b-Na in Ethylene Homopolymerization.[a]

| Entry | Complex | Salt | Temp. (° C.) | TOF (×10³) g/mol · h | $M_n$[b] (×10³) | $M_w/M_n$[b] |
|---|---|---|---|---|---|---|
| 1 | 5b | None | 80 | 233 | 2.17 | 1.27 |
| 2 | 5b | None | 100 | 737 | — | — |
| 3 | 5b | None | 120 | 451 | — | — |
| 4 | 5b | None | 140 | 85 | — | — |
| 5 | 5b | Na⁺ | 80 | 597 | — | — |
| 6 | 5b | Na⁺ | 100 | 2716 | 1.27 | 2.10 |
| 7 | 5b | Na⁺ | 120 | 1586 | 0.98 | 1.74 |
| 8 | 5b | Na⁺ | 140 | 1065 | 1.27 | 1.36 |
| 9 | 6b | None | 80 | 364 | — | — |
| 10 | 6b | None | 100 | 1395 | 1.14 | 1.61 |
| 11 | 6b | None | 120 | 999 | 1.14 | 1.32 |
| 12 | 6b | None | 140 | 32 | — | — |

TABLE 5-continued

Temperature Study of 5b, 5b-Na, 6b, and 6b-Na in Ethylene Homopolymerization.[a]

| Entry | Complex | Salt | Temp. (° C.) | TOF (×10³) g/mol · h | $M_n$[b] (×10³) | $M_w/M_n$[b] |
|---|---|---|---|---|---|---|
| 13 | 6b | Na⁺ | 80 | 890 | — | — |
| 14 | 6b | Na⁺ | 100 | 2040 | — | — |
| 15 | 6b | Na⁺ | 120 | 1140 | — | — |
| 16 | 6b | Na⁺ | 140 | 585 | — | — |

[a]Polymerization conditions: Pd catalyst (10 μmol), MBAr$^F_4$ (10 μmol, if any), ethylene (400 psi), 2 mL DCM, 48 mL mesitylene, 1 h. [b]Determined by GPC in trichlorobenzene at 140° C.

Figure 7:
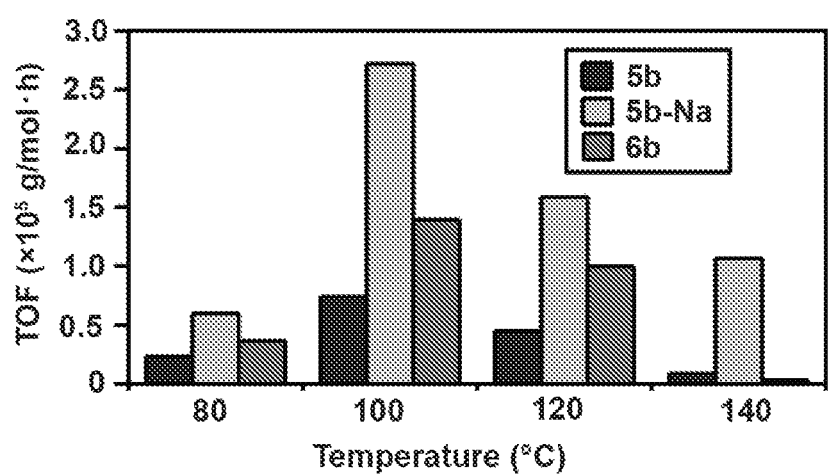
FIG. 7 shows a comparison of the turnover frequencies (TOFs) of exemplary catalysts in ethylene homopolymerization at various temperatures.

To determine the optimal reaction temperature, several catalysts were screened in ethylene polymerization from 80 to 140° C. in mesitylene/dichloromethane (24:1) for 1 h. FIG. 7 shows a comparison of the turnover frequencies (TOFs) of catalysts 5b, 5b-Na, and 6b in ethylene homopolymerization at various temperatures. For the compounds 5b, 5b-Na, and 6b, reactions at 100° C. afforded the highest activity and their relative TOFs were generally observed in the order 5b-Na>6b>5b. Remarkably, the heterobimetallic complex 5b-Na showed high activity at 140° C. (TOF=1, 065×10³ g/mol Pd·h), whereas both 5b and 6b were considerably less active. Although the addition of NaBAr$^F_4$ to 6b also led to significant rate acceleration (Table 5 above), the heterobimetallic 5b-Na was still superior at temperatures greater than 80° C. For example, at 140° C., the catalyst 5b-Na was ~1.8× more active than 6b-Na. These results suggest that having PEG chains in the ligand's phosphonate framework helps to maintain its heterobimetallic core at high temperatures.

To examine the catalyst lifetimes, time-dependent polymerizations were carried out for both complexes 5b-Na and 6b at 100° C. (Table 6, below).

TABLE 6

Time Study for Complexes 5b-Na and 6b in Ethylene Homopolymerization.[a]

| Complex | TOF(×10³ g/mol · h) | | |
|---|---|---|---|
| | 15 min | 30 min | 60 min |
| 5b-Na | 2528 | 2562 | 2726 |
| 6b | 1351 | 1282 | 1395 |

[a]Polymerization conditions: Pd catalyst (10 μmol), MBAr$^F_4$ (10 μmol, if any), ethylene (400 psi), 2 mL DCM, 48 mL mesitylene, at 100° C.

During the period from 15-60 min, both catalysts maintained their catalytic performance. However, 5b-Na showed about a ~1.9× greater turnover frequency (average=2,605×10³ g/mol Pd·h) than 6b (average=1,342×10³ g/mol Pd·h). The extraordinary thermal robustness of the 5b-Na complex is exciting from an industrial standpoint because most large-scale commercial solution polymerizations are conducted at 140° C. or above. In fact, molecular catalysts that can operate within this temperature regime are rare.

The palladium catalysts were also tested in ethylene and methyl acrylate (MA) copolymerization. Inside the drybox, the palladium complexes (10 μmol) and alkali salts (10 μmol) were dissolved in 2 mL of DCM and stirred for 10 mins. The mixture was sealed inside a vial using a rubber septum and brought outside of the drybox. Under an atmosphere of N₂, the alkyl acrylate comonomer was add into the catalyst solution and the final mixture was loaded into a syringe. To prepare the polymerization reactor, 39-41 mL of dry toluene or mesitylene was added to an empty autoclave and preheated to the desired temperature. The autoclave was purged with ethylene (20 psi) for 1 min and then the catalyst solution was injected into the autoclave via syringe. The reactor pressure was increased to 400 psi of ethylene and the contents were stirred vigorously for 2 h. To stop the polymerization, the autoclave was vented and cooled in an ice bath. A solution of MeOH (100-200 mL) was added to precipitate the polymer. The polymer was collected by vacuum filtration, rinsed with MeOH, and dried under vacuum at 80° C. overnight. The results are shown in Table 7 below.

TABLE 7

Ethylene and Methyl Acrylate (Ma) Copolymerization by 5b[a]

| Entry | Salt (equiv.) | TOF (×10³) g/mol · h | Inc.[b] (%) | $M_n$[c] (×10³) | $M_w/M_n$[c] |
|---|---|---|---|---|---|
| 1 | none | 34 | 1.4 | 1.15 | 1.67 |
| 2 | Li⁺(1.0) | 76 | 1.5 | 1.63 | 2.00 |
| 3 | Na⁺(1.0) | 63 | 1.5 | 1.73 | 2.17 |
| 4 | Na⁺(5.0) | 90 | 1.4 | 3.15 | 1.24 |
| 5 | K⁺(1.0) | 61 | 1.3 | 1.99 | 2.00 |

[a]Polymerization conditions: Pd catalyst (10 μmol), MBAr$^{F4}$ (10 μmol, if any), ethylene (400 psi), methyl acrylate (1.5M) in 50 mL total solution volume, 2 h at 80° C.
[b]Determined by 1H NMR spectroscopy.
[c]Determined by GPC in trichlorobenzene at 140° C.

The reaction of 5b with ethylene/MA at 80° C. afforded linear poly(ethylene-co-methyl acrylate) containing ~1.4 mol % of in-chain polar groups (entry 1). Under the same conditions, the 5b-M complexes also yielded copolymers with similar molecular weights and MA content as 5b. Once again, the heterobimetallic catalysts exhibited greater catalytic activity than the monopalladium catalysts. The highest TOF was achieved using 5b/NaBAr$^F_4$ (1:5), which is about a 2.6× improvement over that of 5b (compare entry 1 vs. 4). A slight increase in the copolymer $M_n$ was also obtained in the presence of sodium ions ($M_n$=3.15×10³ for 5b-Na vs. 1.15×10³ for 5b).

To investigate the copolymerization behavior of the catalysts at high temperatures, MA was replaced with tert-butyl acrylate (BA) as the polar monomer. Results are shown in Table 8 below.

TABLE 8

Ethylene and Tert-Butyl Acrylate (BA) Copolymerization Data for 5b and 6b.[a]

| Entry | Salt (equiv.) | TOF (×10³) g/mol · h | Inc.[c] (%) | $M_n$[d] (×10³) | $M_w/M_n$[d] |
|---|---|---|---|---|---|
| 1 | none | 56 | 0.8 | 1.58 | 1.49 |
| 2 | none | 70 | 1.2 | 1.04 | 1.64 |
| 3 | none | 43 | 1.6 | 1.43 | 1.28 |

TABLE 8-continued

Ethylene and Tert-Butyl Acrylate (BA)
Copolymerization Data for 5b and 6b.[a]

| Entry | Salt (equiv.) | TOF (×10³ g/mol · h) | Inc.[c] (%) | $M_n$[d] (×10³) | $M_w/M_n$[d] |
|---|---|---|---|---|---|
| 4 | none | 0 | — | — | — |
| 5 | Li⁺(1.0) | 52 | 0.9 | 1.66 | 2.00 |
| 6 | Na⁺(1.0) | 51 | 0.9 | 1.76 | 2.23 |
| 7 | Na⁺(5.0) | 64 | 0.8 | 2.34 | 1.55 |
| 8 | Na⁺(1.0) | 84 | 1.2 | 2.30 | 1.47 |
| 9 | Na⁺(1.0) | 69 | 1.9 | 2.48 | 1.56 |
| 10 | Na⁺(5.0) | 72 | 1.7 | 2.14 | 1.41 |
| 11 | Na⁺(1.0) | 63 | 1.3 | 1.73 | 1.55 |
| 12 | none | 78 | 1.0 | 0.99 | 2.16 |
| 13 | none | 48 | 1.7 | 1.03 | 1.93 |

[a]Polymerization conditions: catalyst (10 µmol), MBAr$^{F4}$ (10 µmol, if any), ethylene (400 psi), 39-41 mL mesitylene, 2 h.
[c]Determined by ¹H NMR spectroscopy.
[d]Determined by GPC in trichlorobenzene at 140° C.

In general, it was observed that the percentage of BA incorporation into the copolymer was enhanced either by elevating the reaction temperature or increasing the starting BA concentration. Although the addition of sodium salts to 5b led to modest increases in catalyst activity and molecular weight under certain conditions (e.g. compare entry 2 vs. 8), its most pronounced effect was on the catalyst's thermal stability. For example, at 120° C., the TOF of 5b-Na was 63×10³ g/mol Pd·h (entry 11) whereas that of 5b was negligible (entry 4). Importantly, all of the poly(ethylene-co-tert-butyl acrylate) obtained showed relatively narrow $M_w/M_n$ (1.28-2.23), which suggest that the catalysts are single-site species.

EXAMPLE 5. X-RAY DATA

Single crystals suitable for X-ray diffraction studies were picked out of the crystallization vials and mounted onto Mitogen loops using Paratone oil. The crystals were collected at a 6.0 cm detector distance at −150° C. on a Brucker Apex II diffractometer using Mo Kα radiation (λ=0.71073 Å). The structures were solved by direct methods using the program SHELXS and refined by SHELXL. Hydrogen atoms connected to carbon were placed at idealized positions using standard riding models and refined isotropically. All non-hydrogen atoms were refined anisoptriocally.

Figure 8:
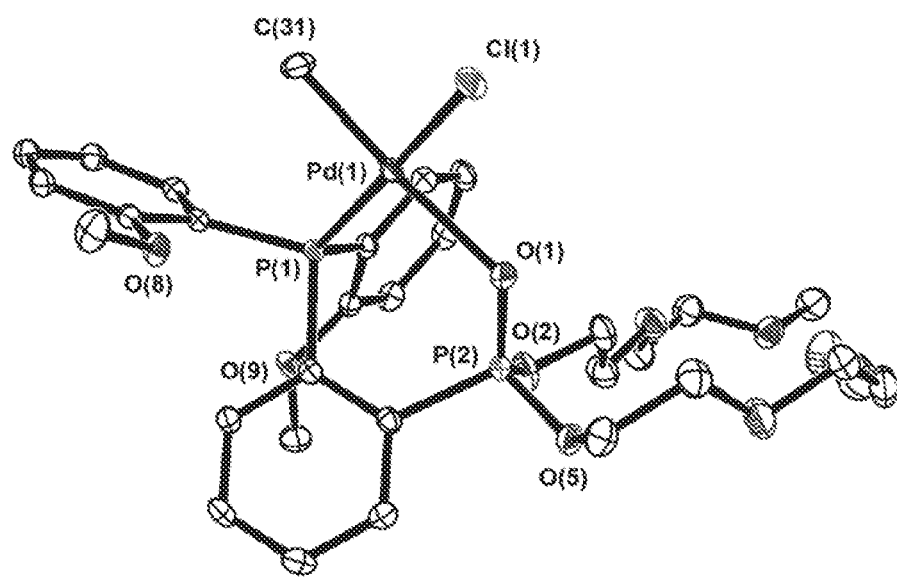
FIG. 8 shows the X-ray structure of a representative complex (4b) in accordance with preferred embodiments described herein.

Crystals of 4b were grown by vapor diffusion of Et₂O into a solution of the complex in DCM. The structure was refined successfully without any disorder and no solvent molecules were found in the crystal lattice. FIG. 8 shows the X-ray structure of complex 4b (ORTEP view, displacement ellipsoids drawn at 50% probability level.) Hydrogen atoms were omitted for clarity.

Figure 9:
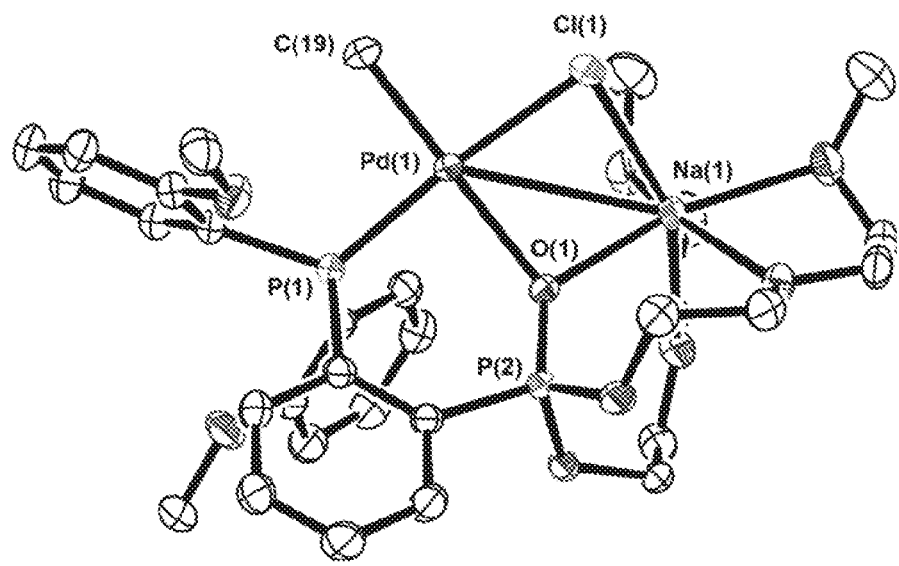
FIG. 9 shows the X-ray structure of a representative complex (4b-Na) in accordance with preferred embodiments described herein.

Crystals of 4b-Na were grown by vapor diffusion of Et₂O into a solution of the complex in DCM. Each asymmetric unit contains two molecules of the palladium complexes and two BAr$^F_4$− anions. The 2-methoxyphenyl group (C44-C49) in Pd2 show positional disorder and was refined in two possible orientations, with about 75.3% and 24.7% occupancies in the major and minor components, respectively. Several of the CF₃-groups in the borate anion show rotational disorder. For carbons C77, C86, C102, and C111, the three fluorine atoms attached to them were modeled using a two-part disorder using similarity bond distance restraints. For carbons C103 and C119, which display severe CF₃ disorder, a three-part disorder was used to model the positions of their fluorine atoms (the three-components were refined with a total occupancy of 1.0±0.001 standard deviation). FIG. 9 shows the X-ray structure of complex 4b-Na (ORTEP view, displacement ellipsoids drawn at 50% probability level.) Hydrogen atoms and BAr$^F_4$− anion were omitted for clarity.

Figure 10:
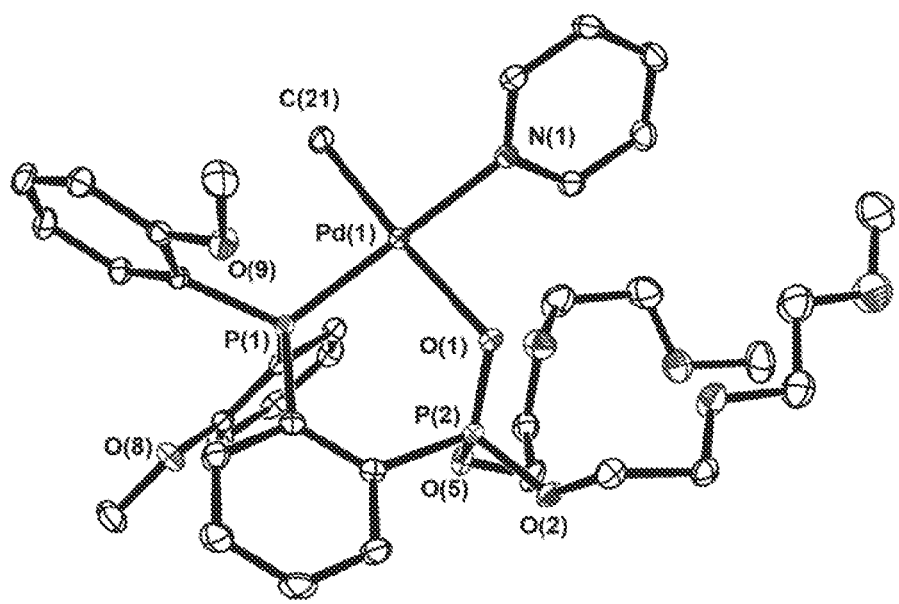
FIG. 10 shows the X-ray structure of a representative complex (5b) in accordance with preferred embodiments described herein.

Crystals of 5b were grown by vapor diffusion of Et₂O into a solution of the complex in DCM. The asymmetric unit contains a single molecule of the palladium complex and a hexafluoroantimonate anion. The structures do not show any disorder and solvent molecules were not found. FIG. 10 shows the X-ray structure of complex 5b (ORTEP view, displacement ellipsoids drawn at 50% probability level.) Hydrogen atoms and hexafluoroantimonate anion were omitted for clarity.

EXAMPLE 6. NICKEL-ALKALI CATALYSTS

Commercial reagents were used as received. All air- and water-sensitive manipulations were performed using standard Schlenk techniques or under a nitrogen atmosphere using a drybox. Anhydrous solvents were obtained from an Innovative Technology solvent drying system saturated with argon. High-purity polymer grade ethylene was obtained from Matheson TriGas without further purification. The NaBAr$^F_4$ salt was prepared according to a literature procedure.

NMR spectra were acquired using JEOL spectrometers (ECA-400, −500, and −600) and referenced using residual solvent peaks. All ¹³C NMR spectra were proton decoupled. ³¹P NMR spectra were referenced to phosphoric acid. ¹H NMR spectroscopic characterization of polymers: each NMR sample contained ~20 mg of polymer in 0.5 mL of 1,1,2,2-tetrachloroethane-d₂ (TCE-d₂) and was recorded on a 500 MHz spectrometer using standard acquisition parameters at 120° C. High-resolution mass spectra were obtained from the mass spectral facility at the University of Houston. Elemental analyses were performed by Atlantic Microlab. Gel permeation chromatography (GPC) data were obtained using a Malvern high temperature GPC instrument equipped with refractive index, viscometer, and light scattering detectors at 150° C. with 1,2,4-trichlorobenzene (stabilized with 125 ppm BHT) as the mobile phase. A calibration curve was established using polystyrene standards in triple detection mode. All molecular weights reported are based on the triple detection method.

Figure 11:
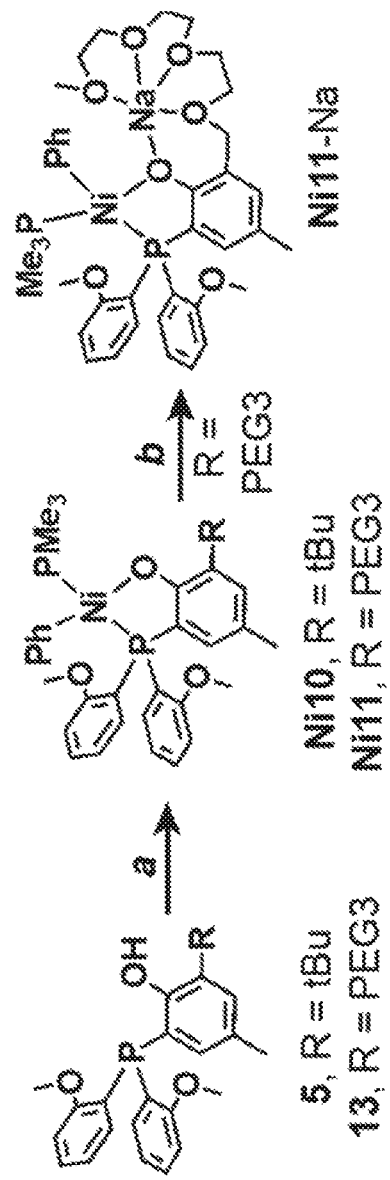
FIG. 11 shows a synthetic scheme, Scheme 2, for the synthesis of nickel phenoxyphosphine complexes, in accordance with preferred embodiments described herein.
Figure 12:
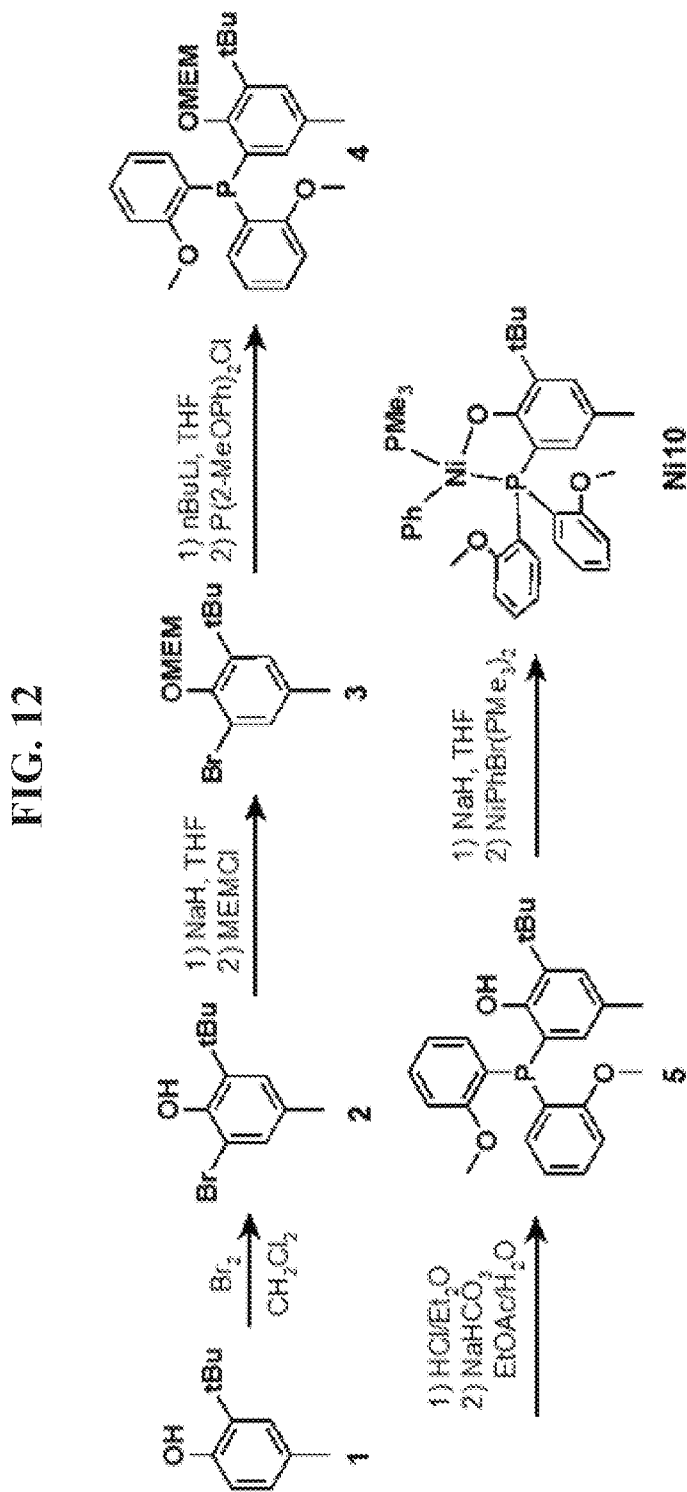
FIG. 12 shows steps in the synthesis of a reference complex Ni10.
Figure 13:
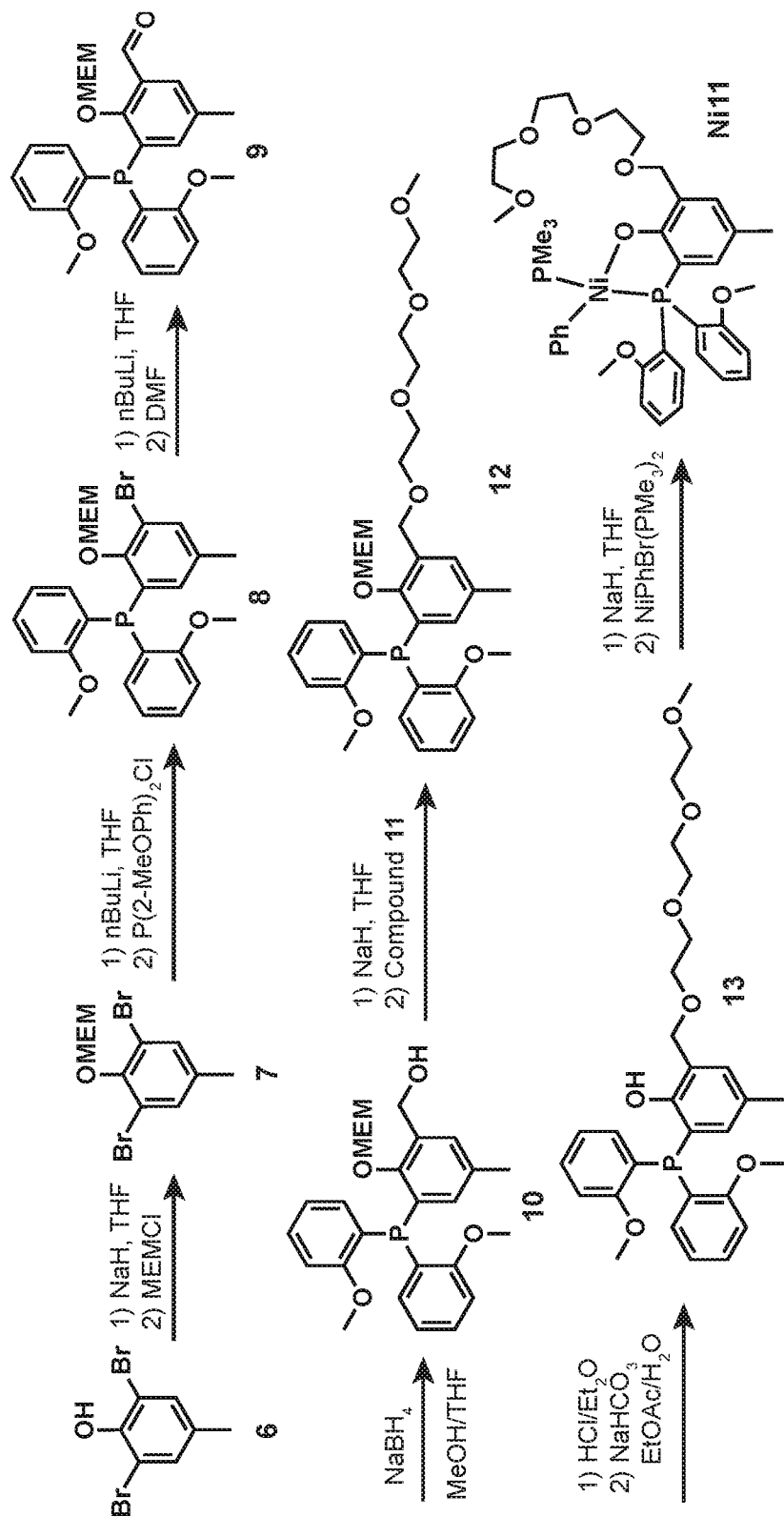
FIG. 13 shows steps in the synthesis of a reference complex Ni11.
Figure 14:
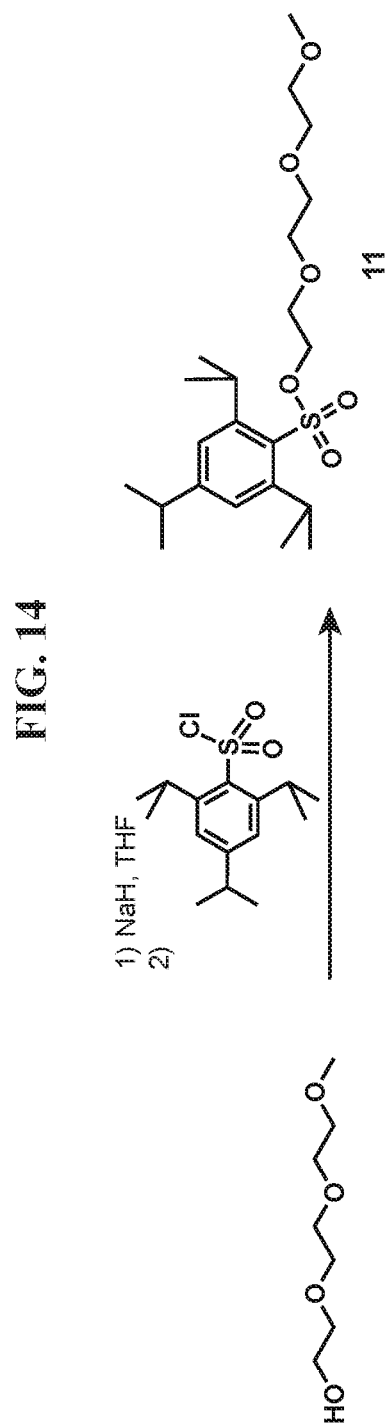
FIG. 14 shows steps in the synthesis of an intermediate compound.

FIG. 11 shows Scheme 2 for the synthesis of nickel phenoxyphosphine complexes. Step a: 1) NaH, THF, 2) NiPhBr(PMe₃)₂; Step b: NaBAr$^F_4$. PEG3=CH₂(OCH₂CH₂)₃OCH₃. The PEGylated ligand 13 was synthesized using a multi-step procedure outlined below. Metallation of 13 was achieved by deprotonation using sodium hydride, followed by the addition of NiPhBr(PMe₃)₂ to provide complex Ni11. As a standard catalyst, the conventional nickel phenoxyphosphine complex featuring ortho tert-butyl groups (Ni10) was also prepared. FIG. 12 shows steps in the synthesis of complex Ni10. FIG. 13 shows steps in the synthesis of complex Ni11. FIG. 14 shows steps in the synthesis of compound 11. More details are provided below.

Preparation of (P(2-MeOPh)₂Cl:

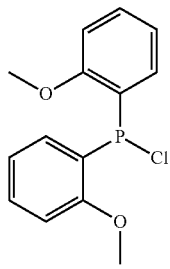 [SMILES: COc1ccccc1P(Cl)c1ccccc1OC]

A 200 mL Schlenk flask was charged with magnesium turnings (1.2 g, 50 mmol, 2.5 equiv.) under nitrogen in 50 mL of dry THF. The compound 2-bromoanisole (5.2 mL, 40 mmol, 2.0 equiv.) was added to the reaction mixture and then stirred at RT for 3 h until the solution turned dark gray. The resulting Grignard reagent was slowly cannula transferred over a period of 45 min to a solution of PCl₃ (1.6 mL, 20 mmol, 1.0 equiv.) in 100 mL of dry THF at −78° C. After the addition was complete, the heterogeneous mixture was continued stirring and allowed to warm up to RT overnight. Finally, the solvent was removed under vacuum and the crude product was used in the next step without further purification. ³¹P NMR (CDCl₃, 162 MHz): δ (ppm)=69.94 (s), 62.56 (s).

Preparation of Compound 2:

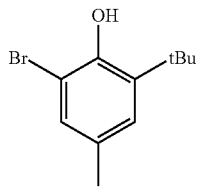

The compound 2-tert-butyl-4-cresol (6.73 g, 40.95 mmol, 1.05 equiv.) was dissolved in 100 mL of dry DCM in a 200 mL Schlenk flask. The flask was covered with aluminum foil and cooled to 0° C. Bromine (2 mL, 39 mmol, 1.00 equiv.) was added dropwise to the reaction flask and the mixture was allowed to warm to RT and stirred overnight. The reaction was quenched by the slow addition of cold H₂O (75 mL) and was then extracted into DCM (2×150 mL). The organic layers were combined, washed with aqueous NaHCO₃ (2×100 mL), H₂O (2×100 mL), dried over Na₂SO₄, filtered, and evaporated to dryness. The crude material was purified by silica gel column chromatography (20:1 hexane:ethyl acetate) to afford a white solid (9.50 g, 39.07 mmol, 95%). ¹H NMR (CDCl₃, 400 MHz): δ (ppm)= 7.16 (s, 1H), 7.01 (s, 1H), 5.64 (s, 1H), 2.26 (s, 3H), 1.40 (s, 9H). ¹³C NMR (CDCl₃, 101 MHz): δ (ppm)=148.21, 137.24, 130.30, 129.69, 127.46, 111.97, 35.36, 29.47, 20.68.

Preparation of Compound 3:

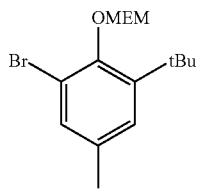

To a mixture of 2 (9.50 g, 39.07 mmol, 1.0 equiv.) in 100 mL of dry THF in a 200 mL Schlenk flask under nitrogen at −0° C., small aliquots of NaH (60%, 2.34 g, 58.6 mmol, 1.5 equiv.) were added and the mixture was stirred at RT for 2 h. The reagent 2-methoxyethoxymethyl chloride (MEMCl) (5.5 mL, 44.93 mmol, 1.15 equiv.) was added and the solution was stirred overnight. The reaction was quenched by the slow addition of H₂O and the product was extracted into Et₂O (2×150 mL). The organic layers were combined, washed with H₂O (2×75 mL), dried over Na₂SO₄, filtered, and evaporated to dryness. The crude material was purified by silica gel column chromatography (20:1 hexane:ethyl acetate) to afford a colorless oil (6.91 g, 20.86 mmol, 53%). ¹H NMR (CDCl₃, 400 MHz): δ (ppm)=7.22 (d, J$_{HH}$=1.8 Hz, 1H), 7.07 (d, J$_{HH}$=1.8 Hz, 1H), 5.27 (s, 2H), 4.05 (m, 2H), 3.65 (m, 2H), 3.41 (s, 3H), 2.26 (s, 3H), 1.40 (s, 9H). ¹³C NMR (CDCl₃, 101 MHz): δ (ppm)=150.46, 145.06, 134.56, 132.14, 127.69, 117.74, 98.21, 71.72, 69.45, 59.18, 35.65, 30.94, 20.83. HRMS-ESI(+): Calc. for C₁₅H₂₃BrO₃[M+Na]⁺=353.0728, Found=353.0853.

Preparation of Compound 4:

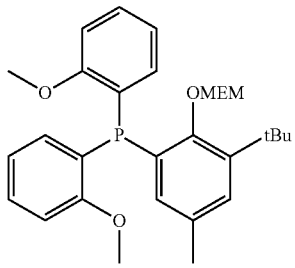

To a solution of compound 3 (6.62 g, 20 mmol, 1.0 equiv.) in 50 mL of dry THF in a 100 mL Schlenk flask under nitrogen at −78° C., nBuLi (1.6 M in hexanes, 12.8 mL, 20.5 mmol, 1.02 equiv.) was added dropwise using a syringe pump. The reaction mixture was stirred at −78° C. for 40 min A solution of P(2-MeOPh)₂Cl (5.05 g, 18 mmol, 0.9 equiv.) in 50 mL of dry THF was cannula transferred into the reaction mixture and stirred for another 40 min. The reaction was quenched by the slow addition of H₂O and the product was extracted into Et₂O (3×75 mL). The organic layers were combined, washed with H₂O (2×50 mL), dried over Na₂SO₄, filtered, and evaporated to dryness. The crude material was purified by silica gel column chromatography (4:1 hexane:ethyl acetate) to afford a colorless oil (4.02 g, 8.09 mmol, 40%). This compound was used directly in the next step without further purification.

Preparation of Compound 5:

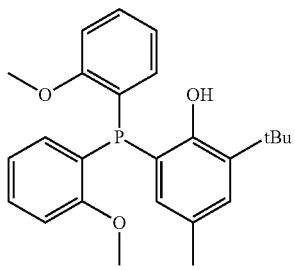 [SMILES: COc1ccccc1P(c1ccccc1OC)c1cc(C)cc(C(C)(C)C)c1O]

Compound 4 (1.24 g, 2.5 mmol, 1.0 equiv.) was dissolved in 100 mL of MeOH and then 10 mL solution of 2 M HCl in Et₂O was added. The reaction mixture was stirred at RT overnight and then dried to remove solvent. The product was dissolved in 200 mL of EtOAc along and then combined with 50 mL of 1 M aqueous NaHCO₃. The mixture was stirred at RT for 30 min and the product was extracted into Et₂O (2×100 mL). The organic layers were combined, washed with H₂O (2×100 mL), dried over Na₂SO₄, filtered, and evaporated to dryness. The crude material was purified by silica gel column chromatography (4:5 hexane:ethyl acetate) to afford a white solid (0.69 g, 1.68 mmol, 67%). ¹H NMR (CDCl₃, 500 MHz): δ (ppm)=7.40 (d, $J_{HH}$=11.5 Hz, 1H), 7.19 (ddd, $J_{HH}$=7.4, 5.6, 1.7 Hz, 2H), 7.13 (d, $J_{HH}$=1.8 Hz, 1H), 7.02 (td, $J_{HH}$=8.1, 1.5 Hz, 2H), 6.97 (dd, $J_{HH}$=5.4, 1.6 Hz, 1H), 6.70 (t, $J_{HH}$=7.5 Hz, 2H), 6.37 (dd, $J_{HH}$=8.1, 5.1 Hz, 2H), 3.07 (s, 6H), 1.92 (s, 3H), 1.51 (s, 9H). ¹³C NMR (CDCl₃, 100 MHz): δ (ppm)=161.04 (d, $J_{CP}$=15.1 Hz), 156.56 (d, $J_{CP}$=19.7 Hz), 135.36, 133.23, 133.0.3 (d, $J_{CP}$=3.2 Hz), 130.24, 129.53, 128.42, 123.09 (d, $J_{CP}$=2.8 Hz), 120.96, 119.28, 110.30, 55.71, 34.79, 29.54, 20.88. ³¹P NMR (CDCl₃, 162 MHz): δ (ppm)=−51.71. HRMS-ESI(+): Calc. for C₂₅H₂₉O₃P [M+Na]⁺=431.1752, Found=431.1887.

Preparation of Compound 7:

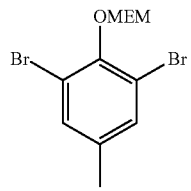

Solid 2,6-dibromo-4-methylphenol (6.65 g, 25 mmol, 1.0 equiv.) was dissolved in 100 mL of dry THF in a Schlenk flask under nitrogen and cooled to 0° C. Small aliquots of NaH (60%, 1.48 g, 37 mmol, 1.5 equiv.) were added and the mixture was stirred at room temperature for 1 h. The reagent 2-methoxyethoxymethyl chloride (MEMCl) was added and the resulting solution was stirred overnight. The reaction was quenched by the slow addition of H₂O and the products were extracted into Et₂O (2×100 mL). The organic layers were combined, washed with H₂O (2×50 mL), dried over Na₂SO₄, filtered, and evaporated to dryness. The crude material was purified by silica gel column chromatography (2:1 hexane:ethyl acetate) to afford a clear oil (7.66 g, 21.64 mmol, 86%). ¹H NMR (CDCl₃, 500 MHz): δ (ppm)=7.29 (s, 2H), 5.20 (s, 2H), 4.08 (m, 2H), 3.61 (m, 2H), 3.38 (s, 3H), 2.24 (s, 3H). ¹³C NMR (CDCl₃, 126 MHz): δ (ppm)=149.04, 136.91, 133.35, 117.97, 98.36, 71.77, 69.89, 59.19, 20.29. HRMS-ESI(+): Calc. for C₁₁H₁₄Br₂O₃[M+Na]⁺=374.9202, Found=374.9332.

Preparation of Compound 8:

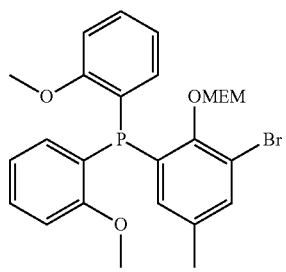

To a solution of 7 (7.08 g, 20 mmol, 1.0 equiv.) in 50 mL of dry THF in a Schlenk flask under nitrogen at −78° C., nBuLi (1.6 M in hexanes, 12.8 mL, 20.5 mmol, 1.02 equiv.) was added dropwise using a syringe pump. The reaction mixture was then stirred at −78° C. for 40 min. A solution of P(2-MeOPh)₂Cl (5.05 g, 18 mmol, 0.9 equiv.) in 50 mL of dry THF was cannula transferred to the reaction mixture and stirred for another 40 min. The reaction was quenched by the slow addition of H₂O and the products were extracted into Et₂O (3×75 mL). The organic layers were combined, washed with H₂O (2×50 mL), dried over Na₂SO₄, filtered, and evaporated to dryness. The crude material was purified by silica gel column chromatography (3:1 hexane:ethyl acetate) to afford a colorless oil (6.82 g, 13.16 mmol, 73%). ¹H NMR (CDCl₃, 500 MHz): δ (ppm)=7.36 (s, 1H), 7.32 (t, $J_{HH}$=7.5 Hz, 2H), 6.86 (m, 3H), 6.83 (d, $J_{HH}$=5.2 Hz, 1H), 6.63 (m, 2H), 6.49 (m, 1H), 5.30 (s, 2H), 4.02 (t, $J_{HH}$=4.8 Hz, 2H), 3.72 (s, 6H), 3.52 (t, $J_{HH}$=4.5 Hz, 2H), 3.34 (s, 3H), 2.12 (s, 3H). ¹³C NMR (CDCl₃, 126 MHz): δ (ppm)=161.33 (d, $J_{CP}$=16.5 Hz), 161.20 (d, $J_{CP}$=20.9), 154.24, 154.07, 135.61, 134.78, 134.50, 133.86, 132.94 (d, $J_{CP}$=17.4 Hz), 132.81, 130.34, 124.31, 124.20 (d, $J_{CP}$=13.7 Hz), 121.18, 117.34, 117.32, 110.22, 98.75 (d, $J_{CP}$=9.4 Hz), 98.68, 71.81, 69.52 (d, $J_{CP}$=4.3 Hz), 59.07, 55.75, 20.66. ³¹P NMR (CDCl₃, 162 MHz): δ (ppm)=−35.90. HRMS-ESI(+): Calc. for C₂₅H₃₀BrO₅P [M+Na]⁺=541.0750, Found=541.0940.

Preparation of Compound 9:

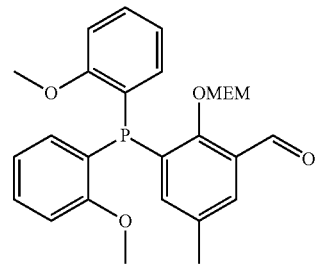

To a solution of 8 (6 g, 11.58 mmol, 1.0 equiv.) in 50 mL of dry THF in a Schlenk flask under nitrogen at −78° C., nBuLi (1.6 M in hexanes, 8.4 mL, 13.44 mmol, 1.16 equiv.) was added dropwise using a syringe pump. The reaction mixture was stirred at −78° C. for 40 min. Dry DMF (5 mL, 65 mmol, 5.6 equiv.) was added to the reaction mixture and stirred for another 40 min. The reaction was quenched by the slow addition of H₂O and the product was extracted into Et₂O (3×75 mL). The organic layers were combined, washed with H₂O (2×50 mL), dried over Na₂SO₄, filtered, and evaporated to dryness. The crude material was purified by silica gel column chromatography (3:2 hexane:ethyl acetate) to afford a light yellow oil (4.67 g, 9.98 mmol, 86%). This compound was used directly in the next step without further purification.

Preparation of Compound 10:

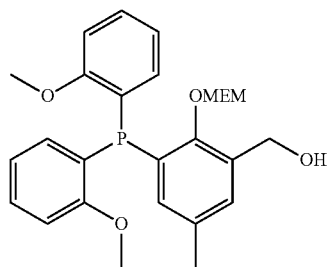

Compound 9 (4.67 g, 9.98 mmol, 1.0 equiv.) was dissolved in 400 mL of MeOH and 80 mL of THF. Small aliquots of NaBH$_4$ (2 g, 54 mmol, 5.4 equiv.) were added and the mixture was stirred at RT overnight. The reaction solvent was removed under vacuum and the residue was redissolved in Et$_2$O (100 mL). The ether layer was washed with H$_2$O (2×100 mL), dried over Na$_2$SO$_4$, filtered, and evaporated to dryness. The crude material was purified by silica gel column chromatography (1:3 hexane:ethyl acetate) to afford a white solid (3.8 g, 8.08 mmol, 81%). $^1$H NMR (CDCl$_3$, 600 MHz): δ (ppm)=7.33 (t, J$_{HH}$=7.6 Hz, 2H), 7.20, (s, 1H), 6.87 (dd, J$_{HH}$=8.4, 5.5 Hz, 2H), 6.84 (t, J$_{HH}$=7.4 Hz, 2H), 6.62 (m, 2H), 6.51 (m, 1H), 5.29 (s, 2H), 4.62 (s, 2H), 3.88 (m, 2H), 3.72 (s, 6H), 3.57 (m, 2H), 3.36 (s, 3H), 2.14 (s, 3H). $^{13}$C NMR (CDCl$_3$, 126 MHz): δ (ppm)=161.21 (d, J$_{CP}$=16.6 Hz), 157.74 (d, J$_{CP}$=20.6 Hz), 135.24, 134.73, 134.37, 133.78, 132.59, 130.25, 129.79 (d, J$_{CP}$=12.2 Hz), 124.29 (d, J$_{CP}$=12.3 Hz), 121.08, 110.15, 99.92 (d, J$_{CP}$=13.1 Hz), 71.50, 69.16, 61.02, 59.11, 55.74, 20.94. $^{31}$P NMR (CDCl$_3$, 162 MHz): δ (ppm)=−38.50. HRMS-ESI(+): Calc. for C$_{14}$H$_{20}$O$_6$[M+Na]$^+$=493.1751, Found=493.1925.

Preparation of Compound 11:

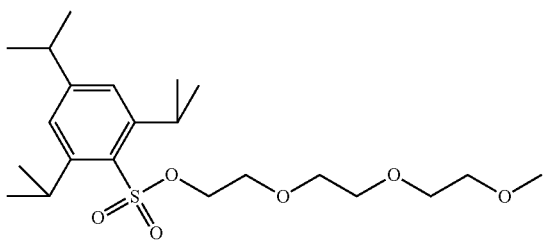 [SMILES: COCCOCCOCCOS(=O)(=O)c1c(C(C)C)cc(C(C)C)cc1C(C)C]

Triethylene glycol monomethyl ether (2.63 g, 16 mmol, 1.0 equiv.) was dissolved in 100 mL of dry THF in a Schlenk flask under nitrogen and cooled to 0° C. Small aliquots of NaH (60%, 1 g, 25 mmol, 1.56 equiv.) were added and the mixture was stirred at RT for 1 h. The reagent 2,4,6-triisopropylbenzenesulfonyl chloride (6.1 g, 20 mmol, 1.25 equiv.) was added and the solution was stirred overnight. The reaction was quenched by the slow addition of H$_2$O and the product was extracted into Et$_2$O (2×100 mL). The organic layers were combined, washed with H$_2$O (3×50 mL), dried over Na$_2$SO$_4$, filtered, and evaporated to dryness. The crude material was purified by silica gel column chromatography (5:1 hexane:ethyl acetate to 1:3 hexane:ethyl acetate) to afford a colorless oil (5.14 g, 11.95 mmol, 75%). $^1$H NMR (CDCl$_3$, 500 MHz): δ (ppm)=7.16 (s, 2H), 4.14 (m, 4H), 3.71 (t, J$_{HH}$=4.8 Hz, 2H), 3.59 (m, 6H), 3.50 (m, 2H), 3.34 (s, 3H), 2.89 (sep, J$_{HH}$=6.9 Hz, 1H), 1.24 (m, 18H). $^{13}$C NMR (CDCl$_3$, 126 MHz): δ (ppm)=153.77, 150.93, 129.35, 123.84, 71.96, 70.78, 70.64, 68.87, 68.22, 59.12, 34.34, 29.67, 24.80, 23.65. HRMS-ESI(+): Calc. for C$_{22}$H$_{38}$O$_6$S [M+Na]$^+$=453.2287, Found=453.2442.

Preparation of Compound 12:

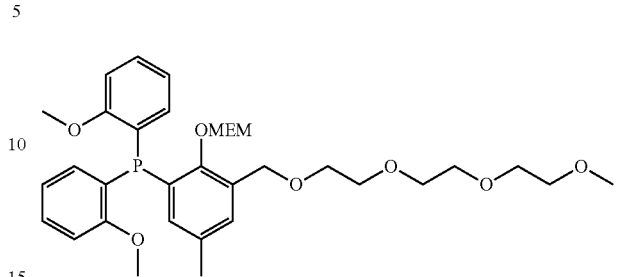

To a mixture of 11 (3.8 g, 8.08 mmol, 1 equiv.) in 100 mL of dry THF in a Schlenk flask under nitrogen at −0° C., small aliquots of NaH (60%, 1.3 g, 32.4 mmol, 4 equiv.) was added. The reaction mixture stirred at RT for 1 h. A solution of compound 11 (5.23 g, 12.15 mmol, 1.5 equiv.) in 50 mL of THF was cannula transferred into the reaction mixture and then stirred at RT overnight. The reaction was quenched by the slow addition of cold H$_2$O and the product was extracted into Et$_2$O (3×100 mL). The organic layers were combined, washed with H$_2$O (2×75 mL), dried over Na$_2$SO$_4$, filtered, and evaporated to dryness. The crude material was purified by silica gel column chromatography (1:1 hexane: ethyl acetate to 1:4 hexane:ethyl acetate) to afford a colorless oil (3.95 g, 6.07 mmol, 75%). This compound was used directly in the next step without further purification.

Preparation of Compound 13:

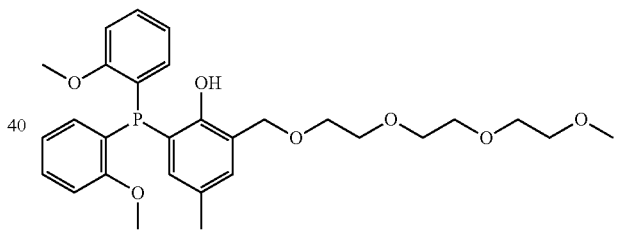

Compound 12 (3.95 g, 6.07 mmol, 1 equiv.) was dissolved in 100 mL of MeOH and then treated with 10 mL of 2 M HCl in Et$_2$O. The reaction mixture was stirred at RT overnight. The solvent was removed under vacuum and the product was dissolved in 200 mL of EtOAc. A 50 mL solution of 1 M NaHCO$_3$ in H$_2$O was then added. The mixture was stirred at RT for 30 min and the product was extracted into Et$_2$O (2×100 mL). The organic layers were combined, washed with H$_2$O (2×100 mL), dried over Na$_2$SO$_4$, filtered, and evaporated to dryness. The crude material was purified by silica gel column chromatography (1:3 hexane:ethyl acetate) to afford a white waxy solid (2.9 g, 5.49 mmol, 90%). $^1$H NMR (CDCl$_3$, 500 MHz): δ (ppm)=7.32 (td, J$_{HH}$=7.7, 1.5 Hz, 2H), 7.23 (d, J$_{HH}$=1 Hz, 1H), 6.97 (d, J$_{HH}$=1.7 Hz, 1H), 6.85 (m, 4H), 6.77 (m, 2H), 6.52 (m, J$_{HH}$=5.1, 1.9 Hz, 1H), 4.66 (s, 2H), 3.73 (s, 6H), 3.68 (m, 2H), 3.66 (m, 2H), 3.60 (m, 2H), 3.58 (m, 4H), 3.49 (m, 2H), 3.35 (s, 3H), 2.11 (s, 3H). $^{13}$C NMR (CDCl$_3$, 126 MHz): δ (ppm)=161.53 (d, J$_{CP}$=26.8 Hz), 161.40 (d, J$_{CP}$=5.5 Hz), 155.96 (d, J$_{CP}$=29.7 Hz), 155.87, 134.34, 133.74 (d, J$_{CP}$=6.6 Hz), 130.62, 130.22, 129.04 (d, J$_{CP}$=9.6 Hz), 123.91, 122.57 (d, J$_{CP}$=6.1 Hz), 121.04, 110.32, 71.98, 70.99, 70.76, 70.61, 70.40, 69.73, 59.11, 55.81, 20.71. $^{31}$P NMR (CDCl$_3$, 162 MHz): δ (ppm)=−44.09. HRMS-ESI(+): Calc. for C$_{29}$H$_{39}$O$_7$P [M+Na]$^+$=551.2175, Found=551.2362.

Preparation of Complex NiPhBr(PMe)$_2$:

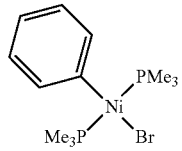

Inside the glovebox, Ni[COD]$_2$ (1.10 g, 4 mmol, 1 equiv.) and PMe$_3$ (1 M in THF, 10 mL, 10 mmol, 2.5 equiv.) were dissolved in 50 mL of dry Et$_2$O. PhBr (0.94 g, 6.0 mmol, 1.5 equiv.) was added and the reaction mixture was stirred at RT for 6 h. The solution was filtered to remove a black solid and the filtrate was then dried completely under vacuum. The crude material was washed with cold Et$_2$O (−30° C., 4×4 mL) to afford a bright orange solid (1.02 g, 3.17 mmol, 79%). $^1$H NMR (C$_6$D$_6$, 500 MHz): δ (ppm)=7.28 (dd, $J_{HH}$=7.7, 1.1 Hz, 2H), 6.91 (t, $J_{HH}$=7.5 Hz, 2H), 6.75 (m, 1H), 0.78 (t, $J_{HH}$=3.9 Hz, 18H). $^{31}$P NMR (C$_6$D$_6$, 202 MHz): δ (ppm)=−14.78.

Preparation of Complex Ni10:

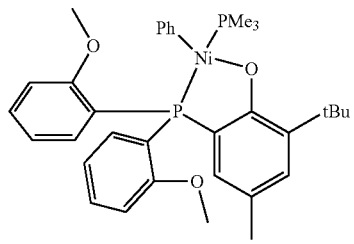

Inside the glovebox, ligand 15 (0.164 g, 0.4 mmol, 1.0 equiv.) was dissolved in 10 mL of THF. Small aliquots of NaH (60%, 0.32 g, 0.8 mmol, 2.0 equiv.) were added and the mixture was stirred at RT for 2 h. The solution was filtered to remove excess NaH and then combined with a solution of NiPhBr(PMe$_3$)$_2$ (0.122 g, 0.38 mmol, 0.95 equiv.) in 5 mL of benzene. The resulting mixture was stirred at RT overnight. The precipitate formed was removed by filtration and the filtrate was dried under vacuum. The crude material was dissolved in a mixture of 15 mL of pentane and 2 mL of toluene and the solution was filtered once again before evaporating to dryness. Finally, the resulting solid was washed with pentane (3×2 mL) and dried under vacuum to afford a yellow powder (0.11 g, 0.17 mmol, 45%). $^1$H NMR (C$_6$D$_6$, 500 MHz): δ (ppm)=7.56 (ddd, $J_{HH}$=11.1, 7.5, 1.3 Hz, 2H), 7.23 (d, $J_{HH}$=7.5 Hz, 2H), 7.14 (d, $J_{HH}$=2.0 Hz, 1H), 7.04-6.98 (m, 2H), 6.97-6.92 (m, 1H), 6.71 (t, $J_{HH}$=7.4 Hz, 2H), 6.63 (t, $J_{HH}$=7.5 Hz, 2H), 6.58 (d, $J_{HH}$=7.3 Hz, 1H), 6.38 (dd, $J_{HH}$=8.1, 4.4 Hz, 2H), 2.98 (s, 6H), 2.04 (s, 3H), 1.69 (s, 9H), 0.81 (d, $J_{HH}$=8.8 Hz, 9H). $^{13}$C NMR (C$_6$D$_6$, 152 MHz): δ (ppm)=174.11 (d, $J_{CP}$=26.3 Hz), 160.74 (d, $J_{CP}$=5.5 Hz), 150.92 (d, $J_{CP}$=32.6 Hz), 137.70 (d, $J_{CP}$=9 Hz), 137.09 (d, $J_{CP}$=2.8 Hz), 133.99 (d, $J_{CP}$=5.4 Hz), 130.85, 130.72, 130.47, 125.22, 121.86 (d, $J_{CP}$=6.8 Hz), 120.47 (d, $J_{CP}$=8.3 Hz), 120.29, 119.86, 118.69, 118.20, 110.66 (d, $J_{CP}$=4.4 Hz), 54.88, 35.13, 29.54, 20.60, 12.47 (d, $J_{CP}$=23.8 Hz). $^{31}$P NMR (C$_6$D$_6$, 202 MHz): δ (ppm)=15.08 (d, $J_{PP}$=320.9 Hz), −13.64 (d, $J_{PP}$=320.7 Hz). Anal. Calcd for C$_{34}$H$_{42}$NiO$_3$P$_2$: C, 65.94; H, 6.84. Found: 65.68; 6.99.

Preparation of Complex Ni11:

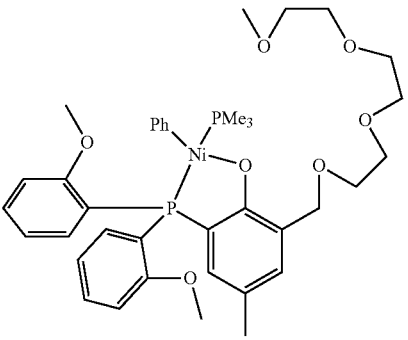

Inside the glovebox, ligand 13 (1.12 g, 2.11 mmol, 1.0 equiv.) was dissolved in 50 mL of dry THF. Small aliquots of NaH (60%, 0.17 g, 4.22 mmol, 2.0 equiv.) were added and the mixture was stirred at RT for 2 h. The mixture was filtered to remove excess NaH and then a solution of NiPhBr(PMe$_3$)$_2$ (0.65 g, 2.02 mmol, 0.96 equiv.) in 20 mL of benzene was added. The resulting mixture was stirred at RT overnight. The next day, the solution was filtered to remove the precipitate and the filtrate was dried completely under vacuum. The crude material was dissolved in a mixture of 40 mL of pentane and 4 mL of benzene. Another filtration was performed to remove the precipitate and the filtrate was dried once again. Finally, the resulting solid was washed with pentane (3×5 mL) and dried to under vacuum to afford a yellow powder (1.12 g, 1.51 mmol, 75%). $^1$H NMR (C$_6$D$_6$, 500 MHz): δ (ppm)=7.64 (m, 2H), 7.37 (d, $J_{HH}$=1.7 Hz, 1H), 7.24 (d, $J_{HH}$=7.7 Hz, 2H), 7.06 (dd, $J_{HH}$=8.0, 4.4 Hz, 1H), 7.02 (m, 2H), 6.74 (t, $J_{HH}$=7.4 Hz, 2H), 6.66 (t, $J_{HH}$=7.5 Hz, 2H), 6.61 (m, 1H), 4.87 (s, 2H), 3.74 (m, 2H), 3.60 (m, 2H), 3.50 (m, 2H), 3.44 (m, 4H), 3.30 (m, 2H), 3.07 (s, 3H), 2.95 (s, 6H), 2.03 (s, 3H), 0.81 (d, 9H). $^{13}$C NMR (C$_6$D$_6$, 152 MHz): δ (ppm)=173.39 (d, $J_{CP}$=26.8 Hz), 160.77 (d, $J_{CP}$=4.8 Hz), 150.91 (d, $J_{CP}$=29.7 Hz), 137.05, 133.93 (d, $J_{CP}$=6.3 Hz), 132.86, 131.74, 131.00, 127.16 (d, $J_{CP}$=9.5 Hz), 125.22, 120.46, 120.39, 120.31, 120.07, 119.71, 117.92, 117.54, 110.52 (d, $J_{CP}$=3.8 Hz), 72.09, 70.99, 70.85, 70.80, 70.63, 69.89, 69.82, 58.42, 54.81, 20.45, 11.50 (d, $J_{CP}$=24.7 Hz). $^{31}$P NMR (C$_6$D$_6$, 202 MHz): δ (ppm)=13.74 ($J_{PP}$=319.5 Hz), −12.74 ($J_{PP}$=318.1 Hz). Anal. Calcd for C$_{38}$H$_{52}$NiO$_7$P$_2$: C, 61.72; H, 6.82. Found: 61.63; 6.96.

EXAMPLE 7. METAL-BINDING STUDIES

UV-Vis Absorption Spectroscopy: Metal Titration. To determine whether Na$^+$ can coordinate to Ni11, metal titration studies were carried out by UV-visible absorption spectroscopy. Stock solutions of Ni11 and NaBAr$^F_4$ were prepared inside an inert nitrogen-filled glovebox. A 500 μM stock solution of Ni11 were obtained by dissolving 25 μmol of Ni11 in 50 mL of Et$_2$O. A 10 mL aliquot of this 500 μM solution was diluted to 50 mL using a volumetric flask to give a final concentration of 100 μM. The 3.0 mM stock solution of NaBAr$^F_4$ was obtained by dissolving 30 μmol of NaBAr$^F_4$ in 10 mL of Et$_2$O using a volumetric flask. A 3.0 mL solution of Ni11 was transferred to a 1 cm quartz cuvette and then sealed with a septum screw cap. A 100 μL airtight syringe was loaded with the 3.0 mM solution of NaBAr$^F_4$.

The cuvette was placed inside a UV-vis spectrophotometer and the spectrum of the Ni11 solution was recorded. Aliquots containing 0.1 equiv. of NaBAr$^F_4$ (10 μL), relative to the nickel complex, were added and the solution was allowed to reach equilibrium before the spectra were measured (about 20-30 min). The titration experiments were stopped after the addition of up to 1.0 equiv. of NaBAr$^F_4$.

Figure 15:
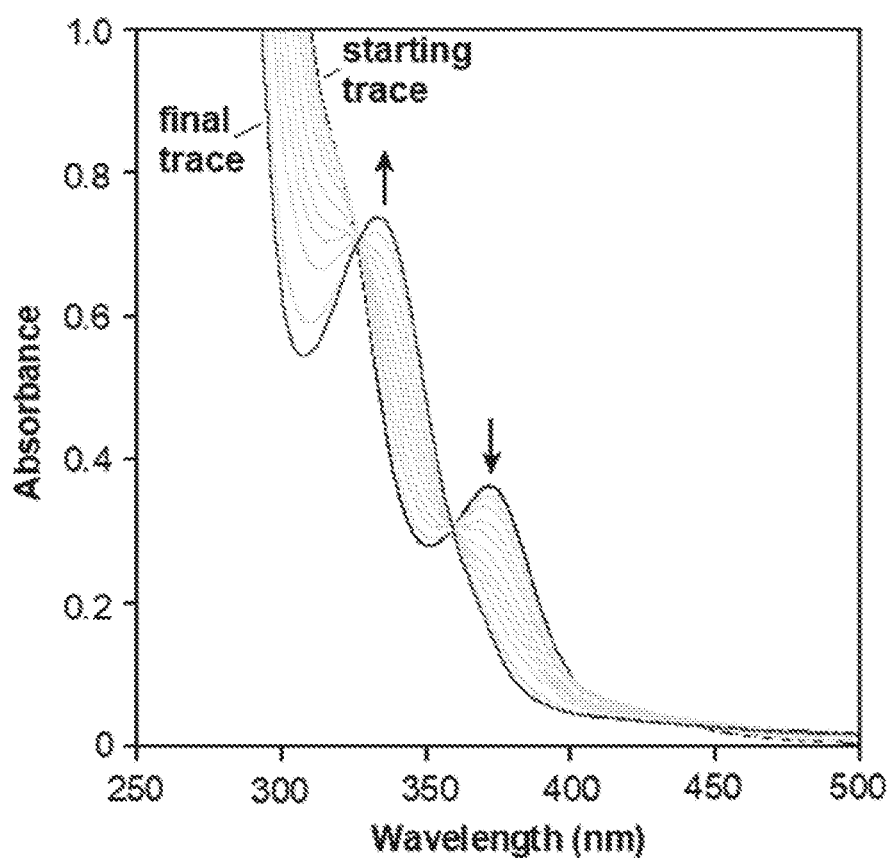
FIG. 15 shows UV-vis absorbance spectra of the addition of NaBAr$^F_4$ to Ni11.

FIG. 15 shows UV-vis absorbance spectra of complex Ni11 (100 μM in Et$_2$O) after the addition of various aliquots of NaBAr$^F_4$. The starting trace of Ni11 is shown with the final trace (+1.0 equiv. of Na$^+$ relative to Ni). When aliquots of NaBAr$^F_4$ (where BAr$^F_4-$=tetrakis(3,5-bis(trifluoromethyl)phenyl)borate) were added to a solution of Ni11 in Et$_2$O, the optical band at ~370 nm gradually decreased while the optical band at ~330 nm increased. The appearance of isosbestic points at 326 and 359 nm suggests that the addition of Na$^+$ to Ni11 led to the formation of a new optically active species.

UV-Vis Absorption Spectroscopy: Job Plot Studies. Stock solutions of Ni11 (500 μM) and NaBAr$^F_4$ (500 μM) in Et$_2$O were prepared in separate volumetric flasks inside the drybox. Stock solutions of Ni11 and NaBAr$^F_4$ were combined in different ratios to give 10 different samples, each having a final volume of 3.0 mL. The samples were recorded by UV-vis absorption spectroscopy at RT. The UV-vis spectral data were analyzed according to a method previously reported. In this case, the host (H) was Ni11, the guest (g) was Na$^+$, and the complex (C) was Ni11-Na. Since the sodium salt has no absorption in the 300-500 nm range, this simplified expression was used to analyze the data: $A_{obs}-\varepsilon_h\cdot[H]_t=(\varepsilon_C-a\cdot\varepsilon_h)\cdot[C]$, where $A_{obs}$=observed absorbance, a=constant, $\varepsilon_h$=molar absorptivity of host Ni11, $\varepsilon_C$=molar absorptivity of Ni11-Na, $[H]_t$=starting concentration of host Ni11, and [C]=observed concentration of Ni11-Na. Since [C] is proportional to $A_{obs}-\varepsilon_h\cdot[H]_t$, a Job Plot was constructed by plotting $A_{obs}-\varepsilon_h\cdot[H]_t$ vs. $\chi_{Ni}$ (the mole ratio of Ni11=[Ni11]/([Ni11]+[Na$^+$])). Table 9 below shows the data and calculations used for the Job Plot.

TABLE 9

Data and Calculations Used for Job Plot

| $\chi^{Ni}$ | Volume of Stock Soln of H (mL) | Amount of H Added (mol) | Final Conc. of H (M) | $A_h$ (calculated) | $A_{obs}$ (@330 nm) | $A_{obs} - A_h$ |
|---|---|---|---|---|---|---|
| 1.0 | 3.000E−03 | 1.500E−06 | 5.000E−04 | 2.663E+00 | 2.663E+00 | −2.040E−04 |
| 0.9 | 2.700E−03 | 1.350E−06 | 4.500E−04 | 2.396E+00 | 2.350E+00 | 4.576E−02 |
| 0.8 | 2.400E−03 | 1.200E−06 | 4.000E−04 | 2.130E+00 | 1.966E+00 | 1.637E−01 |
| 0.7 | 2.100E−03 | 1.050E−06 | 3.500E−04 | 1.864E+00 | 1.653E+00 | 2.108E−01 |
| 0.6 | 1.800E−03 | 9.000E−07 | 3.000E−04 | 1.598E+00 | 1.308E+00 | 2.896E−01 |
| 0.5 | 1.500E−03 | 7.500E−07 | 2.500E−04 | 1.331E+00 | 1.008E+00 | 3.234E−01 |
| 0.4 | 1.200E−03 | 6.000E−07 | 2.000E−04 | 1.065E+00 | 8.275E−01 | 2.375E−01 |
| 0.3 | 9.000E−04 | 4.500E−07 | 1.500E−04 | 7.988E−01 | 6.497E−01 | 1.491E−01 |
| 0.2 | 6.000E−04 | 3.000E−07 | 1.000E−04 | 5.325E−01 | 4.393E−01 | 9.315E−02 |
| 0.1 | 3.000E−04 | 1.500E−07 | 5.000E−05 | 2.663E−01 | 2.714E−01 | −5.174E−03 |

In Table 9, the molar absorptivity of H ($\varepsilon_h$) at 330 nm=5325 M$^{-1}$cm$^{-1}$. Stock solution of H was 500 μM.

Figure 16:
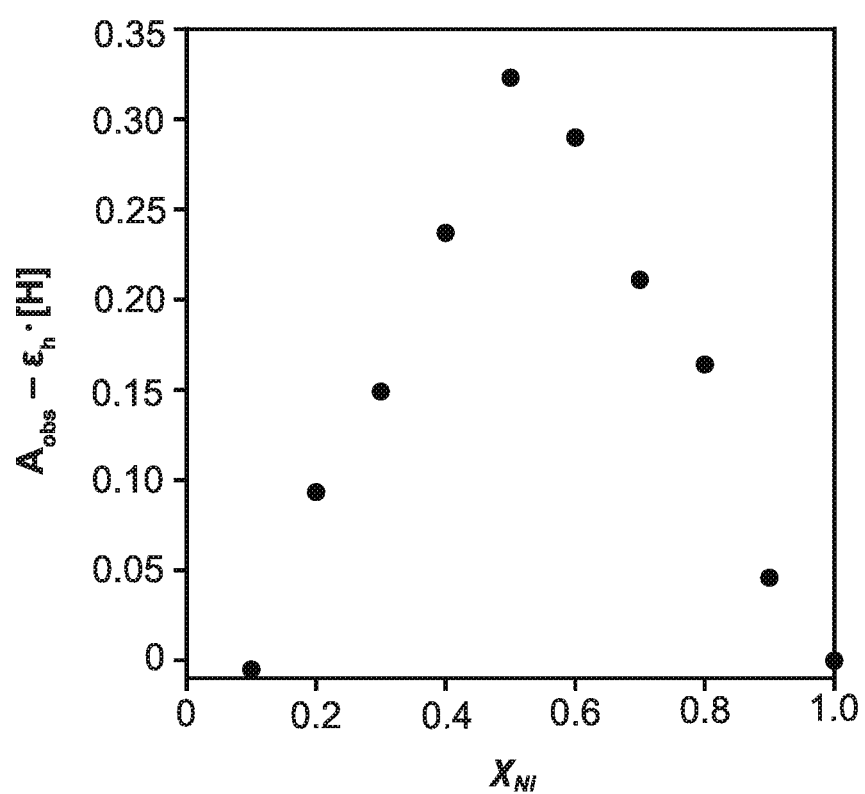
FIG. 16 is a Job Plot showing the coordination interactions between complex Ni11 and NaBAr$^F_4$.

FIG. 16 is a Job Plot showing the coordination interactions between complex Ni11 and NaBAr$^F_4$. The peak maximum occurs at $\chi_{Ni}$=0.5, which suggests that the optimal nickel:sodium binding stoichiometry is 1:1. The y-axis value $(A_{obs}-\varepsilon_h\cdot[H]_t)$ is proportional to the concentration of the nickel-sodium complex Ni11-Na. The x-axis is the molar ratio of nickel ($\chi_{Ni}$=[Ni11]/([Ni11]+[Na$^+$])).

EXAMPLE 8. STRUCTURAL CHARACTERIZATION

Figure 17A:
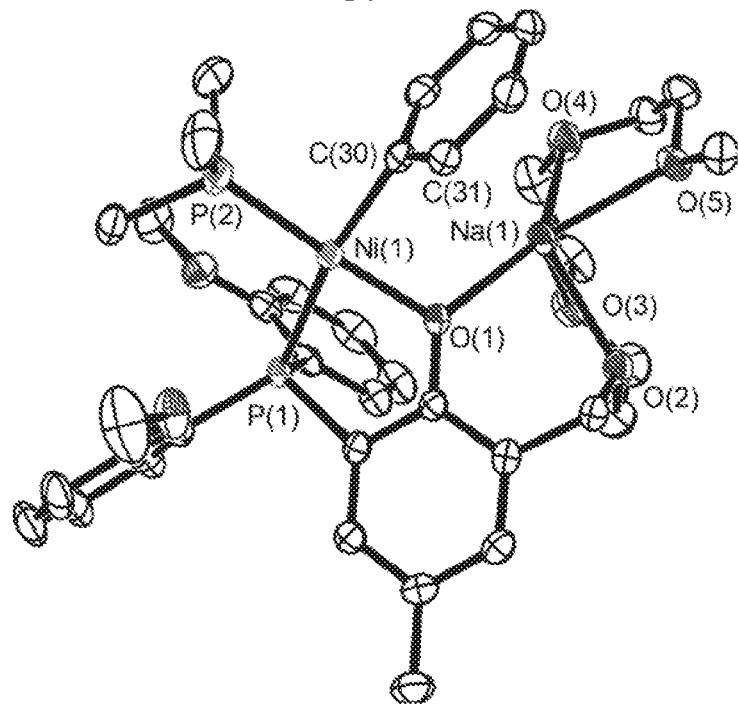
FIG. 17A shows the X-ray structure of a representative complex Ni11-Na, in accordance with preferred embodiments described herein.
Figure 17B:
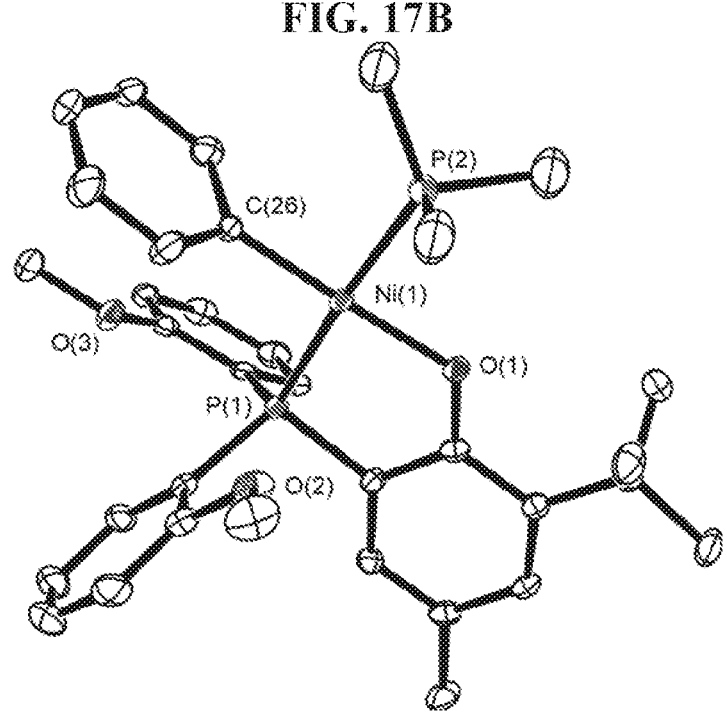
FIG. 17B shows the X-ray structure of a reference complex Ni11.

To obtain structural characterization, single crystals of the nickel-sodium complex were grown by layering pentane over a toluene/Et$_2$O solution of Ni11 and NaBAr$^F_4$ (1:1). Single crystals suitable for X-ray diffraction studies were picked out of the crystallization vials and mounted onto Mitogen loops using Paratone oil. The crystals were collected at a 6.0 cm detector distance at −150° C. on a Brucker Apex II diffractometer using Mo Kα radiation (λ=0.71073 Å). The structures were solved by direct methods using the program SHELXT and refined by SHELXLE. Hydrogen atoms connected to carbon were placed at idealized positions using standard riding models and refined isotropically. All non-hydrogen atoms were refined anisoptriocally. FIG. 17A shows the X-ray structure of complex Ni11-Na (ORTEP view, displacement ellipsoids drawn at 50% probability level). Hydrogen atoms and the BAr$^F_4-$ anion were omitted for clarity. Its X-ray structure revealed a heterobimetallic complex with the composition NiNa(phenoxyphosphine-PEG)Ph(PMe$_3$). The nickel centre is four-coordinate, in which the phenyl group is coordinated trans relative to the phosphorus donor P(1). Presumably, this orientation is preferred due to metal-π interactions between the adjacent sodium ion and phenyl ring (C(30)-C(31)). The sodium is ligated by four PEG oxygen atoms and a phenolate donor. Although complex Ni11 itself could not be crystallized for X-ray diffraction analysis, the structure of the related mononickel Ni10 in FIG. 17B shows that the nickel centre is square planar but the coordinated phenyl group is cis relative to P(1). Crystals of complex Ni10 were grown by layering of pentane into a solution of the complex in toluene at −30° C. The three methyl carbons (C32-C34) attached to the phosphine atom were refined in two parts due to positional disorder. The solvent molecule pentane was refined successfully without the use of any structural restraints. Interestingly, when a solution of Ni10 in Et$_2$O was treated with up to 4 equiv. of NaBAr$^F_4$, no UV-visible absorption changes were observed, indicating that there are no coordination interactions between complex Ni10 and Na$^+$.

EXAMPLE 9. POLYMERIZATION STUDIES

General Procedure for Ethylene Polymerization. Inside the drybox, the nickel complex Ni11 (0.5 μmol) and NaBAr$^F_4$ (1 μmol) were dissolved in 10 mL of toluene in a 20 mL vial and stirred for 10 min Solid Ni(COD)$_2$ (4 μmol) was added and stirred until a clear solution was obtained (4-5 min). The mixture was loaded into a 10 mL syringe equipped with an 8-inch stainless steel needle. The loaded syringe was sealed by sticking the needle tip into a rubber septum and brought outside of the drybox. To prepare the polymerization reactor, 90 mL of dry toluene was placed in an empty autoclave. The autoclave was pressurized with ethylene to 80 psi, stirred for 5 min, and then the reactor pressure was reduced to 5 psi. This process was repeated 3 times to remove trace amounts of oxygen inside the reaction vessel. The reactor was then heated to the desired temperature and the catalyst solution was injected into the autoclave through a side arm. The autoclave was sealed and purged with ethylene at 40 psi (no stirring) three times. Finally, the reactor pressure was increased to the desired pressure, and the contents were stirred vigorously. To stop the polymerization, the autoclave was vented and cooled in an ice bath. A solution of MeOH (600 mL) was added to precipitate the polymer. The polymer was collected by vacuum filtration, rinsed with MeOH, and dried under vacuum at 80° C. overnight. The reported yields are average values obtained from duplicate or triplicate runs.

To obtain consistent polymer yields from run to run, the amount of catalyst used in each run must be kept as consistent as possible. Since 0.5 µmol of the Ni11 catalyst weighs only 0.37 mg, it is extremely difficult to weigh out exactly this amount using a standard analytical balance. To minimize errors due to weighing inconsistencies, a batch catalyst preparation method was used. First, 37 mg (50 µmol) of the catalyst was weighed out and then dissolved into 50 mL of toluene. This solution was divided equally into 10 vials so that each vial contained 5 µmol of catalyst. Next, each 5 µmol of catalyst was combined with 20 mL of toluene and this 25 mL mixture was partitioned into 10 vials so that each vial contained 0.5 µmol of catalyst. Finally, each vial was dried completely under vacuum and stored in a refrigerator inside the drybox until ready for use.

For all polymerization reactions, except ones that were performed to determine the temperature profiles, the reaction temperature was controlled by manual cooling of the reactor with an air stream when the reactor increases more than 5° C. above the starting temperature. To clean the Parr reactor, the vessel was washed with hot toluene (80° C.) to remove the polymer sample from the previous run and rinsed with acetone before drying under vacuum for at least 1 h to remove trace amounts of water.

Table 10 below shows the results of the polymerization studies. To minimize catalyst thermal decomposition, the polymerization studies in Table 10 were performed using a low catalyst concentration of 5 µM and with manual external cooling when necessary. Under these conditions, complex Ni10 produced linear polyethylene (PE) with an activity of $2.12 \times 10^3$ kg/mol·h (Table 10, entry 1). The addition of NaBAr$^F_4$ to Ni10 had negligible effects on polymerization (activity=$1.88 \times 10^3$ kg/mol·h, entry 2), which further supports the observation that Na$^+$ does not bind to Ni10.

TABLE 10

Ethylene Polymerization Data

| Entry | Complex | Pressure (psi) | Time (h) | Initial Temp. (° C.) | Activity (kg/mol · h) |
|---|---|---|---|---|---|
| 1 | Ni10 | 450 | 1 | 30 | 2120 |
| 2 | Ni10/Na$^+$ | 450 | 1 | 30 | 1880 |
| 3 | Ni11 | 450 | 1 | 30 | 0 |
| 4 | Ni11—Na | 150 | 1 | RT | 3780 |
| 5 | Ni11—Na | 300 | 1 | RT | 8840 |
| 6 | Ni11—Na | 450 | 1 | RT | 10800 |
| 7 | Ni11—Na | 450 | 0.5 | 30 | 25300 |
| 8 | Ni11—Na | 450 | 1 | 30 | 18100 |
| 9 | Ni11—Na | 450 | 2 | 30 | 15080 |
| 10 | Ni11—Na | 450 | 1 | RT | 10800 |
| 11 | Ni11—Na | 450 | 1 | 40 | 14700 |
| 12 | Ni11—Na | 450 | 1 | 50 | 13000 |
| 13 | Ni11—Na | 450 | 1 | 60 | 9380 |

For Table 10, conditions were: Ni catalyst (0.5 µmol), NaBAr$^F_4$ (1 µmol, if any), Ni(COD)$_2$ (4 µmol), 100 mL toluene. Temperature was controlled by manual external cooling when necessary to ensure that the reaction temperature does not exceed greater than 5° C. from the starting temperature.

Surprisingly, when Ni11 was tested under the same conditions as above, no polyethylene was obtained (Table 10, entry 3). It was hypothesized that the free PEG chain in Ni11 can self-inhibit by occupying open coordination sites at the nickel centre. However, when NaBAr$^F_4$ was added to Ni11, the resulting nickel-sodium Ni11-Na showed a remarkably activity of $1.81 \times 10^4$ kg/mol·h (entry 8), which is a ~8.5× increase in comparison to that of Ni10. A comparison with several different nickel systems reported in the literature indicates that Ni11-Na is among one of the most active catalysts, only slower than nickel diimine and nickel tris(adamantyl)phosphine complexes, although different studies used different polymerization conditions. The PE produced by Ni11-Na has low molecular weight ($M_n$=~$1.6 \times 10^3$) and narrow polydispersity ($M_w/M_n$=~1.4), which is typical for this class of catalysts.

To probe the polymerization behaviour of Ni11-Na further, its reactivity was evaluated as a function of pressure, time, and temperature. When the ethylene pressure was increased from 150→300→450 psi (Table 10, entries 4-6), the catalyst activity also increased. The approximately linear correlation between pressure and polymerization rate suggests that the reaction is first-order in ethylene. At 150 psi and RT (Table S4), Ni11-Na showed relatively constant activity (average=$3.3 \times 10^3$ kg/mol·h) up to 3.0 h. However, at 450 psi and 30° C. (Table 10), the activity gradually decreased from $2.5 \times 10^4$ (entry 7) to $1.5 \times 10^4$ kg/mol·h (entry 9) over the course of 2 h, which is most likely indicative of catalyst decomposition. Finally, when polymerizations were performed at different temperatures (RT to 60° C., entries 8 and 10-13), the optimal temperature was at 30° C. However, during the course of some reactions, there was a rapid spike in temperature that was difficult to control. This large exotherm only occurred when the Ni11-Na complex was used. In contrast, polymerizations using the monometallic Ni10 and Ni11 complexes did not generate any appreciable heat.

Figure 18A:
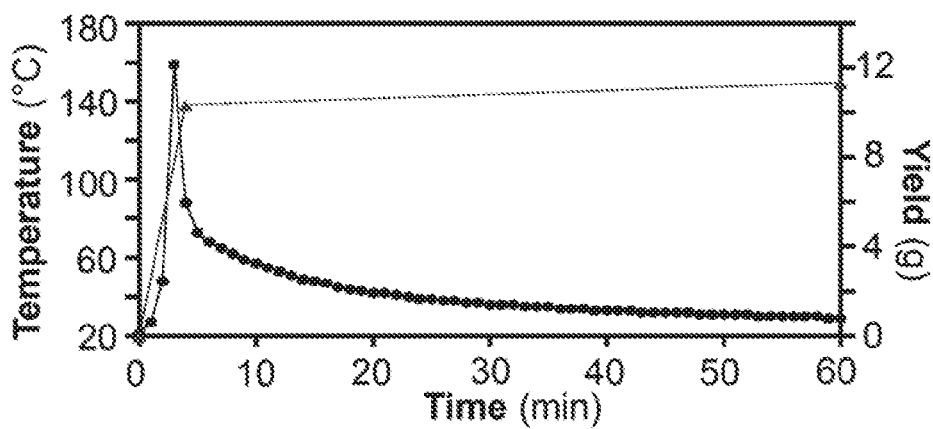
FIG. 18A is a plot showing reaction temperatures and polymer yields during the course of a 60 min run by the Ni11-Na complex at 100 μM catalyst concentration.
Figure 18B:
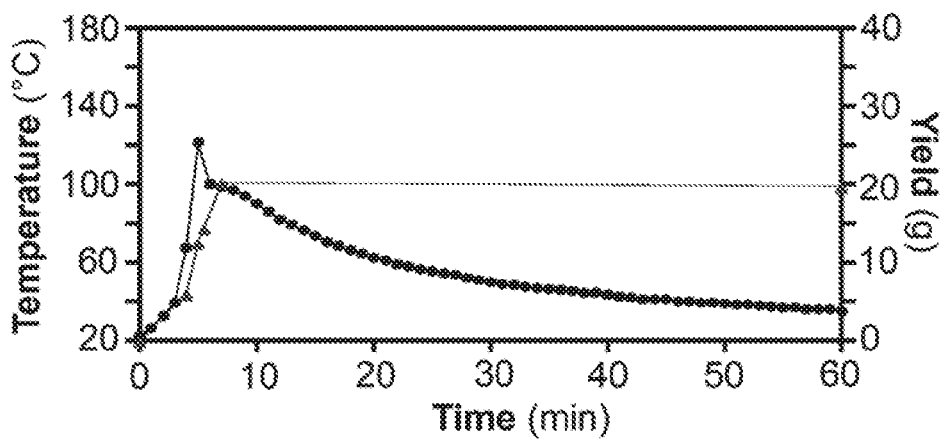
FIG. 18B is a plot showing reaction temperatures and polymer yields during the course of a 60 min run by the Ni11-Na complex using a 50 μM catalyst concentration.

To gain further insights into the thermal stability of the Ni11-Na complex, reaction temperature and polymer yields were measured as a function of time. FIG. 18A is a plot showing the reaction temperatures (dots) and polymer yields (triangles) during the course of a 60 min run by the Ni11-Na complex at 100 µM catalyst concentration and FIG. 18B is a plot of the same study using a 50 µM catalyst concentration. When a 100 µM toluene solution of the nickel-sodium catalyst was treated with Ni(COD)$_2$ and then exposed to 450 psi of ethylene, the reaction temperature rose from RT (~18-19° C.) to 159° C. in 4 min. After this early temperature burst, the solution cooled slowly back down to RT after 60 min. Interestingly, when the products yields were determined at 4 and 60 min, similar amounts of polymer were obtained (~10.4 and ~11.3 g, respectively). This result suggests that the Ni11-Na catalyst was deactivated shortly after ~4 min. When the Ni11-Na concentration was lowered to 50 µM, the maximum reaction temperature was observed at 122° C. after 5 min. The rate of polymer formation remained relatively constant from 0-7 min but then dropped precipitously thereafter. Once again, these data suggest that when the reaction temperature exceeded a certain maximum threshold, the Ni11-Na complex was no longer active.

This work illustrates the importance of conducting detailed temperature studies to accurately evaluate catalyst thermal stability. For example, reporting that the Ni11-Na catalyst was only active for 4 min at RT (FIG. 18A) would be somewhat misleading, since in actuality, the reaction temperature went up as high as 159° C. if no external cooling was applied. The results of the detailed temperature studies are not necessarily unique to the Ni11-Na system, since other highly active nickel catalysts have also been shown to exhibit large exotherms during polymerization. However, many literature reports only indicate the reactor temperature at the start of the reaction rather than the temperature changes (and corresponding yields) during the polymerization process. Oftentimes, the reaction temperature was either not regulated or attempts to do so was not reported. This information is critical because it enables the determination of the appropriate catalyst concentration needed to minimize uncontrollable exotherms and to operate within a temperature regime that leads to greatest catalyst productivity.

EXAMPLE 10. NICKEL-ALKALI PHOSPHINE PHOSPHONATE POLYETHYLENE GLYCOL (PEG) COMPLEXES

These examples relate to the incorporation of secondary metal ions to Pd(II) phosphine-phosphonate complexes and demonstrate that their presence leads to enhanced catalytic performance A new series of heterobimetallic nickel-metal complexes bearing phosphine-phosphonate ester donors with polyethylene glycol (PEG) chains was synthesized. Based on metal binding studies, nickel phosphine phosphonate polyethylene glycol (PEG) complexes can form 1:1 adducts with alkali cations in solution. These nickel-alkali complexes are more active for ethylene homopolymerization in comparison to parent mononickel complexes. In previous work, alkali BAr$^F_4$ salts were used as the secondary metal source because of their good solubility in hydrocarbon or halogenated solvents, which are standard solvent for polymerization. These examples demonstrate that nickel catalysts are active in the polar organic solvent THF, which allowed for polymerization in the presence of a wide variety of secondary metal salts. Alkaline metals ($Ca^{2+}$, $Mg^{2+}$) and transition metals ($Co^{2+}$, $Zn^{2+}$) ions can also coordinate to the catalysts and facilitate ethylene and copolymerization.

Commercial reagents were used as received. All air- and water-sensitive manipulations were performed using standard Schlenk techniques or under a nitrogen atmosphere using a glovebox. Anhydrous solvents were obtained from an Innovative Technology solvent drying system saturated with Argon. High-purity polymer grade ethylene was obtained from Matheson TriGas without further purification. The compounds (2-bromophenyl)diphenyl phosphine, (2,6-dibromophenyl)diphenyl phosphine and [Ni(allyl)Cl]$_2$ were prepared according to literature procedures.

Figure 19:
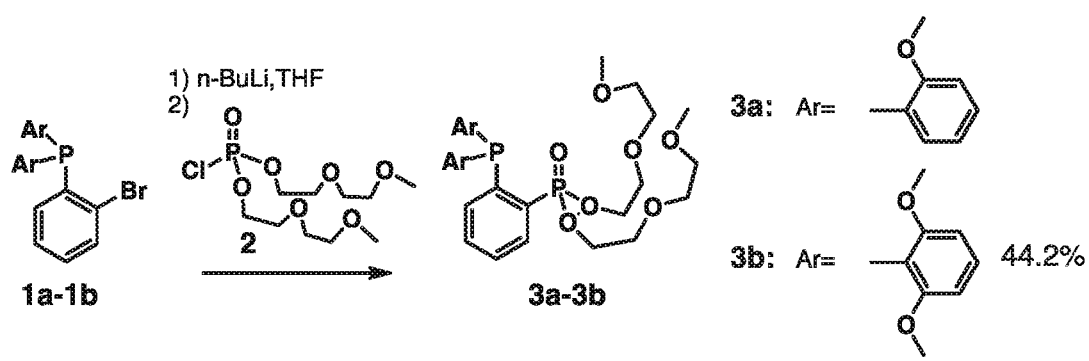
FIG. 19 shows a synthetic scheme, Scheme 3, for the synthesis of ligands useful for forming heterobimetallic complexes, in accordance with preferred embodiments described herein.
Figure 20:
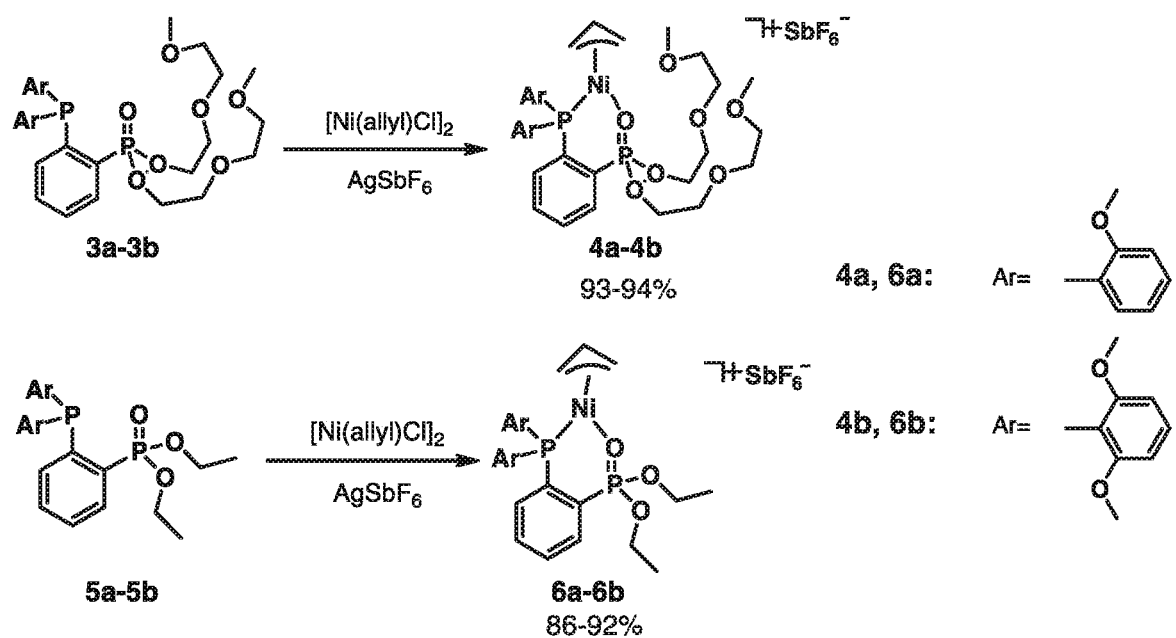
FIG. 20 shows a synthetic scheme, Scheme 4, for the synthesis of heterobimetallic complexes, in accordance with preferred embodiments described herein.

Nickel phosphine phosphonate ester complexes were readily obtained through the synthetic sequence shown in Scheme 3, FIG. 19. Lithiation of (2-bromophenyl)-bis(2-methoxyphenyl) or more bulky (2-bromopheny)-bis(2,6-dibromophenyl), followed by reaction with chlorophosphite-PEG$_2$ (2) provided ligands 3a, and 3b (Ar=2,6-dimethoxyphenyl) in moderate yields.

Preparation of 3b:

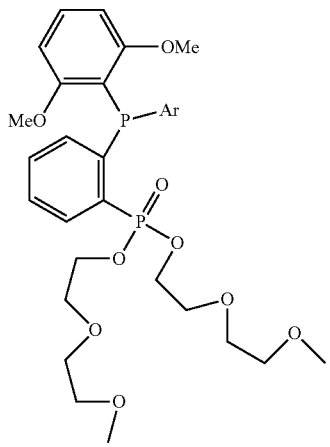

A 100 mL Schlenk flask was charged with (2-bromophenyl)bis(2,6-dimethoxyphenyl) phosphine (0.92 g, 2.00 mmol, 1.0 equiv.) in 30 mL of THF. The flask was cooled to −78° C., and a solution of n-butyllithium (1.6 M) (1.3 mL, 2.00 mmol, 1.0 equiv.) was added via syringe, giving a deep yellow solution that was stirred for 20 min. After stirring for 20 min, a solution of 2 (0.64 g, 2.00 mmol, 1.0 equiv.) in THF (5 mL) was added by syringe, which turned the solution pale orange. After stirring for 40 min, the cold bath was removed, and the flask was allowed to warm up to room temperature overnight while stirring. The reaction mixture was then concentrated under reduced pressure to afford an yellow solid. The crude product was purified by silica gel column chromatography (100% ethyl acetate to remove mobile impurities, followed by ethyl acetate/chloroform/methanol=10:1:1 to elute the product) to yield a colorless oil (0.59 g, 0.88 mmol, 44.2%). $^1$H NMR (CDCl$_3$, 400 MHz): δ (ppm)=8.03 (m, 1H), 7.41 (m, 1H), 7.24 (m, 1H), 7.18 (t, $J_{HH}$=8.4 Hz, 2H), 6.44 (dd, $J_{HH}$=8.6 Hz, $J_{PH}$=2.8 Hz, 4H), 4.15 (m, 2H), 4.06 (m, 2H), 3.54 (m, 4H), 3.46 (m, 8H), 3.40 (s, 12H), 3.34 (s, 6H). $^{13}$C NMR (CDCl$_3$, 100 MHz): δ (ppm)=162.38 (d, $J_{PC}$=8.8 Hz), 144.67 (dd, $J_{PC}$=25.3, 12.7 Hz), 134.67 (d, $J_{PC}$=15.5 Hz), 133.82 (dd, $J_{PC}$=10.7, 8.6 Hz), 131.83 (dd, $J_{PC}$=187.8, 36.0 Hz), 130.58 (d, $J_{PC}$=2.9 Hz), 129.69, 126.40 (d, $J_{PC}$=14.6 Hz), 115.34 (d, $J_{PC}$=23.3 Hz), 104.74, 71.94, 70.34, 70.02 (d, $J_{PC}$=6.8 Hz), 64.51 (dd, $J_{PC}$=5.8, 2.9 Hz), 59.10, 55.96. $^{31}$P NMR (CDCl$_3$, 162 MHz): δ (ppm)=21.12, −40.64. ESI-MS(+) calc. for $C_{32}H_{44}O_{11}P_2$[M+Na]$^+$=689.2256, found 689.2212.

Preparation of 5b:

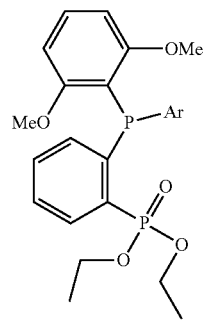

A 100 mL Schlenk flask was charged with (2-bromophenyl)bis(2,6-dimethoxyphenyl) phosphine (0.8 g, 1.73 mmol, 1.0 equiv.) in 30 mL of THF. The flask was cooled to −78° C., and a solution of n-butyllithium (1.6 M) (1.1 mL, 1.73 mmol, 1.0 equiv.) was added via syringe, giving a deep yellow solution. After stirring for 20 min, a solution of chlorodiethylphosphate (0.30 g, 1.73 mmol, 1.0 equiv.) in THF (5 mL) was added by syringe, which turned the solution pale orange. After stirring for 40 min, the cold bath was removed, and the flask was allowed to warm up to room temperature overnight while stirring. The reaction mixture was then concentrated under reduced pressure to afford a white solid. The crude product was purified by silica gel column chromatography (Ethyl acetate/Hexane=7:3) to yield a white solid (0.85 g, 1.56 mmol, 53%). $^1$H NMR (CDCl$_3$, 400 MHz): δ (ppm)=8.09 (m, 1H), 7.42 (m, 1H), 7.24 (m, 1H), 7.18 (td, $J_{HH}$=8.0 Hz, $J_{HH}$=1.2 Hz, 2H), 6.44 (dd, $J_{HH}$=8.4 Hz, $J_{PH}$=2.8 Hz, 4H), 4.00 (m, 4H), 3.40 (s, 12H), 1.05 (t, $J_{HH}$=7.2 Hz, 6H). $^{13}$C NMR (CDCl$_3$, 100 MHz): δ (ppm)=162.38 (d, $J_{PC}$=8.8 Hz), 144.43 (dd, $J_{PC}$=25.3, 11.7 Hz), 134.65 (d, $J_{PC}$=15.6 Hz), 134.02 (dd, $J_{PC}$=11.2, 8.8 Hz), 132.38 (dd, $J_{PC}$=185.8, 35.0 Hz), 130.52 (d, $J_{PC}$=2.9 Hz), 129.56, 126.34 (d, $J_{PC}$=15.5 Hz), 115.55 (d, $J_{PC}$=22.4 Hz), 104.72, 61.75 (d, $J_{PC}$=3.9 Hz), 55.96, 16.07 (d, $J_{PC}$=5.9 Hz). $^{31}$P NMR (CDCl$_3$, 162 MHz): δ (ppm) =20.82, −40.40. ESI-MS(+) calc. for C$_{26}$H$_{32}$O$_7$P$_2$[M+K]$^+$ =557.1260, found 557.1225.

Metallation of 3 by treatment with [Ni(allyl)Cl]$_2$ gave the respective Ni complexes. Subsequent abstraction of chloride using AgSbF$_6$ furnished complexes 4a and 4b in high yields, as shown in Scheme 4 in FIG. 20. For comparative studies, two nickel complexes without PEG chains 6a and 6b, were synthesized using similar procedures.

Preparation of 4a:

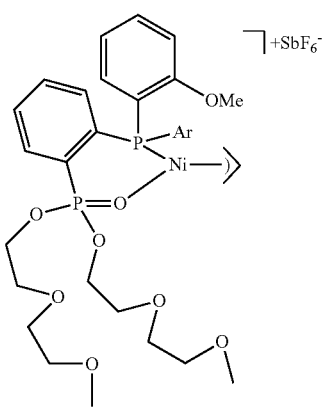

Inside the glovebox, a solution containing 3a (200 mg, 0.33 mmol, 1.0 equiv.) and AgSbF$_6$ (113 mg, 0.33 mmol, 1.0 equiv.) in 10 mL of CH$_2$Cl$_2$ was stirred for 10 min at RT. Solid [Ni(allyl)Cl]$_2$ (45 mg, 0.16 mmol, 0.5 equiv.) was added in small portions. The reaction mixture was stirred for an additional 3 h. The resulting red mixture was filtered through a pipet plug and then dried under vacuum to give a dark red oil. The product was recrystallized by dissolving in CH$_2$Cl$_2$ and then layering with pentane to afford the final product as dark red oil (289 mg, 0.31 mmol, 93.2%). $^1$H NMR (CDCl$_3$, 400 MHz): δ (ppm)=7.69 (m, 1H), 7.66 (m, 1H), 7.56 (m, 3H), 7.14-7.08 (m, 3H), 6.97 (t, $J_{HH}$=7.8 Hz, 2H), 6.78 (m, 2H), 5.71 (m, 1H), 4.05 (m, 2H), 3.99 (m, 2H), 3.87 (s, 6H), 3.52 (m, 12H), 3.87 (s, 6H), 2.59 (brs, 1H). $^{13}$C NMR (CDCl$_3$, 125 MHz): δ (ppm)=160.73 (d, $J_{PC}$=7.4 Hz), 134.87 (dd, $J_{PC}$=35.5, 13.5 Hz), 134.55, 134.44 (d, $J_{PC}$=4.9 Hz), 134.12, 133.74 (t, $J_{PC}$=14.8 Hz), 133.55, 131.09 (d, $J_{PC}$=13.5 Hz), 127.72 (dd, $J_{PC}$=188.5, 17.1 Hz), 121.75 (d, $J_{PC}$=8.6 Hz), 115.62, 115.24, 114.66, 111.71 (d, $J_{PC}$=4.9 Hz), 71.79, 70.35, 69.36 (d, $J_{PC}$=6.1 Hz), 67.58 (d, $J_{PC}$=6.1 Hz), 59.08, 56.06. $^{31}$P NMR (CDCl$_3$, 162 MHz): δ (ppm) =23.25 (d, $J_{PP}$=20.4 Hz), −1.97 (d, $J_{PP}$=20.6 Hz).

Preparation of 4b:

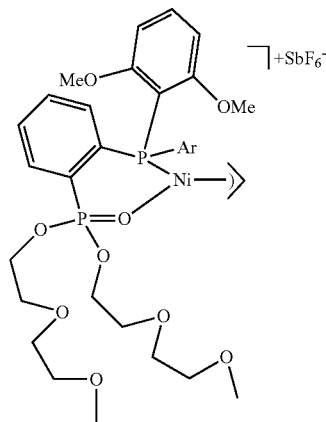

Inside the glovebox, a solution containing 3b (100 mg, 0.15 mmol, 1.0 equiv.) and AgSbF$_6$ (52 mg, 0.15 mmol, 1.0 equiv.) in 10 mL of CH$_2$Cl$_2$ was stirred for 10 min at RT. Solid [Ni(allyl)Cl]$_2$ (20 mg, 0.08 mmol, 0.5 equiv.) was added in small portions. The reaction mixture was stirred for an additional 3 h. The resulting red mixture was filtered through a pipet plug and then dried under vacuum to give a dark red oil. Upon the addition of pentane and after stirring for ~5 min, an orange solid formed. The product was recrystallized by dissolving in CH$_2$Cl$_2$ and then layering with pentane to afford the final product as orange crystals (142 mg, 0.14 mmol, 94.5%). $^1$H NMR (CDCl$_3$, 400 MHz): δ (ppm)=7.79 (m, 1H), 7.57 (m, 1H), 7.49 (m, 2H), 7.44 (t, $J_{HH}$=8.4 Hz, 2H), 6.60 (dd, $J_{HH}$=8.2, 4.0 Hz, 4H), 5.66 (m, 1H), 3.95 (m, 2H), 3.84 (m, 2H), 3.64 (s, 12H), 3.50 (m, 12H), 3.35 (s, 6H), 2.86 (brs, 2H), 2.30 (d, $J_{HH}$=13.2 Hz, 2H). $^{13}$C NMR (CDCl$_3$, 125 MHz): δ (ppm)=161.53 (d, $J_{PC}$=2.9 Hz), 138.11 (dd, $J_{PC}$=40.4, 12.7 Hz), 134.46 (d, $J_{PC}$=14.6 Hz), 133.78, 133.38 (t, $J_{PC}$=8.8 Hz), 131.42 (d, $J_{PC}$=3.9 Hz), 129.59 (d, $J_{PC}$=13.6 Hz), 124.91 (dd, $J_{PC}$=184.9, 19.5 Hz), 111.86, 105.62, 105.13, 104.57 (d, $J_{PC}$=3.9 Hz), 71.84, 70.40, 69.37 (d, $J_{PC}$=6.9 Hz), 67.01 (d, $J_{PC}$=5.8 Hz), 59.08, 55.98. $^{31}$P NMR (CDCl$_3$, 162 MHz): δ (ppm)=23.58 (d, $J_{PP}$=25.9 Hz), −21.78 (d, $J_{PP}$=24.1 Hz). Anal. Calc. for C$_{35}$H$_{49}$F$_6$O$_{11}$P$_2$SbNi·0.25CH$_2$Cl$_2$: C, 41.37; H, 4.88. Found: C, 41.30; H, 4.95.

Preparation of 6a:

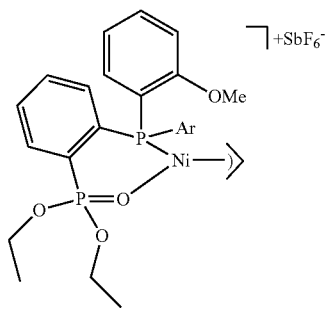

Inside the glovebox, a solution containing 5a (100 mg, 0.22 mmol, 1.0 equiv.) and AgSbF$_6$ (75 mg, 0.22 mmol, 1.0 equiv.) in 10 mL of CH$_2$Cl$_2$ was stirred for 10 min at RT. Solid [Ni(allyl)Cl]$_2$ (30 mg, 0.11 mmol, 0.5 equiv.) was added in small portions. The reaction mixture was stirred for an additional 3 h. The resulting red mixture was filtered through a pipet plug and then dried under vacuum to give a dark red oil. Upon the addition of pentane and after stirring for ~5 min, a yellow solid formed. The product was recrystallized by dissolving in CH$_2$Cl$_2$ and then layering with pentane to afford the final product as yellow crystals (160 mg, 0.20 mmol, 91.6%). $^1$H NMR (CDCl$_3$, 400 MHz): δ (ppm)=7.85 (m, 1H), 7.69 (m, 1H), 7.58 (m, 3H), 7.14-7.08 (m, 3H), 6.98 (t, $J_{HH}$=7.2 Hz, 2H), 6.79 (m, 1H), 5.72 (m, 1H), 3.97 (m, 4H), 3.88 (s, 6H), 2.55 (brs, 1H), 1.18 (t, $J_{HH}$=6.8 Hz, 6H). $^{13}$C NMR (CDCl$_3$, 100 MHz): δ (ppm)= 160.72 (d, $J_{PC}$=6.8 Hz), 135.08 (dd, $J_{PC}$=36.0, 12.6 Hz), 134.64 (d, $J_{PC}$=4.9 Hz), 134.11, 134.02, 133.88 (t, $J_{PC}$=7.8 Hz), 133.55 (dd, $J_{PC}$=5.8, 2.9 Hz), 131.17 (d, $J_{PC}$=13.7 Hz), 127.85 (dd, $J_{PC}$=185.8, 17.6 Hz), 121.72 (d, $J_{PC}$=8.8 Hz), 115.68, 115.19, 114.56, 111.69 (d, $J_{PC}$=3.9 Hz), 65.20 (d, $J_{PC}$=6.8 Hz), 56.05, 15.91 (d, $J_{PC}$=6.8 Hz). $^{31}$P NMR (CDCl$_3$, 162 MHz): δ (ppm)=22.91 (d, $J_{PP}$=21.1 Hz), −2.33 (d, $J_{PP}$=20.6 Hz). Anal. Calc. for C$_{27}$H$_{33}$F$_6$O$_5$P$_2$SbNi: C, 40.85; H, 4.19. Found: C, 40.60; H, 4.43.

Preparation of 6b:

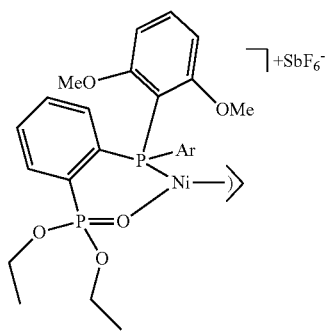

Inside the glovebox, a solution containing 5b (100 mg, 0.19 mmol, 1.0 equiv.) and AgSbF$_6$ (66 mg, 0.19 mmol, 1.0 equiv.) in 10 mL of CH$_2$Cl$_2$ was stirred for 10 min at RT. Solid [Ni(allyl)Cl]$_2$ (26 mg, 0.10 mmol, 0.5 equiv.) was added in small portions. The reaction mixture was stirred for an additional 3 h. The resulting red mixture was filtered through a pipet plug and then dried under vacuum to give a dark red oil. Upon the addition of pentane and after stirring for ~5 min, an orange solid formed. The product was recrystallized by dissolving in CH$_2$Cl$_2$ and then layering with pentane to afford the final product as orange crystals (139 mg, 0.16 mmol, 85.9%). $^1$H NMR (CDCl$_3$, 400 MHz): δ (ppm)=7.66 (m, 1H), 7.58 (m, 1H), 7.51 (m, 2H), 7.44 (t, $J_{HH}$=8.4 Hz, 2H), 6.61 (dd, $J_{HH}$=8.2, 4.4 Hz, 4H), 5.67 (m, 1H), 3.83 (m, 4H), 3.64 (s, 12H), 2.86 (brs, 2H), 2.30 (d, $J_{HH}$=13.2 Hz, 2H), 1.16 (t, $J_{HH}$=6.8 Hz, 6H). $^{13}$C NMR (CDCl$_3$, 100 MHz): δ (ppm)=161.54 (d, $J_{PC}$=2.0 Hz), 138.16 (dd, $J_{PC}$=40.4, 12.7 Hz), 134.65 (d, $J_{PC}$=13.6 Hz), 133.79, 132.72 (t, $J_{PC}$=8.8 Hz), 131.31 (d, $J_{PC}$=2.9 Hz), 129.63 (d, $J_{PC}$=14.6 Hz), 125.43 (dd, $J_{PC}$=181.9, 19.4 Hz), 111.78, 105.58, 105.10, 104.56 (d, $J_{PC}$=2.9 Hz), 64.61 (d, $J_{PC}$=6.8 Hz), 55.95, 15.88 (d, $J_{PC}$=6.8 Hz). $^{31}$P NMR (CDCl$_3$, 162 MHz): δ (ppm)=23.13 (d, $J_{PP}$=24.6 Hz), −21.86 (d, $J_{PP}$=24.6 Hz). Anal. Calc. for C$_{29}$H$_{37}$F$_6$O$_7$P$_2$SbNi: C, 40.79; H, 4.37. Found: C, 37.98; H, 4.39.

Single crystals of compounds 4a-Na, 4b-Na and 6a were analyzed by X-ray crystallography. In all three structures, the nickel center is square planar, similar to that of other nickel complexes reported previously. The dinuclear structure of the nickel-sodium complex 4a-Na was confirmed by X-ray crystallographic analysis. The structure declared that the nickel center in 4a-Na has the expected square planar geometry, and sodium ion is four-coordinate due to ligation by four oxygen donors from two PEG chians. The Ni—Na bond distance is ~6.68 Å.

EXAMPLE 11. METAL BINDING STUDIES

NMR spectra were acquired using JEOL spectrometers (ECA-400, 500, and 600) and referenced using residual solvent peaks. All $^{13}$C NMR spectra were proton decoupled. $^{31}$P NMR spectra were referenced to phosphoric acid. For polymer characterization: $^1$H NMR spectroscopy: each NMR sample contained ~20 mg of polymer in 0.5 mL of 1,1,2,2-tetrachloroethane-d$_2$ (TCE-d$_2$) and was recorded on a 500 MHz spectrometer using standard acquisition parameters at 120° C. $^{13}$C NMR spectroscopy: Each NMR sample contained ~50 mg of polymer and 50 mM (8.7 mg) chromium acetylacetonate Cr(acac)$_3$ in 0.5 mL of TCE-d$_2$ and was recorded at 120° C. (125 MHz). The samples were acquired using a 90° pulse of 11.7 μs, a relaxation delay of 4 s, an acquisition time of 0.81 s, and inverse gated decoupling. The samples were preheated for 30 mM prior to data acquisition. The carbon spectra were assigned based on the chemical shift values reported in the literature. High-resolution mass spectra were obtained from the massspectral facility at the University of Houston. Elemental analyses were performed by Atlantic Microlab. Gel permeation chromatography (GPC) data were obtained using a Malvern high temperature GPC instrument equipped with refractive index, viscometer, and light scattering detectors at 160° C. with 1,2,4-trichlorobenzene (stabilized with 125 ppm BHT) as the mobile phase. A calibration curve was established using polystyrene standards in triple detection mode. All molecular weights reported are based on triple detection.

The method of continuous variation (Job Plot analysis) was used to determine the binding stoichiometry of our nickel complexes with alkali ions. To investigate the interactions of the PEGylated nickel compounds with alkali ions, solution studies were carried out in chloroform-d. To perform these experiments, stock solutions of 4a (or 4b) (6 mM, 6 mL) and MBAr$^F_4$ (6 mM, 15 equiv. Et$_2$O to solubilize the salts, 6 mL, M=Li$^+$, Na$^+$, or K$^+$) were prepared separately in CDCl$_3$. Various amounts of each stock solution were added to an NMR tube so that a total volume of 1 mL was obtained.

Ten different NMR samples were prepared, each containing a different ratio of 4a (or 4b):M. NMR spectra of 4a and 4b in the presence of various amounts of MBAr$^F_4$ salts (M=Li$^+$, Na$^+$, or K$^+$; BAr$^F_4$=tetrakis(3,5-trifluoromethylphenyl)borate) were recorded. The samples were recorded at room temperature by $^1$H NMR spectroscopy. The hydrogen resonances centered at both 4a (~5.72 ppm) and 4b (~5.67 ppm) shift in the presence of sodium ions. It was observed that the H$_a$ from allyl group of both 4a (~5.72 ppm) and 4b (~5.67 ppm) showed greater chemical shifts when larger amounts of M$^+$ were present. The changes in the chemical shifts of H$_a$ were used to construct Job plots, shown in FIG. 21.

Figure 21:
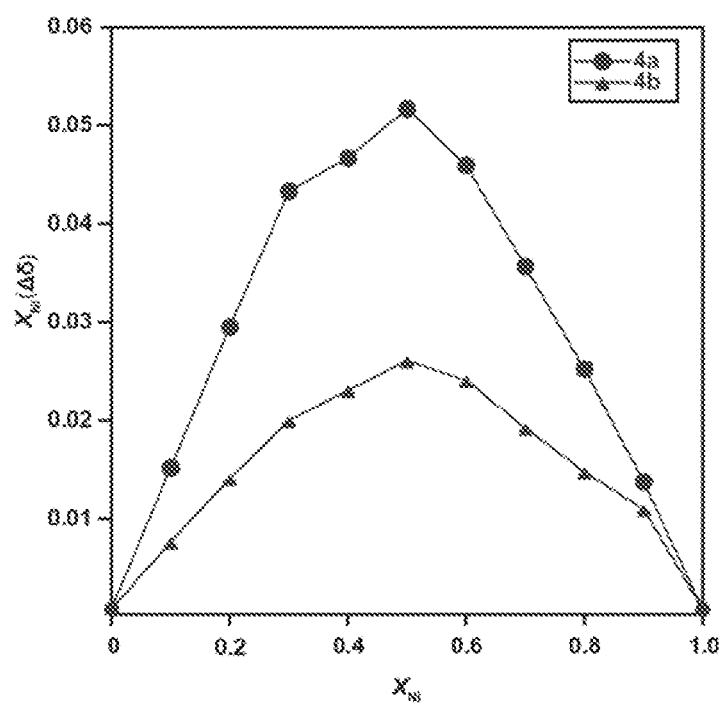
FIG. 21 shows job plots of binding behavior for representative nickel complexes with NaBAr$^F_4$ in CDCl$_3$.

FIG. 21 shows Job plots for complex 4a with NaBAr$^F_4$ (circles) and 4b with NaBAr$^F_4$ (triangles)) in CDCl$_3$. The total concentration of 4a-b/Na was 6 mM for all data points. The peak maxima of the Job plots for 4a/Na$^+$ and 4b/Na$^+$ all occur at X$_{Ni}$=0.5, which indicates that a 1:1 stoichiometry is optimal between complex 4a or 4b with alkali ions. The slopes of the two plots suggest 4a has a higher affinity for sodium than 4b. Interestingly, complex 6a also shows chemical shift in its NMR spectra when 1 equiv. sodium salt was added. These data are consistent with previous observations that palladium complexes lacking PEG chains are capable of forming adducts with sodium.

Figure 22:
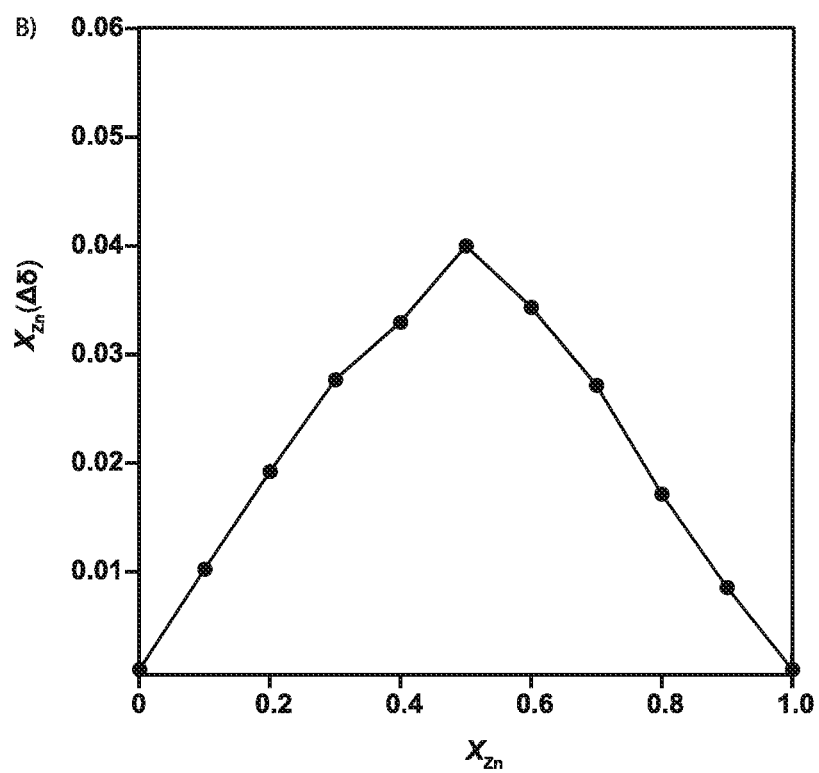
FIG. 22 shows a job plot of binding behavior for a representative nickel complex with Zn(OTf)$_2$ in CD$_3$CN.

To determine whether other metal ions are capable of binding, job plot studies of 4a were performed with zinc triflate to determine the binding stoichiometry of the nickel complexes with zinc ions. The experiment was carried out in acetonitrile-d to ensure that zinc triflate salt was completely dissolved. To perform these experiments, stock solutions of 4a (6 mM, 6 mL) and Zn(OTf)$_2$ (6 mM, 6 mL) were prepared separately in CD$_3$CN. Various amounts of each stock solution were added to an NMR tube so that a total volume of 1 mL was obtained. Ten different NMR samples were prepared, each containing a different ratio of 4a:Zn. The hydrogen resonances centered at ~5.7 ppm corresponding to the carbon #32 of allyl group in 4a shift in the presence of zinc ions. It was observed that H$_a$ from the allyl group of 4a (~5.72 ppm was shifted downfield when larger amounts of Zn$^{2+}$ were present. These data were used to construct a Job plot of Zn$^{2+}$ binding to 4a, shown in FIG. 22. FIG. 22 shows the Job plot for complex 4a with Zn(OTf)$_2$ (black circles) in CD$_3$CN. The total concentration was 6 mM for all data points. The peak maximum of the Job plot for 4a/Zn$^{2+}$ occurred at X$_{Ni}$=0.5, which suggests that a 1:1 stoichiometry between Ni/Zn is optimal. When Zn(OTf)$_2$ was added to 6a, the spectrum showed several new peaks that we were unable to assign. However, based on their relative peak integration, zinc binding to 6a does not appear to form a single discrete heterobimetallic complex. This observation is consistent with polymerization studies described below which showed that the addition of Zn$^{2+}$ did not improve the activity of 6a.

EXAMPLE 12. POLYMERIZATION STUDIES

Nickel phosphine phosphonate PEG complexes 4a/4b, and Jordan-type 6a/6b were tested as catalysts for ethylene homopolymerization. Inside the drybox, the nickel complexes (10 μmol) and alkali salts (10 μmol) were dissolved in 10 mL of toluene/DCM (8:2) and stirred for 10 mins. By visual inspection, the resulting nickel-alkali complexes appeared to be soluble in the reaction mixture. The mixture was sealed inside a vial using a rubber septum and brought outside of the drybox. Under an atmosphere of N$_2$, the catalyst solution was loaded into a syringe. To prepare the polymerization reactor, 40 mL of dry toluene was added to an empty autoclave and preheated to the desired temperature. The autoclave was purged with ethylene (20 psi) for 1 min and then the catalyst solution was injected into the autoclave via syringe. The reactor pressure was increased to 200 psi of ethylene and the contents were stirred vigorously for 1 h. To stop the polymerization, the autoclave was vented and cooled in an ice bath. A solution of MeOH (100-200 mL) was added to precipitate the polymer. The polymer was collected by vacuum filtration, rinsed with MeOH, and dried under vacuum at 80° C. overnight. The reported yields are average values of triplicate runs. Results are shown in Table 11 below.

TABLE 11

Ethylene Homopolymerization

| Entry | Complex | Salt | Polymer Yield (g) | Activity ($10^5$ g/ mol · h) | Branches$^c$ (/1000 C) | M$_n^d$ (×10$^3$) | M$_w$/M$_n^d$ |
|---|---|---|---|---|---|---|---|
| 1 | 4a | none | 8.6 | 8.6 | 22 | 0.84 | 1.7 |
| 2 | 4a | Na$^+$ | 29.9 | 29.9 | 30 | 1.04 | 1.2 |
| 3$^b$ | 4b | none | 6.1 | 3.0 | 13 | 4.79 | 1.4 |
| 4$^b$ | 4b | Na$^+$ | 3.5 | 1.8 | 16 | 7.61 | 1.4 |
| 5 | 6a | none | 7.4 | 7.4 | 18 | 0.69 | 1.7 |
| 6 | 6a | Na$^+$ | 26.6 | 26.6 | 26 | 0.98 | 2.0 |
| 7$^b$ | 6b | none | 5.4 | 2.7 | 17 | 7.36 | 1.2 |
| 8$^b$ | 6b | Na$^+$ | 3.3 | 1.6 | 15 | 13.92 | 1.3 |

$^a$Polymerization conditions: Ni catalyst (10 μmol), NaBAr$^F_4$ (10 μmol), ethylene (200 psi), 2 mL DCM, 48 mL toluene, 1 h at 80° C.
$^b$Polymerization conditions: Ni catalyst (20 μmol), NaBAr$^F_4$ (20 μmol), ethylene (400 psi).
$^c$The total number of branches per 1000 carbons was determined by $^1$H NMR spectroscopy.
$^d$Determined by GPC in trichlorobenzene at 150° C.

It was found that at 80° C. in toluene under 200 psi (400 psi for 4b and 6b) of ethylene, all nickel complexes showed high activity (2.7~8.6×10$^5$ g/mol Ni·h). 4a and 4b showed slightly higher activity than 6a and 6b, respectively (Table 11, entry 1 vs. 5 and entry 3 vs. 7). Interestingly, the complexes 4a and 6a containing 2-methoxyphenyl groups were much more active than those containing 2,6-dimethoxypheny group (4b and 6b). On the other hand, the bulkier catalysts gave PE with higher molecular (M$_n$=~4.79-7.36×10$^3$) than that obtained using the less bulky catalysts (M$_n$=~0.69-0.84×10$^3$) (Table 11, entry 1 vs. 3 and entry 5 vs. 7). These results are consistent with other reported Ni systems, in which more sterically hindered catalysts exhibited reduced catalyst activity in favor of higher molecular weight polymers compared to less bulky catalysts. In all cases, the polymers produced contained moderate branches (20 branches or less per 1000 carbons).

Next, the effects of alkali salts on the catalyst's reactivity toward ethylene were evaluated (Table 11, entries 2, 4, 6, 8). It was observed that the reaction of 4a or 6a with NaBAr$^F_4$ (1:1) led to catalytic rate enhancements of about 3.5×, 3.6× respectively (entries 2 and 4), compared to their mononickel complexes. The polymer molecular weight and polydispersity remained relatively constant in both the presence and absence of alkali ions. In contrast, complexes 4b and 6b showed slightly decreased activity when alkali salts were added (entries 4 and 8), but the polymer molecular weight increased. The alkali salts LiBAr$^F_4$ and KBAr$^F_4$ were also tested in polymerization, and similar results were obtained. As shown above, the reaction of 4a+Na and 4b+Na both gave heterobimetallic species. However, because the sodium ions do not coordinate to the P=O oxygen donor, their binding to the nickel complexes only increases the steric bulk and does not alter the electronic structure of the catalysts. Thus, differences in polymerization due to the presence of alkali ions may be due primarily to steric effects.

Complexes 4a and 6a were chosen for further studies using a polar solvent, with results shown in Table 12 below.

TABLE 12

Ethylene Homopolymerization in THF/Toluene Mixture Solvent

| Entry | Complex | Salt | Solvent (THF/Toluene) | Activity ($10^5$ g/mol · h) | Branches[b] (/1000 C) | $M_n^c$ (×$10^3$) | $M_w/M_n^c$ |
|---|---|---|---|---|---|---|---|
| 1 | 4a | none | 0/50 | 8.6 | 22 | 0.84 | 1.7 |
| 2 | 4a | none | 2/48 | 8.7 | 21 | 1.14 | 1.6 |
| 3 | 4a | none | 10/40 | 6.8 | 19 | 0.86 | 1.3 |
| 4 | 4a | none | 50/0 | 2.5 | 21 | 0.70 | 1.1 |
| 5 | 4a | K$^+$ | 0/50 | 28.9 | 28 | 1.12 | 1.2 |
| 5 | 4a | K$^+$ | 2/48 | 28.7 | 32 | 0.84 | 1.7 |
| 6 | 4a | K$^+$ | 10/40 | 30.9 | 31 | 0.77 | 2.2 |
| 7 | 4a | K$^+$ | 50/0 | 7.5 | 24 | 0.83 | 1.9 |
| 8 | 4a | Na$^+$ | 50/0 | 6.1 | 24 | 0.95 | 1.2 |
| 9 | 6a | none | 0/50 | 7.4 | 18 | 0.69 | 1.7 |
| 10 | 6a | none | 2/48 | 4.1 | 16 | 1.64 | 1.2 |
| 11 | 6a | none | 10/40 | 7.5 | 17 | 0.78 | 1.5 |
| 12 | 6a | none | 50/0 | 2.5 | 19 | 0.90 | 1.2 |
| 13 | 6a | K$^+$ | 0/50 | 25.4 | 22 | 0.73 | 1.7 |
| 14 | 6a | K$^+$ | 2/48 | 21.9 | 24 | 0.87 | 1.6 |
| 15 | 6a | K$^+$ | 10/40 | 36.3 | 27 | 0.61 | 1.6 |
| 16 | 6a | K$^+$ | 50/0 | 6.6 | 21 | 0.95 | 1.2 |
| 17 | 6a | Na$^+$ | 50/0 | 6.5 | 19 | 1.01 | 1.7 |

[a]Polymerization conditions: Ni catalyst (10 μmol), MBAr$^F_4$ (10 μmol), ethylene (200 psi), 50 ml toluene and THF in different ratios, 1 h at 80° C.
[b]The total number of branches per 1000 carbons was determined by $^1$H NMR spectroscopy.
[c]Determined by GPC in trichlorobenzene at 150° C.

It was found that the activities of 4a and 6a were relatively constant in the presence of up to ~20% of THF in toluene (entries 2 vs 3; 5 vs 6; 10 vs 11; 14 vs 15). However, when polymerizations were carried out in neat THF, the activity of 4a dropped at least 3× compared to that in neat toluene (entries 1 vs 4; 5 vs 7). The Jordan-type complex 6a exhibited similar behavior as that of 4a (entries 9 vs 12; 13 vs 16). Although the addition of polar solvent reduces catalyst activity as expexted,[12,13] our nickel complex 4a is still highly active in the presence of alkali ions (7.5×$10^5$ g/mol NH) for Ni·K and 6.1×$10^5$ g/mol Ni·h for Ni+Na). Interestingly, polymerizations performed in THF gave PE with the same microstructure as that obtained using toluene. The polymers have low molecular weights ($M_n$=~0.61-1.64×$10^3$) with narrow polydispersities (PDI=~1.2-2.2).

Since the Ni catalysts are active in the polar solvent THF, polymerizations were studied in the presence of metals salts that were not soluble in toluene. Polymerization reactions were carried out under 200 psi of ethylene using 4a or 6a and 1 equiv. of a triflate salt in neat THF, with the results shown in Table 13 below.

TABLE 13

Ethylene Homopolymerization with Metal Triflates in THF

| Entry | Complex | Salt | Polymer Yield (g) | Activity ($10^5$ g/mol · h) | Branches[b] (/1000 C) | $M_n^c$ (×$10^3$) | $M_w/M_n^c$ |
|---|---|---|---|---|---|---|---|
| 1 | 4a | Zn$^{2+}$ | 12.1 | 12.1 | 27 | 0.84 | 1.2 |
| 2 | 4a | Mg$^{2+}$ | 6.2 | 6.2 | 23 | 0.86 | 1.8 |
| 3 | 4a | Ca$^{2+}$ | 7.7 | 7.7 | 24 | 0.98 | 1.2 |
| 4 | 4a | La$^{3+}$ | 5.2 | 5.2 | 25 | 0.66 | 1.4 |
| 5 | 4a | Sc$^{3+}$ | 3.7 | 3.7 | 22 | 0.62 | 1.3 |
| 6 | 4a | Ga$^{3+}$ | 5.5 | 5.5 | 18 | 0.79 | 2.1 |
| 7 | 4a | Co$^{2+}$ | 26.6 | 26.6 | 18 | 0.91 | 1.8 |
| 8 | 6a | Zn$^{2+}$ | 2.5 | 2.5 | 19 | 0.87 | 2.2 |
| 9 | 6a | Mg$^{2+}$ | 3.2 | 3.2 | 19 | 0.76 | 1.5 |
| 10 | 6a | Ca$^{2+}$ | 2.8 | 2.8 | 19 | 0.77 | 1.7 |
| 11 | 6a | La$^{3+}$ | 2.1 | 2.1 | 19 | 0.76 | 1.2 |
| 12 | 6a | Sc$^{3+}$ | 2.0 | 2.0 | 20 | 0.68 | 1.6 |
| 13 | 6a | Ga$^{3+}$ | 2.4 | 2.4 | 19 | 0.79 | 1.3 |
| 14 | 6a | Co$^{2+}$ | 1.9 | 1.9 | 22 | 0.99 | 2.3 |

[a]Polymerization conditions: Ni catalyst (10 μmol), M(OTf)$_n$ (10 μmol), ethylene (200 psi), 50 mL THF, 1 h at 80° C.
[b]The total number of branches per 1000 carbons was determined by $^1$H NMR spectroscopy.
cDetermined by GPC in trichlorobenzene at 150° C.

Figure 23:
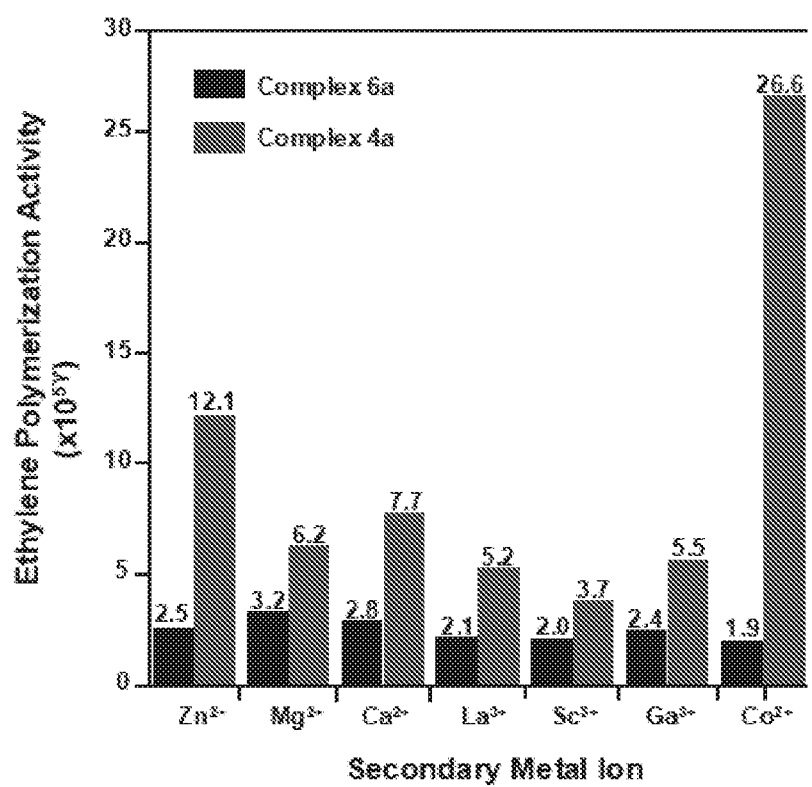
FIG. 23 shows a comparison of the activities of representative catalysts with different metal ions in tetrahydrofuran solvent.

All of the triflate salts dissolved completely in the THF when mixed with the nickel complexes. For catalysts 4a and 6a, the addition of K$^+$ or Na$^+$ did not significantly change their activities (7.5×$10^5$ vs. 6.6×$10^5$ g/mol Ni·h, 6.1×$10^5$ vs. 6.5×$10^5$ g/mol Ni·h, respectively) (Table 12, entries 7, 8, 16, 17). However, when other triflate salts such as Zn$^{2+}$, Mg$^{2+}$, Ca$^{2+}$, Co$^{2+}$, La$^{3+}$, Sc$^+$, Ga$^+$ were added under the same condition, 4a showed increased catalysts activity but not 6a (Table 13 entries 1-7 vs. entries 8-14). FIG. 23 shows a comparison of the activities of catalysts 4a, 6a with different metal ions. These results suggest that the PEG chains are critical to secondary metal ion binding in THF. An intriguing observation we made was that different metal ions enhanced the catalyst activity to different extent. For example, combining 1 equiv. of Co$^{2+}$ with 4a led to about 10-fold increase in activity (Table 12 entry 4 vs. Table 13 entry 7). The most modest catalyst enhancement was achieved using Sc$^{3+}$ (entry 5).

Besides metal triflates, other metals salts were also tested with 4a. Although ZnCl$_2$ provided high catalyst activity 16.8×$10^5$ g/mol Ni·h, all of the other halide salts gave reduced or no polymer yield. It is believed that halide anions could bridge multiple metal ions and form higher nuclearity species that are catalytically inactive.

Figure 24:
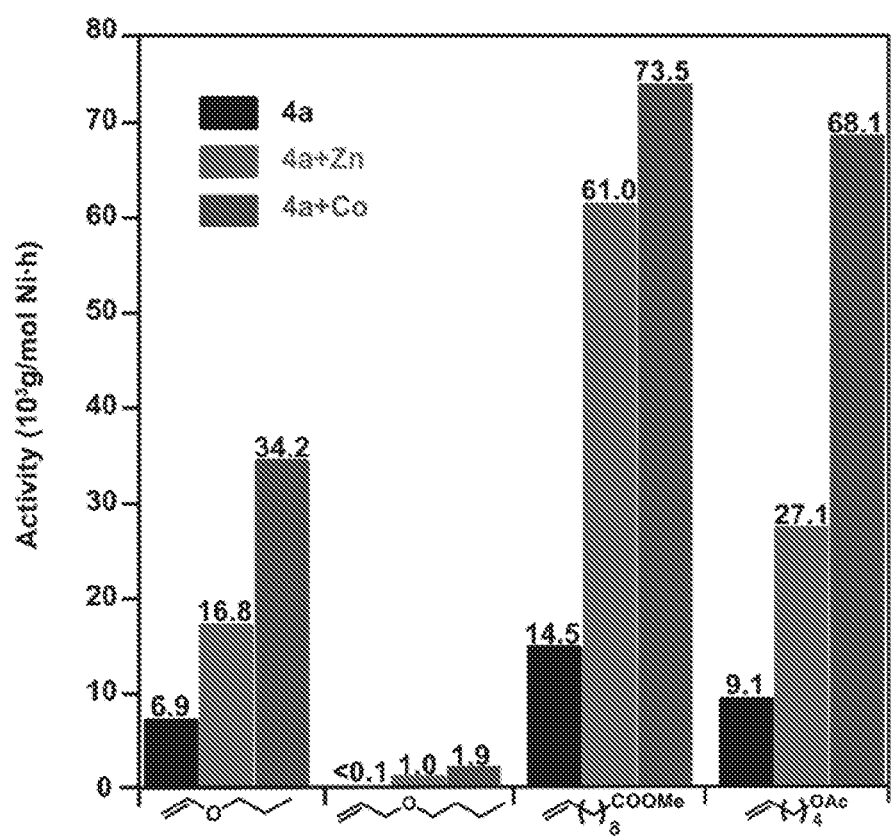
FIG. 24 shows a comparison of the activities of representative catalysts with different polar monomers.

Due to their remarkable catalyst enhancing effects, cobalt and zinc triflate were further studied as additivities in the copolymerization of ethylene and polar monomers in THF at 80° C. Inside the drybox, the nickel complexes (40 µmol) and metal triflate (40 µmol) were dissolved in 10 mL of THF and stirred for 10 mins. The mixture was sealed inside a vial using a rubber septum and brought outside of the drybox. To prepare the polymerization reactor, 35-37 mL of dry THF was added to an empty autoclave and preheated to the desired temperature. The autoclave was purged with ethylene (20 psi) for 1 min and then the polar comonomer was added first, followed with the catalyst solution was injected into the autoclave via syringe. The reactor pressure was increased to 400 psi of ethylene and the contents were stirred vigorously for 2 h. To stop the polymerization, the autoclave was vented and cooled in an ice bath. A solution of MeOH (100-200 mL) was added to precipitate the polymer. The polymer was collected by vacuum filtration, rinsed with MeOH, and dried under vacuum at 80° C. overnight. The reported yields are average values of triplicate runs, with results shown in Table 14 below.

mers with modest comonomer incorporation. For example, the copolymerization of ethylene with methyl 10-undecenoate (MUD) using 4a-Co and 4a-Zn provided catalysts activities of $73.5 \times 10^3$ and $61.0 \times 10^3$ g/mol Ni·h, respectively (entries 10,11). FIG. 24 shows a comparison of the activities of catalysts 4a, 4a-Zn, 4a-Co with different polar monomers. As FIG. 24 clearly shows, the heterobimetallic complexes were faster catalysts than the mononickel complexes for these select polar monomers.

Since cobalt ions could potentially induce cationic or radical polymerization to give homopoly(PVE), addition control studies were conducted. To confirm that 4a is needed to obtain copolymers of ethylene and PVE, polymerizations were carried out using just $Co(OTf)_2$ and no 4a (entry 14). As expected, no polymer had formed. Interestingly, when copolymerization was performed in toluene instead of THF, the activity didn't change much. For example, the copolymerization of ethylene with PVE in toluene gave an activity of $6.7 \times 10^3$ g/mol Ni·h, which is similar to that in THF

TABLE 14

Ethylene Comopolymerization for 4a with metal triflates in THF

| Entry | Salt | Comonomer | C(M) (mol/L) | Activity (kg/mol · h) | Branches[c] (/1000 C) | Inc (%) | $M_n^d$ (×10³) | $M_w/M_n^d$ |
|---|---|---|---|---|---|---|---|---|
| 1 | — | PVE | 1.0 | 6.9 | 21 | 0.21 | 1.43 | 1.2 |
| 2 | $Co(OTF)_2$ | PVE | 1.0 | 34.2 | 25 | 0.21 | 1.29 | 1.3 |
| 3 | $Zn(OTF)_2$ | PVE | 1.0 | 16.8 | 27 | 0.24 | 1.14 | 2.2 |
| 4 | $KBAr^F_4$ | PVE | 1.0 | 7.6 | 23 | 0.25 | 1.26 | 1.8 |
| 5[e] | $Co(OTF)_2$ | PVE | 1.0 | 0 | — | — | — | — |
| 6 | — | ABE | 0.5 | <0.1 | — | — | — | — |
| 7 | $Co(OTF)_2$ | ABE | 0.5 | 1.9 | 23 | 0.21 | 5.06 | 2.4 |
| 8 | $Zn(OTF)_2$ | ABE | 0.5 | 1.0 | 25 | 0.33 | 1.50 | 1.5 |
| 9[b] | — | MUD | 0.5 | 14.5 | 20 | 0.38 | 1.61 | 1.3 |
| 10[b] | $Co(OTF)_2$ | MUD | 0.5 | 73.5 | 23 | 0.69 | 2.15 | 1.5 |
| 11[b] | $Zn(OTF)_2$ | MUD | 0.5 | 61.0 | 23 | 0.74 | 1.94 | 1.3 |
| 12 | — | AP | 0.5 | 9.1 | 21 | 0.31 | 2.23 | 1.6 |
| 13 | $Co(OTF)_2$ | AP | 0.5 | 68.1 | 28 | 0.20 | 1.78 | 1.4 |
| 14 | $Zn(OTF)_2$ | AP | 0.5 | 27.1 | 21 | 0.29 | 1.82 | 1.2 |
| 15 | — | MA | 1.0 | 0 | — | — | — | — |
| 16 | $Co(OTF)_2$ | MA | 1.0 | 0 | — | — | — | — |

[a]Polymerization conditions: Ni catalyst (40 µmol), $M(OTF)_2$ (40 µmol), ethylene (400 psi), 50 mL THF, 2 h at 80° C.
[b]Polymerization conditions: Ni catalyst (20 µmol), $M(OTF)_2$ (20 µmol).
[c]The total number of branches per 1000 carbons was determined by $^1H$ NMR spectroscopy.
[d]Determined by GPC in trichlorobenzene at 150° C.
[e]In the absence of 4a.

The nickel complexes could not copolymerize polar monomers such as MA (methyl acrylate), VA (Vinyl acetate), AA (allyl acetate) (entry 15,16). However, the catalysts were capable of copolymerizing PVE (propyl vinyl ether), ABE (allyl butyl ether), methyl 10-undecenoate (MUD) and 4-pentenyl acetate (AP). The reaction of 4a with ethylene/PVE at 80° C. afforded poly(ethylene-co-propyl vinyl ether) containing ~0.2 mol % of in-chain polar groups (entry 1). Under similar polymerization conditions, the 4a-M complexes also furnished copolymers with low molecular weight ($10^3$) and low incorporation ~0.2 mol % (entries 2,3). Consistent with the ethylene homopolymerization studies above, the heterobimetallic complexes Ni—M were more active than their mononickel counterparts. The highest activity was using 4a-Co, which gave about a 5.0× improvement over that of the 4a complex itself (entry 1 vs. 2). In a comparison, 4a-K only gave a 1.1× increase in copolymerization activity (entry 4).

When the double bond and the polar groups were separated by long carbon chains, these monomers could be copolymerized with good catalyst activity and gave polymers (compare entry 1). This result is unexpected because ethylene homopolymerization is significantly suppressed in polar solvents compared to in nonpolar solvents. In copolymerization, the polar monomers are likely more coordinating than THF so the solvent has minimal effect on catalyst activity. Palladium catalysts are typically more active than nickel catalysts in the copolymerization of ethylene/olefin ethers. The 4a-Co catalyst is the exception to this trend. Here, the copolymer molecular weight and incorporation ratios were relatively low. According to the X-ray structure of 4a-Na, the two metals are two far apart to engage in cooperative reactivity. Since the secondary ion does not have any electronic effect on the nickel center, it is believed that its presence only increases the steric bulk of the catalyst.

REFERENCES

The references listed below are, to the extent permissible, incorporated by reference herein in their entireties.

Klosin, J.; Fontaine, P. P.; Figueroa, R. *Acc. Chem. Res.* 2015, 48, 2004-2016.

Chung, T. C. M. *Functionalization of Polyolefins*; Academic Press: San Diego, Calif., 2002.

Xie, T.; McAuley, K. B.; Hsu, J. C. C.; Bacon, D. W. *Ind. Eng. Chem. Res.* 1994, 33, 449-479.

Johnson, L. K.; Mecking, S.; Brookhart, M. *J. Am. Chem. Soc.* 1996, 118, 267-268.

Boffa, L. S.; Novak, B. M. *Chem. Rev.* 2000, 100, 1479-1493.

Ittel, S. D.; Johnson, L. K.; Brookhart, M. *Chem. Rev.* 2000, 100, 1169-1203.

Nakamura, A.; Anselment, T. M. J.; Claverie, J.; Goodall, B.; Jordan, R. F.; Mecking, S.; Rieger, B.; Sen, A.; van Leeuwen, P. W. N. M.; Nozaki, K. *Acc. Chem. Res.* 2013, 46, 1438-1449.

Nakamura, A.; Ito, S.; Nozaki, K. *Chem. Rev.* 2009, 109, 5215-5244.

Chen, C. *Nat. Rev. Chem.* 2018, 2, 6-14.

Radlauer, M. R.; Buckley, A. K.; Henling, L. M.; Agapie, T. *J. Am. Chem. Soc.* 2013, 135, 3784-3787.

Drent, E.; van Dijk, R.; van Ginkel, R.; van Oort, B.; Pugh, R. I. *Chem. Commun.* 2002, 744-745.

Ito, S.; Munakata, K.; Nakamura, A.; Nozaki, K. *J. Am. Chem. Soc.* 2009, 131, 14606-14607.

Wada, S.; Jordan, R. F. *Angew. Chem., Int. Ed. Engl.* 2017, 56, 1820-1824.

Weng, W.; Shen, Z.; Jordan, R. F. *J. Am. Chem. Soc.* 2007, 129, 15450-15451.

Kochi, T.; Noda, S.; Yoshimura, K.; Nozaki, K. *J. Am. Chem. Soc.* 2007, 129, 8948-8949.

Friedberger, T.; Wucher, P.; Mecking, S. *J. Am. Chem. Soc.* 2012, 134, 1010-1018.

Carrow, B. P.; Nozaki, K. *J. Am. Chem. Soc.* 2012, 134, 8802-8805.

Carrow, B. P.; Nozaki, K. *Macromolecules* 2014, 47, 2541-2555.

Contrella, N. D.; Sampson, J. R.; Jordan, R. F. *Organometallics* 2014, 33, 3546-3555.

Chen, M.; Chen, C. *Angew. Chem., Int. Ed. Engl.* 2018, 57, 3094-3098.

Younkin, T. R.; Connor, E. F.; Henderson, J. I.; Friedrich, S. K.; Grubbs, R. H.; Bansleben, D. A. *Science* 2000, 287, 460-462.

Cai, Z.; Xiao, D.; Do, L. H. *J. Am. Chem. Soc.* 2015, 137, 15501-15510.

Cai, Z.; Do, L. H. *Organometallics* 2017, 36, 4691-4698.

Smith, A. J.; Kalkman, E. D.; Gilbert, Z. W.; Tonks, I. A. *Organometallics* 2016, 35, 2429-2432.

Renny, J. S.; Tomasevich, L. L.; Tallmadge, E. H.; Collum, D. B. *Angew. Chem., Int. Ed. Engl.* 2013, 52, 11998-12013.

Smith, J. B.; Kerr, S. H.; White, P. S.; Miller, A. J. M. *Organometallics* 2017, 36, 3094-3103.

Dudkina, Y. B.; Kholin, K. V.; Gryaznova, T. V.; Islamov, D. R.; Kataeva, O. N.; Rizvanov, I. K.; Levitskaya, A. I.; Fominykh, O. D.; Balakina, M. Y.; Sinyashin, O. G.; Budnikova, Y. H. *Dalton Trans.* 2017, 46, 165-177.

Therrien, J. A.; Wolf, M. O.; Patrick, B. O. *Inorg. Chem.* 2014, 53, 12962-12972.

Brown, I. D.; Skowron, A. *J. Am. Chem. Soc.* 1990, 112, 3401-3403.

Delgado, M.; Ziegler, J. M.; Seda, T.; Zakharov, L. N.; Gilbertson, J. D. *Inorg. Chem.* 2016, 55, 555-557.

Ma, Z.; Yang, W.; Sun, W.-H. *Chin. J. Chem.* 2017, 35, 531-540.

Rhinehart, J. L.; Brown, L. A.; Long, B. K. *J. Am. Chem. Soc.* 2013, 135, 16316-16319.

Rhinehart, J. L.; Mitchell, N. E.; Long, B. K. *ACS Catal.* 2014, 4, 2501-2504.

Ikeda, S.; Ohhata, F.; Miyoshi, M.; Tanaka, R.; Minami, T.; Ozawa, F.; Yoshifuji, M. *Angew. Chem., Int. Ed. Engl.* 2000, 39, 4512-4513.

Kim, T.-J.; Kim, S.-K.; Kim, B.-J.; Hahn, J. S.; Ok, M.-A.; Song, J. H.; Shin, D.-H.; Ko, J.; Cheong, M.; Kim, J; Won, H.; Mitoraj, M.; Srebro, M.; Michalak, A.; Kang, S. O. *Macromolecules* 2009, 42, 6932-6943.

Biernesser, A. B.; Li, B.; Byers, J. A. *J. Am. Chem. Soc.* 2013, 135, 16553-16560.

Broderick, E. M.; Guo, N.; Vogel, C. S.; Xu, C.; Sutter, J.; Miller, J. T.; Meyer, K.; Mehrkhodavandi, P.; Diaconescu, P. L. *J. Am. Chem. Soc.* 2011, 133, 9278-9281.

Zhang, F.; Wang, L.; Chang, S.-H.; Huang, K.-L.; Chi, Y.; Hung, W.-Y.; Chen, C.-M.; Lee, G.-H.; Chou, P.-T., *Dalton Trans.* 2013, 42, 7111-7119.

Rulke, R. E.; Ernsting, J. M.; Spek, A. L.; Elsevier, C. J.; van Leeuwen, P. W. N. M.; Vrieze, K., *Inorg. Chem.* 1993, 32, 5769-5778.

Daugulis, O.; Brookhart, M.; White, P. S., *Organometallics* 2002, 21, 5935-5943.

Xin, B. S.; Sato, N.; Tanna, A.; Oishi, Y.; Konishi, Y.; Shimizu, F., *J. Am. Chem. Soc.* 2017, 139, 3611-3614.

Mokhadinyana, M. S. M., Munaka Christopher; Mogorosi, Moses Mokgolela; Overett, Matthew James; Van den Berg, Jan-Albert; Janse Van Rensburg, Werner; Blann, Kevin, *Patent* 2014.

Reisinger, C. M.; Nowack, R. J.; Volkmer, D.; Rieger, B., *Dalton Trans.* 2007, 272-278.

Acharya, J.; Gupta, A. K.; Shakya, P. D.; Kaushik, M. P., *Tetrahedron Lett.* 2005, 46, 5293-5295.

Contrella, N. D.; Sampson, J. R.; Jordan, R. F., *Organometallics* 2014, 33, 3546-3555.

Smith, J. B.; Kerr, S. H.; White, P. S.; Miller, A. J. M., *Organometallics* 2017, 36, 3094-3103.

Gates, D. P.; Svejda, S. A.; Oñate, E.; Killian, C. M.; Johnson, L. K.; White, P. S.; Brookhart, M. *Macromolecules* 2000, 33, 2320-2334.

Zhou, X.; Bontemps, S.; Jordan, R. F. *Organometallics* 2008, 27, 4821-4824.

Delferro, M.; McInnis, J. P.; Marks, T. J. *Organometallics* 2010, 29, 5040-5049.

Kenyon, P.; Wörner, M.; Mecking, S. *J. Am. Chem. Soc.* 2018, 140, 6685-6689.

Zhang, Y.; Mu, H.; Pan, L.; Wang, X.; Li, Y. *ACS Catal.* 2018, 8, 5963-5976.

Noda, S.; Kochi, T.; Nozaki, K. *Organometallics* 2009, 28, 656-658.

Kocen, A.; Brookhart, M.; Daugulis, O. *Nature Commun.* 2019.

Cai, Z.; Do, L. H. *Organometallics* 2018, 37, 3874-3882.

Brookhart, M.; Grant, B.; Volpe, A. F., Jr. *Organometallics* 1992, 11, 3920-3922.

Hirose, K. J. *Incl. Phenom. Marocycl. Chem.* 2001, 39, 193-209.

Zhang, Y.-P.; Li, W.-W.; Li, B.-X.; Mu, H.-L.; Li, Y.-S. *Dalton Trans.* 2015, 44, 7382-7394.

What is claimed is:

1. A heterobimetallic catalyst having a structure selected from:

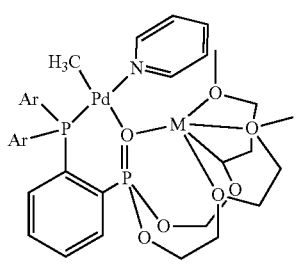
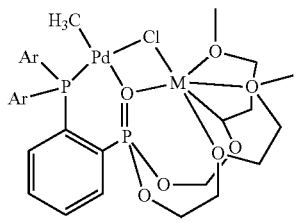
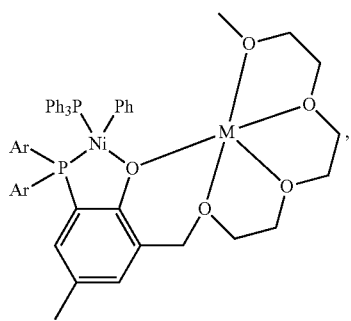
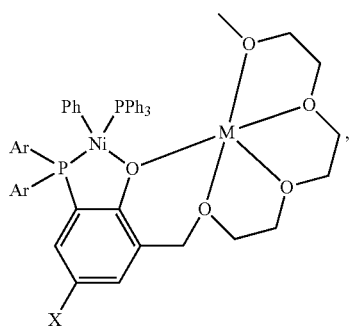
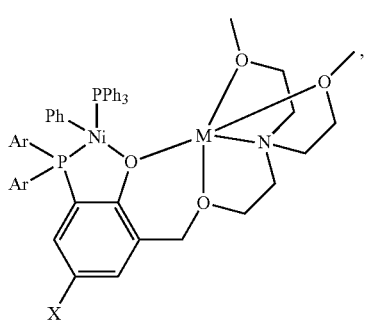
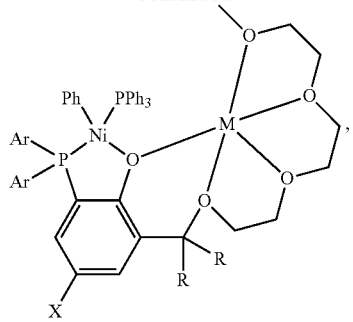
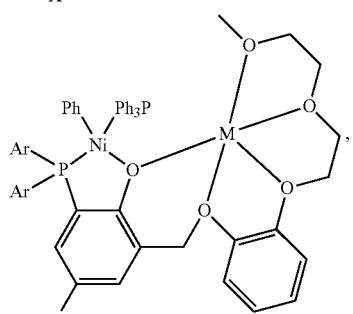
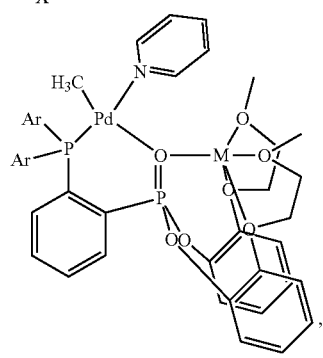
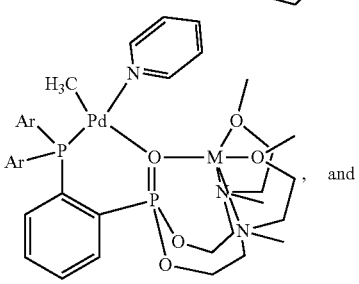
, and
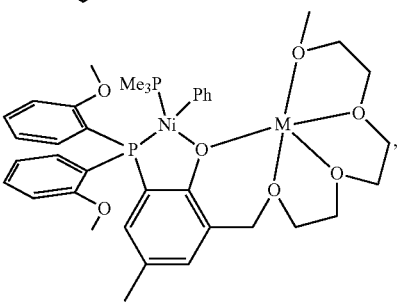
wherein Ar is Ph, (2,6-dimethoxy)Ph or (2-MeO)Ph, Ph is a phenyl group, PPh₃ is triphenylphosphine, PMe₃ is trimethylphosphine, M is Li, Na, or K, R is an alkyl or aryl group, and X is an electron donating or withdrawing group.

2. A method for catalyzing homopolymerization of ethylene, comprising:
   combining ethylene with the heterobimetallic catalyst of claim 1, whereby the ethylene undergoes homopolymerization.

3. A method for catalyzing copolymerization of ethylene and polar olefins, comprising:
   combining ethylene and polar olefins with the heterobimetallic catalyst of claim 1, whereby the ethylene and polar olefins undergo copolymerization.

4. A heterobimetallic catalyst having a structure of:

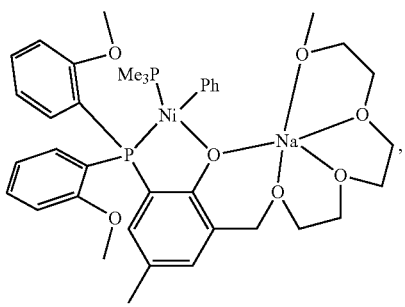

wherein Ph is a phenyl group and PMe$_3$ is trimethylphosphine.

5. A method for catalyzing homopolymerization of ethylene, comprising:
   combining ethylene with the heterobimetallic catalyst of claim 4, whereby the ethylene undergoes homopolymerization.

6. A method for catalyzing copolymerization of ethylene and polar olefins, comprising:
   combining ethylene and polar olefins with the heterobimetallic catalyst of claim 4, whereby the ethylene and polar olefins undergo copolymerization.

7. A heterobimetallic catalyst having a structure selected from:

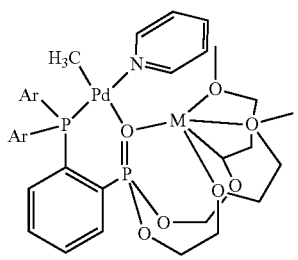

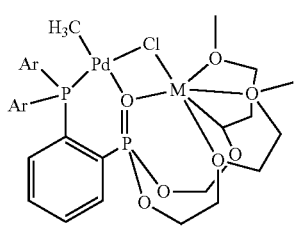

-continued

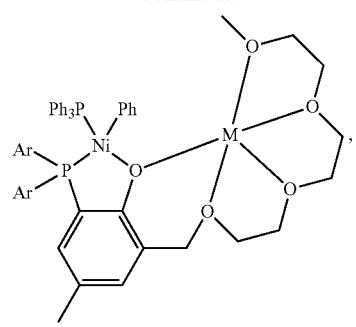

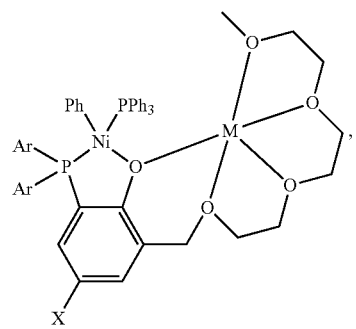

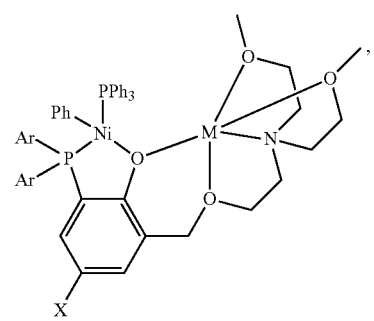

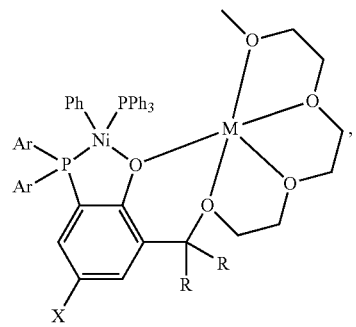

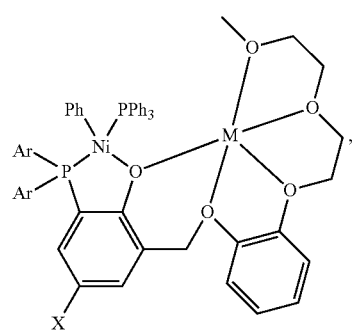

-continued

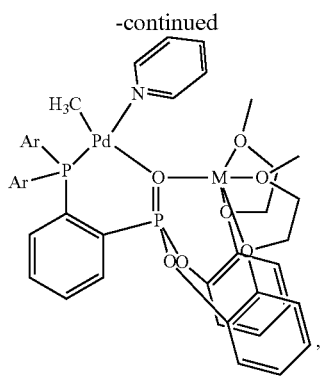

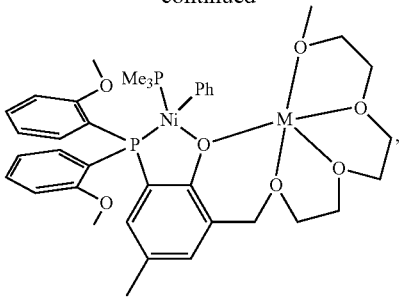

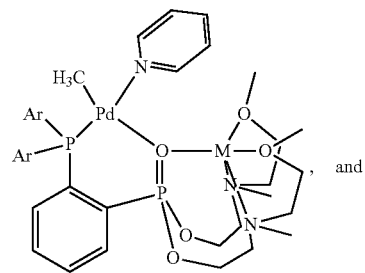, and wherein Ar is an aromatic group, Ph is a phenyl group, $PPh_3$ is triphenylphosphine, $PMe_3$ is trimethylphosphine, M is Li, Na, or K, R is an alkyl or aryl group, and X is an electron donating or withdrawing group.

8. A method for catalyzing homopolymerization of ethylene, comprising:
combining ethylene with the heterobimetallic catalyst of claim 7, whereby the ethylene undergoes homopolymerization.

9. A method for catalyzing copolymerization of ethylene and polar olefins, comprising:
combining ethylene and polar olefins with the heterobimetallic catalyst of claim 7, whereby the ethylene and polar olefins undergo copolymerization.

* * * * *

UNITED STATES PATENT AND TRADEMARK OFFICE
CERTIFICATE OF CORRECTION

PATENT NO. : 11,358,134 B2
APPLICATION NO. : 17/255846
DATED : June 14, 2022
INVENTOR(S) : Loi Hung Do et al.

It is certified that error appears in the above-identified patent and that said Letters Patent is hereby corrected as shown below:

On the Title Page

1. On Page 2, in Item (56), under "OTHER PUBLICATIONS", in Column 1, Line 14, delete "Society9" and insert -- Society --, therefor.

In the Specification

2. In Column 8, Line 38, delete "30 mM" and insert -- 30 mins. --, therefor.

3. In Column 10, Lines 64-65, delete "$^3$P NMR" and insert -- $^{31}$P NMR --, therefor.

4. In Column 11, Line 34, delete "20 min" and insert -- 20 min. --, therefor.

5. In Column 13, Line 4, delete "$J_{PC}$3.8 Hz)," and insert -- $J_{PC}$=3.8 Hz), --, therefor.

6. In Column 15, Line 49, delete " $LiBAr^{F4^a}$ " and insert -- LiBAr$^{F}$4$^a$ --, therefor.

7. In Column 16, Line 2, delete " $NaBAr^{F4^a}$ " and insert -- NaBAr$^{F}$4$^a$ --, therefor.

8. In Column 16, Line 21, delete " $KBAr^{F4^a}$ " and insert -- KBAr$^{F}$4$^a$ --, therefor.

9. In Column 18, Line 11, delete " $MBAr^{F4}$ " and insert -- MBAr$^{F}$4 --, therefor.

10. In Column 19, Line 48, delete " $MBAr^{F4}$ " and insert -- MBAr$^{F}$4 --, therefor.

Signed and Sealed this
Eleventh Day of April, 2023

Katherine Kelly Vidal
*Director of the United States Patent and Trademark Office*

11. In Column 20, Line 36, delete "MBAr$^{F4}$" and insert -- MBAr$^F$4 --, therefor.

12. In Column 20, Line 38, delete "1H NMR" and insert -- $^1$H NMR --, therefor.

13. In Column 21, Line 17, delete "MBAr$^{F4}$" and insert -- MBAr$^F$4 --, therefor.

14. In Column 21, Line 19, delete "cDetermined" and insert -- $^c$Determined --, therefor.

15. In Column 31, Line 47, delete "χ$^{Ni}$" and insert -- χNi --, therefor.

16. In Column 32, Line 56, delete "10 min" and insert -- 10 min. --, therefor.

17. In Column 35, Line 30, delete "performance" and insert -- performance. --, therefor.

18. In Column 40, Line 45, delete "30 mM" and insert -- 30 mins --, therefor.

19. In Column 43, Line 39, delete "NH) for Ni·K" and insert -- Ni·h for Ni+K --, therefor.

20. In Column 44, Line 40, delete "cDetermined" and insert -- $^c$Determined --, therefor.

21. In Column 44, Line 48, delete "Sc$^+$, Ga$^+$" and insert -- Sc$^{3+}$, Ga$^{3+}$ --, therefor.

22. In Column 48, Line 7, delete "J;" and insert -- J.; --, therefor.

In the Claims

23. In Column 49, Lines 1-20, In Claim 1, delete " 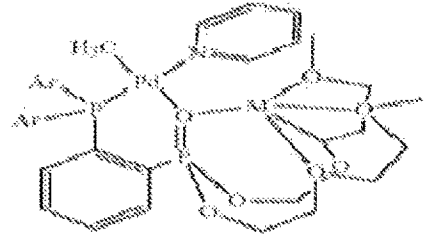 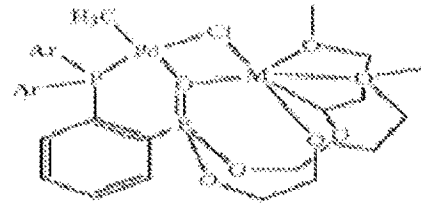 " and insert

CERTIFICATE OF CORRECTION (continued)
U.S. Pat. No. 11,358,134 B2

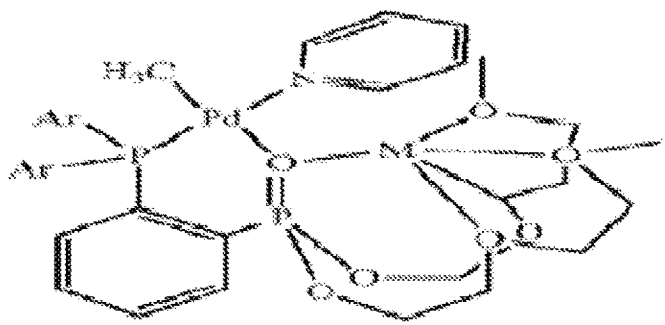

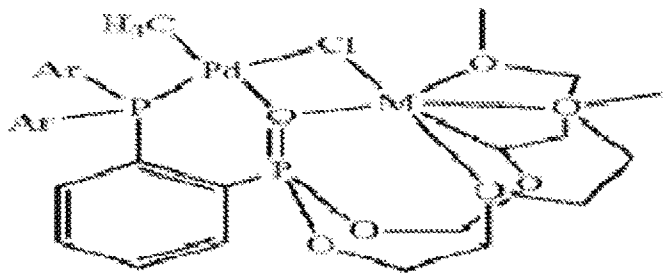

-- 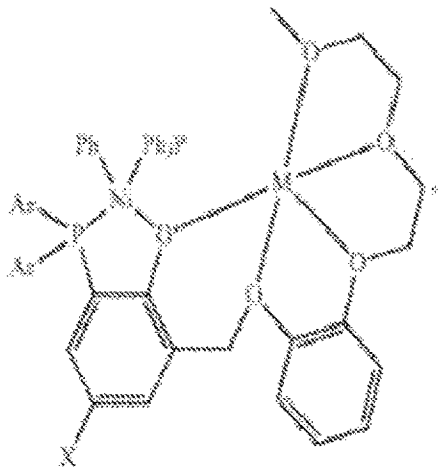 --, therefor.

24. In Column 50, Lines 14-26, in Claim 1, delete " 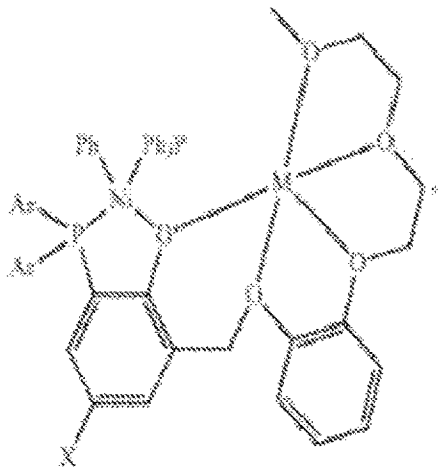 " and insert -

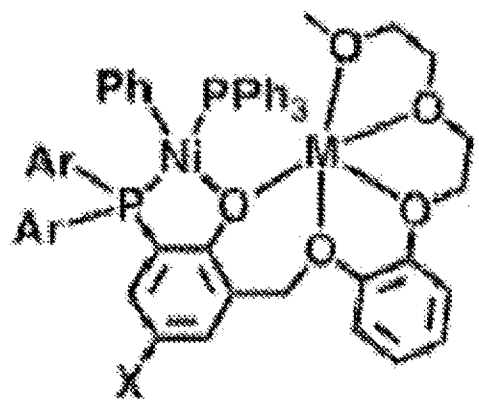 --, therefor.

25. In Column 51, Lines 15-27, in Claim 4, delete " 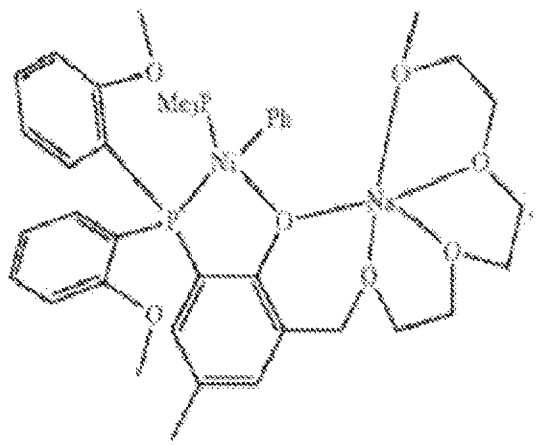 "
and insert -- 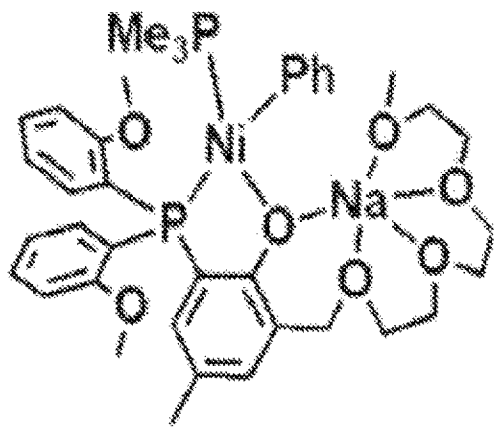 --, therefor.
26. In Column 51, Lines 47-65, in Claim 7, delete " 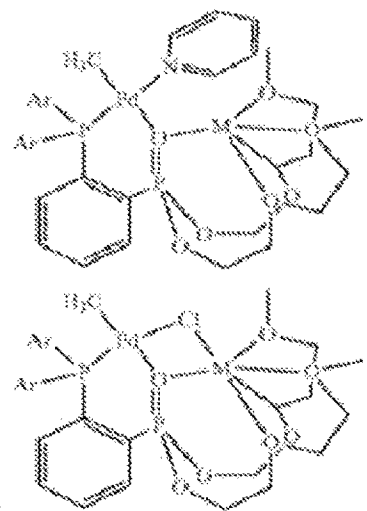 " and insert

CERTIFICATE OF CORRECTION (continued)
U.S. Pat. No. 11,358,134 B2

Page 5 of 5

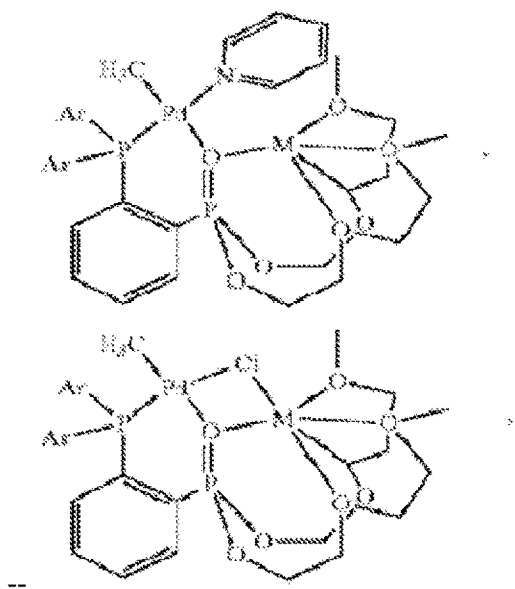

-- --, therefor.